(12) United States Patent
Boon

(10) Patent No.: US 6,665,445 B1
(45) Date of Patent: Dec. 16, 2003

(54) DATA STRUCTURE FOR IMAGE TRANSMISSION, IMAGE CODING METHOD, AND IMAGE DECODING METHOD

(75) Inventor: Choong Seng Boon, Moriguchishi (JP)

(73) Assignee: Matsushita Electric Industrial Co., Ltd. (JP)

( * ) Notice: Subject to any disclaimer, the term of this patent is extended or adjusted under 35 U.S.C. 154(b) by 154 days.

(21) Appl. No.: 09/752,456

(22) Filed: Jan. 3, 2001

Related U.S. Application Data

(63) Continuation of application No. 09/110,458, filed on Jul. 7, 1998.

(30) Foreign Application Priority Data

Jul. 10, 1997 (JP) ............................................. 9-185548
Apr. 24, 1998 (JP) ........................................... 10-115521

(51) Int. Cl.[7] .............................................. G06K 9/36
(52) U.S. Cl. ..................................... 382/243; 382/233
(58) Field of Search ..................... 358/426.04; 382/243, 382/233, 235, 236; 375/240.24

(56) References Cited

U.S. PATENT DOCUMENTS

| | | | |
|---|---|---|---|
| 5,608,458 A | 3/1997 | Chen et al. | 375/240.14 |
| 5,748,789 A | 5/1998 | Lee et al. | 382/243 |
| 5,933,105 A | 8/1999 | Cho | 341/107 |
| 6,035,070 A | 3/2000 | Moon et al. | 382/243 |
| 6,078,695 A | 6/2000 | Kadono | 382/243 |
| 6,088,485 A | 7/2000 | Kadono | 382/243 |
| 6,108,449 A | 8/2000 | Sekiguchi et al. | 382/236 |

(List continued on next page.)

FOREIGN PATENT DOCUMENTS

| | | |
|---|---|---|
| EP | 0 615 223 A1 | 3/1994 |
| EP | 0 708 563 A2 | 10/1995 |
| EP | 0 707 427 A2 | 4/1996 |
| EP | 0 753 970 A2 | 7/1996 |
| JP | 8-214318 | 8/1996 |

OTHER PUBLICATIONS

Thomas Sikora; "The MPEG–4 Video Standard Verification Model"; IEEE Transactions on Circuits and Systems for Video Technology, vol.7, No. 1, Feb. 1997; pp 19–31.

Journal of Visual Information Media Institute, vol. 51, No. 12, pp. 1974–1976 (1997).

Hans Georg Musmann et al.; "Object–Oriented Analysis–Synthesis Coding of Moving Images"; Signal Processing: Image Communication 1; Oct. 1989, No. 2, Amsterdam, NE; pp. 117–138.

(List continued on next page.)

*Primary Examiner*—Cheukfan Lee
(74) *Attorney, Agent, or Firm*—Parkhurst & Wendel, L.L.P.

(57) ABSTRACT

There is provided an image decoding apparatus for decoding a coded image signal having an image identifier based on a data structure of the image signal. This apparatus comprises a data analyzer for analyzing the coded image signal with reference to the image identifier to decide whether the coded image signal is a coded arbitrary shape signal including both of coded shape bit streams obtained by coding a shape signal which represents the shape of each object as one of the components of a display image and coded pixel value bit streams obtained by coding a pixel value signal representing the gradation of the object, or a coded binary signal including only coded shape bit streams obtained by coding a shape signal representing a display image of binary information; a first decoder for decoding the coded shape bit streams by a first decoding process; and a second decoder for decoding the coded pixel value bit streams by a second decoding process. The first decoding process and the second decoding process are appropriately switched according to each coded image signal. Therefore, plural coded image signals having different data structures and produced by different coding methods can be decoded in decoding processes corresponding to a single coding method.

6 Claims, 24 Drawing Sheets

U.S. PATENT DOCUMENTS

| | | | |
|---|---|---|---|
| 6,148,030 A | 11/2000 | Katata et al. | 375/240.1 |
| 6,148,109 A | 11/2000 | Boon et al. | 382/236 |
| 6,154,570 A | 11/2000 | Boon | 382/236 |
| 6,188,796 B1 * | 2/2001 | Kadono | 382/243 |
| 6,208,693 B1 * | 3/2001 | Chen et al. | 375/240.24 |
| 6,445,826 B1 * | 9/2002 | Kadono | 382/243 |

OTHER PUBLICATIONS

Rob Koenen et al.; "MPEG–4: Context and Objective"; Signal Processing: Image Communication 9, 1997; pp. 295–304.

MPEG4 Video Verification Model, VM 7.0; XP–002090865; pp. 195–203.

Bossen, F., et al. "A Simple and Efficient Binary Shape Coding Technique Based on Bitmap Representation." 1997 IEEE Int'l. Conf. on Acoustics, Speech, and Signal Processing. Multidimensional Signal Processing, Neutal Networks. Munich, 4/21–4/24, 1997, IEEE ICASSP, Los Angeles, vo. 4, Apr. 21, 1997, pp. 3129–3132.

Kwon, Oh–Jin, et al. "Segmentation–Based Image Compression." Optical Engineering, Society of Photo–Optical Instrumentation Engineers. Bellingham, US, vol. 32, No. 7 Jul. 1, 1993, pp. 1581–1587.

Brady, N., et al. "Context–Based Arithmetic Encoding of 2D Shaped Sequences." Proceedings of the Int'l. Conf. on Image Processing. ICIP 1997. Santa Barbara, CA, 10/26–10/29, 1997, Los Alamitos, CA. IEEE, US, vol. 1, Oct. 26, 1997, pp. 29–32.

* cited by examiner

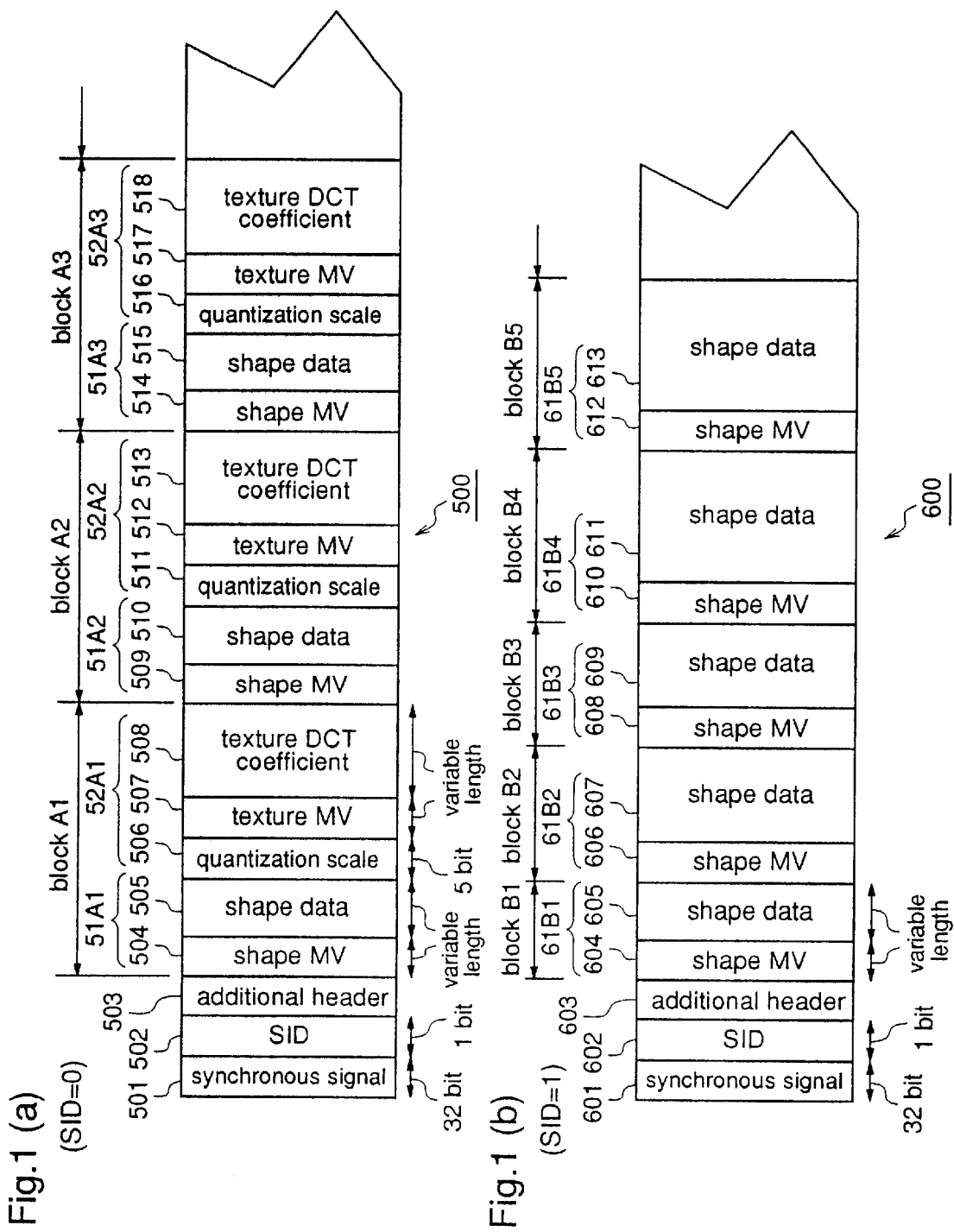

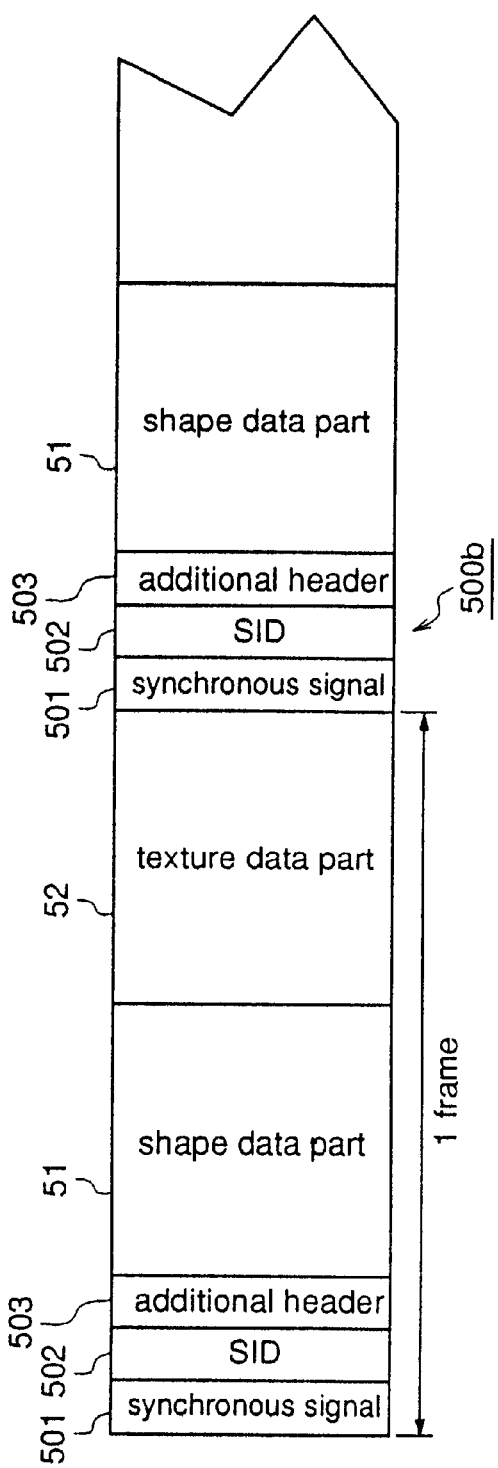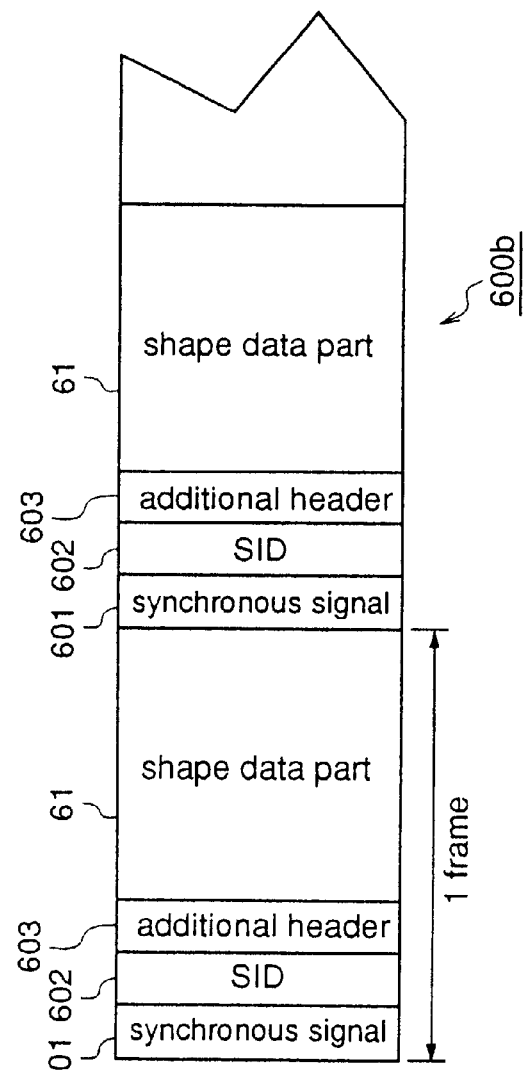
Fig.2 (a) (SID=0)
Fig.2 (b) (SID=1)

DATA STRUCTURE FOR IMAGE TRANSMISSION, IMAGE CODING METHOD, AND IMAGE DECODING METHOD

This is a Continuation of application Ser. No. 09/110,458 filed Jul. 7, 1998.

FIELD OF THE INVENTION

The present invention relates to a data structure for image transmission, an image coding method, an image decoding method, an image coding apparatus, an image decoding apparatus, a data storage medium which contains a program for implementing an image decoding process, and a data storage medium which contains a coded image signal.

More particularly, the invention relates to a data structure for image transmission that makes coded image signals decodable by decoding processes corresponding to a single coding method, which coded image signals have different data structures obtained by coding digital image signals corresponding to different schemes. Further, the invention relates to an image coding method and an image coding apparatus for generating a coded image signal having the above-described data structure for image transmission, and an image decoding method and an image decoding apparatus for decoding a coded image signal having the data structure for image transmission.

Furthermore, the invention relates to a data storage medium containing a program for implementing the decoding process according to the above-described image decoding method, and a data storage medium containing a coded image signal having the above-described data structure for image transmission.

BACKGROUND OF THE INVENTION

In order to store or transmit digital image information with high efficiency, it is necessary to compressively code the digital image information. As a typical method for compressive coding of digital image information, there is DCT (Discrete Cosine Transformation) represented by JPEG (Joint Photographic Experts Group) and MPEG (Moving Picture Experts Group). Besides, there are waveform coding methods such as sub-band coding, wavelet coding, and fractal coding.

Further, in order to eliminate redundant image information between display images, such as adjacent frames, inter-frame prediction using motion compensation is carried out. That is, a pixel value of a pixel in the present frame is expressed using a difference between this pixel value and a pixel value of a pixel in the previous frame, and this difference signal is subjected to waveform coding.

To be specific, an arithmetic encoder 10a as shown in FIG. 22(a) is employed for coding a binary image signal S2 which represents a display image of binary information and is obtained from a scanner of a facsimile machine or the like. For decoding a coded binary signal E2, an arithmetic decoder 10b is employed as shown in FIG. 22(b). The arithmetic encoder 10a encodes the binary image signal S2 by an arithmetic coding process which is used when transmitting a facsimile signal, such as MMR (Modified Modified Reed) or JBIG (Joint Bi-level Image Coding Experts Group), thereby generates a coded binary signal E2. The arithmetic decoding apparatus 10b decodes the coded binary signal E2 by an arithmetic decoding process corresponding to the arithmetic coding process, thereby regenerates a decoded binary signal D2.

As shown in FIG. 22(c), a coded binary signal 600a (E2) corresponding to one display image includes a synchronous signal 601 at the beginning, a header 603 that follows signal 601, and shape data 604 that follows the header 603.

Further, an image coding apparatus 20 shown in FIG. 23(a) is employed for coding a digital image signal St treated in MPEG2, and an image decoding apparatus 25 shown in FIG. 23(b) is employed for decoding a coded image signal Et. The digital image signal St treated in MPEG2 is a rectangle image signal which includes a luminance signal and a color difference signal for color display (gradation display), and information showing the horizontal and vertical size of an image on one display image (one frame). The image coding apparatus 20 comprises an information source encoder 20a which subjects the digital image signal (rectangle image signal) St to information source coding, and a variable-length encoder 20b which subjects the output from the encoder 20a to variable-length coding to generate a coded image signal (coded pixel value signal) Et. The image decoding apparatus 25 comprises a variable-length decoder 25b which subjects the coded image signal Et to variable-length decoding, and an information source decoder 25a which subjects the output from the decoder 25b to information source decoding to generate a decoded image signal (decoded pixel value signal) Dt.

The information source encoder 20a comprises a DCT processor 21 which subjects each of plural blocks, into which a display image (one frame) is divided, to DCT (Discrete Cosine Transform), and a quantizer 22 which quantizes the output from the DCT processor 21. The information source decoder 25a comprises an inverse quantizer 26 which inversely quantizes the output from the variable-length decoder 25b, and an IDCT processor 27 which subjects the output from the decoder 25b to inverse DCT. As shown in FIG. 23(c), a coded image signal 700a (Et) corresponding to one display image includes a 32-bit synchronous signal 701 at the beginning, a header 703 that follows signal 701, and coded pixel value bit streams (coded texture bit streams) 71C1, 71C2, 71C3, ... corresponding to blocks C1, C2, C3, ..., into which the display image is divided, respectively. The coded texture bit streams 71C1, 71C2, and 71C3 include 5-bit quantization scales 704, 707, and 710, variable-length texture motion vectors (MV) 705, 708, and 711, and variable-length texture DCT coefficients 706, 709, and 712, respectively.

In recent years, a method for compressively coding and transmitting an image signal in the basis of individual object has been put to practical use. More specifically, an image, corresponding to one display image and composed of plural objects, is subjected to compressive coding and transmission in an object-wise manner, thereby increases the data compression ratio and enables decoding/reproducing of the objects separately. In this method, on the reproduction end, coded image signals corresponding to the respective objects are decoded and reproduced, and the reproduced image signals are synthesized to display an image corresponding to one display image. This object-by-object coding enables the user to freely combine images of objects to be displayed, whereby editing of a moving picture is facilitated. Furthermore, in this method, it is possible to display a moving picture without reproducing images of relatively unimportant objects, according to the congestion of the transmission line, the performance of reproduction apparatus, and the preference of the viewer. In other words, scalability in object units, i.e., to change the contraction scale of image display for each object, is realized.

In the object-by-object compressive coding of an image signal, since the respective objects have different shapes, an image signal of an arbitrary shape image (hereinafter, referred to as an arbitrary shape image signal) is subjected to compressive coding. The arbitrary shape image signal includes a texture signal (pixel value signal) for color display of an object (gradation display) and comprising a luminance signal and a color difference signal, and a shape signal representing the shape of an image. The shape signal indicates whether each pixel as a component of a display region is located outside the object or inside the object, and it is expressed by binary digit.

Further, there is a case where the arbitrary shape image signal includes transparency information representing the transparency of an object when the object is placed as a foreground image on a background image, in addition to the texture signal and the shape signal. The transparency information is usually expressed by a multivalued transparent signal of at least three bits. A combination of the binary shape signal (binary transparency signal) and the multivalued transparency signal is called a transparency signal. The multivalued transparency signal in the transparency signal is treated identically to a texture signal in the following coding process.

When an arbitrary shape image signal including both of a texture signal and a binary shape signal is coded, initially, the shape signal is coded and, thereafter, the texture signal is coded. In MPEG4, coding, transmission, and decoding of such an arbitrary shape image signal are being standardized, and FIG. 24($a$) is a block diagram showing an image coding apparatus which performs a coding process currently being standardized as MPEG4.

In FIG. 24($a$), reference numeral 200$a$ designates an image coding apparatus which extracts an arbitrary shape image signal Sp corresponding to each of plural objects constituting a display image, according to a video signal Sv output from a camera or an image recording/reproduction apparatus (VTR), and encodes the arbitrary shape image signal.

The image coding apparatus 200$a$ includes a chromakey processor 201 which subjects the video signal Sv to a chromakey process as follows. Initially, the chromakey processor 201 separates an arbitrary shape image signal corresponding to each object from a background image signal to a shape signal Spk representing the shape of the object as binary information and a texture signal (pixel value signal) Spt for color display of the object and comprising a luminance signal and a color difference signal. Then, the chromakey processor 201 outputs the signals Spk and Spt for each of plural blocks into which a display region corresponding to each object on the display image is divided. When outputting the signals Spk and Spt, the chromakey processor 201 outputs a switch timing signal Ts representing the timing of switching between the shape signal Spk and the texture signal Spt. Further, the image coding apparatus 200$a$ includes an arithmetic encoder 120$a$ which codes the shape signal Spk, block by block, by arithmetic coding (refer to JBIG); an information source encoder 130$a$ which performs DCT and quantization of the texture signal Spt block by block; and a variable-length encoder 139 which performs variable-length coding of the output from the information source encoder 130$a$.

Further, the image coding apparatus 200$a$ includes a switch 202 which connects the output from the chromakey processor 201 with one of the input of the arithmetic encoder 120$a$ and the input of the information source encoder 130$a$, in response to a switch timing signal Ts; and a multiplexer 150 which multiplexes a coded shape bit stream Epk output from the arithmetic encoder 120$a$ and a coded texture bit stream Ept output from the variable-length encoder 139 together with other necessary signals. As shown in FIG. 24($c$), a coded arbitrary shape signal Ep (500$a$), in which coded shape bit streams (Epk) 51A1, 51A2, and 51A3, coded texture bit streams (Ept) 52A1, 52A2, and 52A3, and other necessary signals are arranged in prescribed order, is output from the multiplexer.150.

The above-described arithmetic coding process is adopted in a method of transmitting a facsimile signal, such as MMR or JBIG, and the above-described DCT process is adopted in the MPEG standard. As shown in FIG. 24($c$), the coded data of each of blocks A1, A2 and A3 is composed of the coded shape bit stream Epk and the coded texture bit stream Ept.

In the coding apparatus 200$a$ so constructed, the video signal Sv is processed by the chromakey processor 201, and an arbitrary shape image signal Sp corresponding to each object is output from the chromakey processor 201. The shape signal Spk included in the arbitrary shape image signal Sp is input to the arithmetic encoder 120$a$ by the switch 202 controlled by the switch timing signal Ts, coded by the encoder 120$a$, and output as a coded shape bit stream Epk toward the multiplexer 150. On the other hand, the texture signal Spt included in the arbitrary shape image signal Sp is input to the information source encoder 130$a$ by the switch 202 controlled by the switch timing signal Ts, subjected to DCT and quantization in the encoder 130$a$, and output as a coded texture bit stream Ept toward the multiplexer 150. The coding of the shape signal Spk and the coding of the texture signal Spt are carried out block by block.

In the multiplexer 150, the coded shape bit stream Epk, the coded texture bit stream Ept, and other required signals are arranged in prescribed order, and these streams and signals are output from the multiplexer 150 as a coded arbitrary shape signal Ep.

The image decoding apparatus 200$b$ shown in FIG. 24($b$) is used for decoding of the arbitrary shape signal Ep which has been coded by the image coding apparatus 200$a$.

The image decoding apparatus 200$b$ comprises a data analyzer 160 which analyzes the coded arbitrary shape signal Ep and outputs a control signal SWb; an arithmetic decoder 170$a$ which subjects the coded shape bit stream Epk included in the coded arbitrary shape signal Ep to block-by-block arithmetic decoding, and generates an end timing signal Te when arithmetic decoding of one block has ended; an information source decoder 180$a$ which subjects the coded texture bit stream Ept included in the coded arbitrary shape signal Ep to information source decoding, i.e., inverse DCT and inverse quantization; a switch 101$b$ which supplies the coded arbitrary shape signal Ep output from the data analyzer 160 to either the arithmetic decoder 170$a$ or the information source decoder 180$a$, in response to the control signal SWb and the end timing signal Te; and a synthesizer 190 which synthesizes outputs Dpk and Dpt from the decoders 170$a$ and 180$a$ and outputs the synthesized signal as a decoded arbitrary shape signal Dp.

In the image decoding apparatus 200$b$ so constructed, receiving the coded arbitrary shape signal Ep, the data analyzer 160 analyzes information included in this signal, and outputs the control signal SWb toward the switch 101$b$ when it detects the last bit of the texture bit stream Ept. In response to the control signal SWb, the switch 101$b$ supplies the output from the data analyzer 160 to the arithmetic decoder 170$a$. The arithmetic decoder 170$a$ decodes the coded shape bit stream Epk, and outputs the end timing signal Te when decoding of the coded shape bit stream Epk corresponding to each block has ended. When the end timing signal Te is input to the data analyzer 160, the data analyzer 160 outputs the control signal SWb to the switch 101b, and the switch 101b connects the output of the data analyzer 160 to the information source decoder 180a. The information source decoder 180a decodes one block of the coded texture signal Ept included in the coded arbitrary shape signal Ep. The synthesizer 190 synthesizes the output from the arithmetic decoder 170a and the output from the information source decoder 180a, and outputs the decoded arbitrary shape signal Dp as a reproduced signal. When the above-mentioned decoding process has been completed for the coded arbitrary shape signal Ep corresponding to one object to generate the decoded arbitrary shape signal Dp corresponding to the object, image display of the object is possible.

Although no description is given of processing of an arbitrary shape image signal including a multivalued transparency signal (arbitrary shape image signal with transparency information) with respect to FIGS. 24(a)–(c), the multivalued transparency signal is processed in the same manner as the texture signal (pixel value signal) if the arbitrary shape image signal includes a multivalued transparency signal.

As described above, in the conventional method of coding an image signal, the arithmetic coding method employed in JBIG or the like is used for coding of a binary image signal, i.e., a binary shape signal, while the information source coding method employed in MPEG2 or the like is used for coding of a digital image signal for color display of an image, i.e., a texture signal. Further, the coding method of MPEG4, i.e., combination of arithmetic coding and information source coding is used for coding of an image signal including a binary shape signal and a texture signal.

It is a matter of course that, when decoding coded signals obtained by different coding methods, different decoding methods corresponding to the respective coding methods should be employed. In other words, since different coding methods are used for coding different kinds of image signals in the conventional coding process, different data analysis methods should be employed in the decoding process of the coded signals.

Although an image decoding apparatus based on M2EG4 is able to decode any of coded signals of a binary image signal (JBIG), a digital image signal (MPEG2), and an arbitrary shape image signal (MPEG4), this apparatus has the following drawbacks.

In a coded arbitrary shape signal obtained by block-by-block coding of an arbitrary shape image signal, coded shape bit streams corresponding to the respective blocks and coded texture bit streams corresponding to the respective blocks are alternatingly arranged. On the other hand, in a coded binary signal obtained by block-by-block coding of a binary image signal, coded shape bit streams corresponding to the respective blocks are successively arranged. Therefore, in the data analysis method (data analyzer) according to MPEG4, the above-described control signal SWb cannot be generated by analysis of the coded binary image signal containing no coded texture bit stream, as such the coded shape bit streams of the respective blocks in the coded binary signal cannot be successively output toward the arithmetic decoder 170a. To be specific, in the image decoding apparatus 200b, when processing of a coded shape bit stream corresponding to some block has ended, the end timing signal Te is output from the arithmetic decoder 170a toward the switch 101b, whereby the switch 101b supplies the bit stream from the data analyzer 160 to the information source decoder 180a. However, since no coded texture bit stream is included in the coded binary signal, the data analyzer 160 cannot generate the control signal SWb for controlling the switch 101b so that the bit stream is input to the arithmetic decoder 170a, and a coded shape bit stream corresponding to the next block is input to the information source decoder 180a.

Hence, to support coding of the binary image signal, a dummy texture bit stream corresponding to the block is added using the conventional method after the coded shape bit stream of each block, thereby making the data structure of the coded binary signal apparently identical to the data structure of the coded arbitrary shape signal. In this case, the coded binary signal can be analyzed by the data analysis method based on MPEG4 and decoded by the image decoding process based on MPEG4.

However, since the coded dummy texture bit stream is added to the coded shape bit stream when the coded binary image signal is output, the bit number is wasted in the coding process, resulting in a reduction in the coding efficiency.

In the decoding process based on MPEG4, a coded image signal (coded pixel value signal), which is obtained by coding a digital image signal (rectangle image signal) corresponding to MPEG2 and comprising only a texture signal, is decodable as well as a coded arbitrary shape signal obtained by coding an arbitrary shape image signal. The reason is as follows. In a coded image signal including coded texture bit streams, since starting point and end point of the coded texture bit stream corresponding to each block is detectable, the switch 101b can be controlled by the control signal SWb so that the coded texture bit stream is always input to the information source decoder 180b.

Further, in the decoding process corresponding to the coding process based on MPEG4, if the processing is overloaded, when decoding a coded arbitrary shape signal obtained by coding an arbitrary shape image signal, both of the coded shape bit stream and the coded texture bit stream corresponding to each block cannot be decoded within a display time that is set in advance, as such the motion of image on the display lacks of smoothness or stops.

SUMMARY OF THE INVENTION

An object of the present invention is to provide a data structure for image transmission, an image decoding method, and an image decoding apparatus, which enable decoding of coded image signals having different data structures obtained by coding digital image signals corresponding to different schemes or the like, by decoding processes corresponding to a single coding method, for example, those capable of decoding both of a binary image signal and an arbitrary shape image signal, without increasing the bit number during the coding process.

Another object of the present invention is to provide a data storage medium containing a program for implementing the decoding processes according to the above-described image decoding method, and a data storage medium containing a coded image signal having the above-mentioned data structure for image transmission.

Still another object of the present invention is to provide an image coding method and an image coding apparatus, which can create a coded image signal having a data structure for image transmission, which data structure enables decoding of coded image signals having different data structures obtained by coding digital image signals corresponding to different schemes or the like by decoding processes corresponding to a single coding method, for example, decoding of a binary image signal and an arbitrary shape image signal without increasing the bit number during the coding process.

Yet another object of the present invention is to provide an image decoding apparatus which can reproduce a coded image signal by decoding while maintaining a smooth motion of image on a display screen even when the load of an arithmetic processor performing the decoding is large.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a data structure for transmitting a coded image signal obtained by coding a digital image signal, including:
  at least coded shape bit streams between the following two kinds of bit streams: coded shape bit streams obtained by coding a shape signal which represents a display image of binary information or the shape in binary format of each object as one of the components of a display image; and coded pixel value bit streams obtained by coding a pixel value signal representing the gradation of the object; and
  an image identifier for deciding whether the coded image signal includes, as the coded bit streams, both of the coded shape bit streams and the coded pixel value bit streams, or only the coded shape bit streams;
  wherein the image identifier and the coded bit streams are arranged so that the image identifier is followed by the coded bit streams.

Therefore, by referring to the image identifier, a coded signal including no coded pixel value bit streams can be analyzed using a data analysis method for a coded signal including coded pixel value bit streams.

According to a second aspect of the present invention, in the above-described data structure for image transmission, the image identifier comprises a 2-bit code. Therefore, it is possible to realize decoding processes for four kinds of coded image signals including a coded binary signal and a coded arbitrary shape signal, corresponding to a single coding method.

According to a third aspect of the present invention, there is provided an image coding method receiving a digital image signal, and subjecting the digital image signal to a coding process according to the data structure of the digital image signal, wherein:
  it is decided whether the digital image signal is a binary image signal including, as data for display, only a shape signal representing a display image of binary information, or an arbitrary shape image signal including, as data for display, both of a shape signal representing the shape of each object as one of the components of a display image and a pixel value signal representing the gradation of the object;
  for the binary image signal, the shape signal is subjected to a first coding process and, in the coding process, an image identifier having a first value is generated, thereby creating a coded binary signal including the image identifier;
  for the arbitrary shape image signal, the shape signal is subjected to the first coding process while the pixel value signal is subjected to a second coding process employing a coding method different from that of the first coding process and, in the coding process, an image identifier having a second value is generated, thereby creating a coded arbitrary shape signal including the image identifier; and
  in response to the input digital image signal, one of the coded binary signal and the coded arbitrary shape signal is output.

Therefore, even though image signals having different data structures are coded by different coding methods, these coded image signals can be decoded in decoding processes corresponding to a single coding method. In addition, the bit number hardly increases during the coding process, According to a fourth aspect of the present invention, in the above-described image coding method, the image identifier comprises a 2-bit code. Therefore, coding processes for four kinds of image signals including a binary image signal and an arbitrary shape image signal are carried out so that coded signals corresponding to these image signals can be identified at the decoding end.

According to a fifth aspect of the present invention, there is provided an image coding apparatus receiving a digital image signal, and subjecting the digital image signal to a coding process according to the data structure of the digital image signal, comprising:
  signal identification means for receiving the digital image signal, and deciding whether the digital image signal is a binary image signal including, as data for display, only a shape signal showing a display image of binary information, or an arbitrary shape image signal including, as data for display, both of a shape signal showing the shape of each object as one of the components of a display image and a pixel value signal representing the gradation of the object, and outputting an identifier signal according the result of the decision;
    signal extraction means for extracting the shape signal from the binary image signal, and the shape signal and the pixel value signal from the arbitrary shape image signal;
    first coding means for coding the shape signals by a first coding process to generate coded shape bit streams;
    second coding means for coding the pixel value signal by a second coding process employing a coding method different from that of the first coding process, thereby generating coded pixel value bit streams;
    signal supply means for selecting, according to the identifier signal, one of first and second operations, where the first operation is to supply the shape signal of the binary image signal to the first coding means and the second operation is to supply the shape signal of the arbitrary shape image signal to the first coding means while supplying the pixel value signal of the arbitrary shape image signal to the second coding means; and
    multiplexing means for multiplexing the identifier signal from the signal identification means, the coded shape bit streams output from the first coding means, and the coded pixel value bit streams output from the second coding means;
  wherein a coded binary signal including the identifier signal and the coded shape bit streams is output when the binary image signal is input as the digital image signal, and a coded arbitrary shape signal including the identifier signal, the coded shape bit streams, and the coded pixel value bit streams is output when the arbitrary shape image signal is input as the digital image signal.

Therefore, even though image signals having different data structures are coded by different coding methods, these coded signals can be decoded in decoding processes corresponding to a single coding method. In addition, the bit number hardly increases during the coding process.

According to a sixth aspect of the present invention, there is provided an image decoding method receiving, as a coded signal obtained by coding a digital image signal, a coded image signal having an image identifier according to the data structure of the digital image signal, and subjecting the coded image signal to a decoding process according to the data structure, wherein:

the coded image signal is analyzed with reference to the image identifier to decide whether the coded image signal is a coded arbitrary shape signal including, as data for display, both of coded shape bit streams obtained by coding a shape signal which represents the shape of each object as one of the components of a display image and coded pixel value bit streams obtained by coding of a pixel value signal representing the gradation of the object, or a coded binary signal including, as data for display, only coded shape bit streams obtained by coding a shape signal representing a display image of binary information;

when the input coded image signal is the coded arbitrary shape signal, decoding of the coded shape bit streams thereof by a first decoding method, and decoding of the coded pixel value bit streams thereof by a second decoding method, are carried out according to the arrangement of these bit streams; and when the input coded image signal is the coded binary signal, only decoding of the coded shape bit streams thereof by the first coding method is carried out.

Therefore, even though image signals having different data structures are coded by different coding methods, these coded image signals can be decoded in decoding processes corresponding to a single coding method. In addition, the bit number hardly increases during the coding process.

According to a seventh aspect of the present invention, in the above-described image decoding method, the image identifier comprises a 2-bit code. Therefore, it is possible to decode four kinds of coded image signals including a coded binary signal and a coded arbitrary shape signal, in decoding processes corresponding to a single coding method.

According to an eighth aspect of the present invention, there is provided an image decoding apparatus receiving, as a coded signal obtained by coding a digital image signal, a coded image signal having an image identifier according to the data structure of the digital image signal, and subjecting the coded image signal to a decoding process according to the data structure, comprising:

data analysis means for deciding whether the coded image signal is a coded arbitrary shape signal including, as data for display, both of coded shape bit streams obtained by coding a shape signal which represents the shape of each object as one of the components of a display image and coded pixel value bit streams obtained by coding a pixel value signal representing the gradation of the object, or a coded binary signal including, as data for display, only coded shape bit streams obtained by coding a shape signal representing a display image of binary information;

first decoding means for decoding the coded shape bit streams by a first decoding process to generate a decoded shape signal;

second decoding means for decoding the coded pixel value bit streams by a second decoding process employing a decoding method different from that of the first decoding process, thereby generating a decoded pixel value signal;

signal switch means for supplying the coded image signal to one of the first and second decoding means, according to a switch control signal;

the data analysis means supplying a first switch control signal to the signal switch means when the coded image signal is the coded binary signal, and supplying a second switch control signal to the signal switch means when the coded image signal is the coded arbitrary shape signal; and the signal switch means being in the fixed switching state where the coded shape bit streams of the coded binary signal are input to the first decoding means alone when it receives the first switch control signal, and being in the alternate switching state where, according to the arrangement of the coded shape bit streams and the coded pixel value bit streams in the coded arbitrary shape signal, the coded shape bit streams are input to the first decoding means while the coded pixel bit streams are input to the second deciding means, when it receives the second switch control signal.

Therefore, even though image signals having different data structures are coded by different coding methods, these coded image signals can be decoded in decoding processes corresponding to a single coding method. In addition, the bit number hardly increases during the coding process.

According to a ninth aspect of the present invention, the above-described image decoding apparatus further comprises overload detection means for detecting that the load on the decoding process by one of the first and second decoding means exceeds a threshold value which is set in advance, and outputting an overload detection signal toward the data analysis means:

wherein, when the over-load detection signal is input to the data analysis means, the data analysis means outputs a third switch control signal toward the signal switch means; and in response to the third switch control signal, the signal switch means supplies either of the coded shape bit streams and the coded pixel value bit streams in the coded arbitrary shape signal to one of the first and second decoding means.

Therefore, coded image signals having different data structures can be decoded in decoding processes corresponding to a single coding method, and the bit number hardly increases during the coding process. Further, even when a processor for decoding is over-loaded, the coded image signals are reproduced by the decoding processes while maintaining smooth motion of image on the display screen.

According to a tenth aspect of the present invention, the above-described image decoding apparatus further comprises control signal input means for inputting a manual control signal from the outside to the data analysis means:

wherein, when the data analysis means receives the manual control means, it outputs a third switch control signal toward the signal switch means; and in response to the third switch control signal, the signal switch means supplies the coded shape bit streams of the coded arbitrary shape signal to the first decoding means, and does not supply the coded pixel value bit streams to the second decoding means.

Therefore, coded image signals having different data structures can be decoded in decoding processes corresponding to a single coding method, and the bit number hardly increases during the coding process. Further, when image data stored in a recording medium are retrieved, only decoding of coded shape bit streams is continued until an object image is found, whereby the data retrieval is carried out quickly.

According to an eleventh aspect of the present invention, there is provided a data structure for transmitting a coded image signal obtained by coding a digital image signal, including:

at least one of the following two kinds of coded bit streams: coded shape bit streams obtained by coding a shape signal which represents a display image of binary information or the shape in binary format of each object as one of the components of a display image, and coded pixel value bit streams obtained by coding a pixel value signal representing the gradation of the display image or the object; and an image identifier comprising a multiple-bit code, for deciding whether the coded image signal includes, as the coded bit streams, at least the coded shape bit streams, or only the coded pixel value bit streams;

wherein the image identifier and the coded bit streams are arranged so that the image identifier is followed by the coded bit streams.

Therefore, by referring to the image identifier, at least a coded image signal including coded shape bit streams and a coded image signal including no coded shape bit streams can be identified among various kinds of coded image signals.

According to a twelfth aspect of the present invention, there is provided an image decoding method receiving, as a coded signal obtained by coding a digital image signal, a coded image signal having an image identifier according to the data structure of the digital image signal, and subjecting the coded image signal to a decoding process according to the data structure, wherein:

the coded image signal is analyzed with reference to the image identifier to decide which of the following three coded signals is the coded image signal;

a coded arbitrary shape signal including, as data for display, both of coded shape bit streams obtained by coding a shape signal which represents the shape of each object as one of the components of a display image, and coded pixel value bit streams obtained by coding a pixel value signal representing the gradation of the object, a coded pixel value signal including, as data for display, only coded pixel value bit streams obtained by coding a pixel value signal representing the gradation of a display image, and a coded binary signal including, as data for display, only coded shape bit streams obtained by coding a shape signal representing a display image of binary information;

when the input coded image signal is the coded pixel value signal, decoding of the coded pixel value bit streams thereof is carried out; and when the input coded image signal is the coded binary signal or the coded arbitrary shape signal, decoding of the coded bit streams included in these signals is stopped.

Therefore, among a coded binary signal, a coded arbitrary shape signal, and a coded rectangle signal (coded pixel value signal), only the coded rectangle signal can be selected and decoded by a decoding apparatus for decoding only the coded rectangle signal which is obtained by coding a pixel value signal for color display of image.

According to a thirteenth aspect of the present invention, there is provided an image decoding apparatus receiving, as a coded signal obtained by coding a digital image signal, a coded image signal having an image identifier according to the data structure of the digital image signal, and subjecting the coded image signal to a decoding process according to the data structure, comprising:

data analysis means for analyzing the coded image signal according to the image identifier to decide which of the following three coded signals is the coded image signal;

a coded arbitrary shape signal including, as data for display, both of coded shape bit streams obtained by coding a shape signal which represents the shape of each object as one of the components of a display image, and coded pixel value bit streams obtained by coding a pixel value signal representing the gradation of the object, a coded pixel value signal including, as data for display, only coded pixel value bit streams obtained by coding a pixel value signal representing the gradation of a display image, and a coded binary signal including, as data for display, only coded shape bit streams obtained by coding a shape signal representing a display image of binary information;

decoding means for decoding the coded pixel value bit streams to generate a decoded pixel value signal;

signal discarding means for discarding the coded image signal;

signal switch means for supplying the coded image signal to one of the decoding means and the signal discarding means according to a switch control signal;

the data analysis means supplying a first switch control signal to the signal switch means when the coded image signal is the coded pixel value signal, and supplying a second switch control signal to the signal switch means when the coded image signal is the coded arbitrary shape signal or the coded binary signal; and the signal switch means supplying the coded pixel value bit streams of the coded pixel value signal to the decoding means when it receives the first switch control signal, and supplying the coded bit streams included in the coded arbitrary shape signal and the coded binary signal to the signal discarding means when it receives the second switch control signal.

Therefore, among a coded binary signal, a coded arbitrary shape signal, and a coded rectangle signal (coded pixel value signal), only the coded rectangle signal can be selected and decoded by a decoding apparatus for decoding only the coded rectangle signal which is obtained by coding a pixel value signal for color display of image.

According to a fourteenth aspect of the present invention, there is provided a data structure for transmitting a coded image signal obtained by coding a digital image signal, including:

at least one of the following three kinds of coded bit streams: coded shape bit streams obtained by coding a shape signal which represents a display image of binary information or the shape in binary format of each object as one of the components of a display image; coded pixel value bit streams obtained by coding a pixel value signal representing the gradation of the display image or the object; and coded transparency bit streams obtained by coding a multivalued transparency signal representing the transparency of the object; and an image identifier comprising a multiple-bit code, for deciding which of the following four coded image signals is the coded image signal;
- a coded pixel value signal including, as the coded bit streams, only the coded pixel value bit streams,
- a first coded arbitrary shape signal including, as the coded bit streams, the coded shape bit streams and the coded pixel value bit streams,
- a coded binary signal including, as the coded bit streams, only the coded shape bit streams, and
- a second coded arbitrary shape signal including, as the coded bit streams, the coded shape bit streams, the coded pixel value bit streams, and the coded transparency bit streams;

wherein the image identifier and the coded bit streams are arranged so that the image identifier is followed by the coded bit streams.

Therefore, by referring to the image identifier, among various kinds of coded image signals, a coded image signal including at least one of coded shape bit streams, coded pixel value bit streams, and coded transparency bit streams can be identified.

According to a fifteenth aspect of the present invention, there is provided an image decoding method receiving, as a coded signal obtained by coding a digital image signal, a coded image signal having an image identifier according to the data structure of the digital image signal, and subjecting the coded image signal to a decoding process according to the data structure, wherein:

the coded image signal is analyzed with reference to the image identifier to decide which of the following four coded signals is the coded image signal;
- a first coded arbitrary shape signal including, as data for display, coded shape bit streams obtained by coding a shape signal representing the shape of each object as one of the components of a display image, and coded pixel value bit streams obtained by coding a pixel value signal representing the gradation of the object,
- a second coded arbitrary shape signal including, as data for display, in addition to coded shape bit streams and coded pixel value bit streams, coded transparency bit streams obtained by coding a multivalued transparency signal representing the transparency of the object,
- a coded pixel value signal including, as data for display, only coded pixel value bit streams obtained by coding a pixel value signal representing the gradation of a display image, and
- a coded binary signal including, as data for display, only coded shape bit streams obtained by coding a shape signal representing a display image of binary information;

when the input coded image signal is the first coded arbitrary shape signal, decoding of the coded shape bit streams thereof by a first decoding method, and decoding of the coded pixel value bit streams thereof by a second decoding method, are carried out according to the arrangement of these bit streams;

when the input coded image signal is the second coded arbitrary shape signal, decoding of the coded shape bit streams thereof by the first decoding method, decoding of the coded pixel value bit streams thereof by the second decoding method, and decoding of the coded transparency bit streams thereof by a third decoding method, are carried out according to the arrangement of these bit streams;

when the input coded image signal is the coded pixel value signal, only decoding of the coded pixel value bit streams thereof by the second decoding method is carried out; and when the input coded image signal is the coded binary signal, only decoding of the coded shape bit streams thereof by the first decoding method is carried out.

Therefore, for example, the first and second coded arbitrary shape signal, the coded rectangle signal (coded pixel value signal), and the coded binary signal can be decoded by the first to third decoding methods corresponding to three coded bit streams included in the second coded arbitrary shape signal.

According to a sixteenth aspect of the present invention, there is provided a data structure for transmitting a coded image signal obtained by coding a digital image signal, including:

at least one of the following three kinds of coded bit streams: coded shape bit streams obtained by coding a shape signal which represents a display image of binary information or the shape in binary format of each object as one of the components of a display image, coded pixel value bit streams obtained by coding a pixel value signal representing the gradation of the display image or the object, and coded transparency bit streams obtained by coding a multivalued transparency signal representing the transparency of the object; and an image identifier comprising a multiple-bit code, for deciding which of the following five coded image signals is the coded image signal;
- a coded pixel value signal including, as the coded bit streams, only the coded pixel value bit streams,
- a first coded arbitrary shape signal including, as the coded bit streams, the coded shape bit streams and the coded pixel value bit streams,
- a coded binary signal including, as the coded bit streams, only the coded shape bit streams,
- a second coded arbitrary shape signal including, as the coded bit streams, the coded shape bit streams, the coded pixel value bit streams, and the coded transparency bit streams, and
- a coded transparency signal including, as the coded bit streams, the coded shape bit streams and the coded transparency bit streams;

wherein the image identifier and the coded bit streams are arranged so that the image identifier is followed by the coded bit streams.

Therefore, by referring to the image identifier, among various kinds of coded image signals, a coded image signal including at least one of coded shape bit streams, coded pixel value bit streams, and coded transparency bit streams can be identified.

According to a seventeenth aspect of the present invention, there is provided an image decoding method receiving, as a coded signal obtained by coding a digital image signal, a coded image signal having an image identifier according to the data structure of the digital image signal, and subjecting the coded image signal to a decoding process according to the data structure, wherein:

the coded image signal is analyzed with reference to the image identifier to decide which of the following five coded signals is the coded image signal;
- a first coded arbitrary shape signal including, as data for display, coded shape bit streams obtained by coding a shape signal representing the shape of each object as one of the components of a display image, and coded pixel value bit streams obtained by coding a pixel value signal representing the gradation of the object,
a second coded arbitrary shape signal including, as data for display, in addition to coded shape bit streams and coded pixel value bit streams, coded transparency bit streams obtained by coding a multivalued transparency signal representing the transparency of the object,
a coded transparency signal including, as data for display, coded shape bit streams obtained by coding a shape signal representing the shape of the object, and coded transparency bit stream obtained by coding a multivalued signal representing the transparency of the object,
a coded binary signal including, as data for display, only coded shape bit streams obtained by coding a shape signal representing a display image of binary information, and
a coded pixel value signal including, as data for display, only coded pixel value bit streams obtained by coding a pixel value signal representing the gradation of a display image; and when the input coded image signal is the first coded arbitrary shape signal, decoding of the coded shape bit streams thereof by a first decoding method, and decoding of the coded pixel value bit streams thereof by a second decoding method, are carried out according to the arrangement of these bit streams;

when the input coded image signal is the second coded arbitrary shape signal, decoding of the coded shape bit streams thereof by the first decoding method, decoding of the coded pixel value bit streams thereof by the second decoding method, and decoding of the coded transparency bit streams thereof by a third decoding method, are carried out according to the arrangement of these bit streams;

when the input coded image signal is the coded transparency signal, decoding of the coded shape bit streams thereof by the first decoding method, and decoding of the coded transparency bit streams by the third decoding method, are carried out according to the arrangement of these bit streams;

when the input coded image signal is the coded binary signal, only decoding of the coded shape bit streams thereof by the first decoding method is carried out; and when the input coded image signal is the coded pixel value signal, only decoding of the coded pixel value bit streams thereof by the second decoding method is carried out.

Therefore, for example, the coded arbitrary shape signal, the coded rectangle signal (coded pixel value signal), the coded binary signal, and the coded transparency signal can be decoded by the first to third decoding methods corresponding to three coded bit streams included in the coded arbitrary shape signal with transparency information.

According to an eighteenth aspect of the present invention, there is provided a data storage medium containing a program for implementing a decoding process of a coded image signal by a computer, the program being constructed so that a decoding process according to any of the above-described image decoding methods is executed by the computer. Therefore, when the program is loaded into the computer, the decoding process according to the above-described decoding method can be implemented by software.

According to a nineteenth aspect of the present invention, there is provided a data storage medium containing a coded image signal obtained by coding a digital image signal, the coded image signal having any of the above-described data structures for image transmission. Therefore, when the stored coded image signals are read from the medium and decoded, these coded image signals, having different data structures, can be identified.

BRIEF DESCRIPTION OF THE DRAWINGS

FIGS. 1(*a*) and 1(*b*) are diagrams showing a data structure of a coded arbitrary shape signal and a data structure of a coded binary signal, respectively, as data structures for image transmission according to a first embodiment of the invention.

FIGS. 2(*a*) and 2(*b*) are diagrams showing a data structure of a coded arbitrary shape signal and a data structure of a coded binary signal, respectively, as data structures for image transmission according to a modification of the first embodiment.

FIGS. 22(a) and 22(b) show an image coding apparatus and an image decoding apparatus included in the system, respectively, and FIG. 22(c) shows a data structure of a coded image signal adopted in the system.

FIGS. 23(a) and 23(b) show an image coding apparatus and an image decoding apparatus included in the system, respectively, and FIG. 23(c) shows a data structure of a coded image signal adopted in the system.

FIGS. 24(a) and 24(b) show an image coding apparatus and an image decoding apparatus included in the system, respectively, and FIG. 24(c) shows a data structure of a coded image signal adopted in the system.

DETAILED DESCRIPTION OF THE PREFERRED EMBODIMENTS

Embodiment 1

Figure 3:
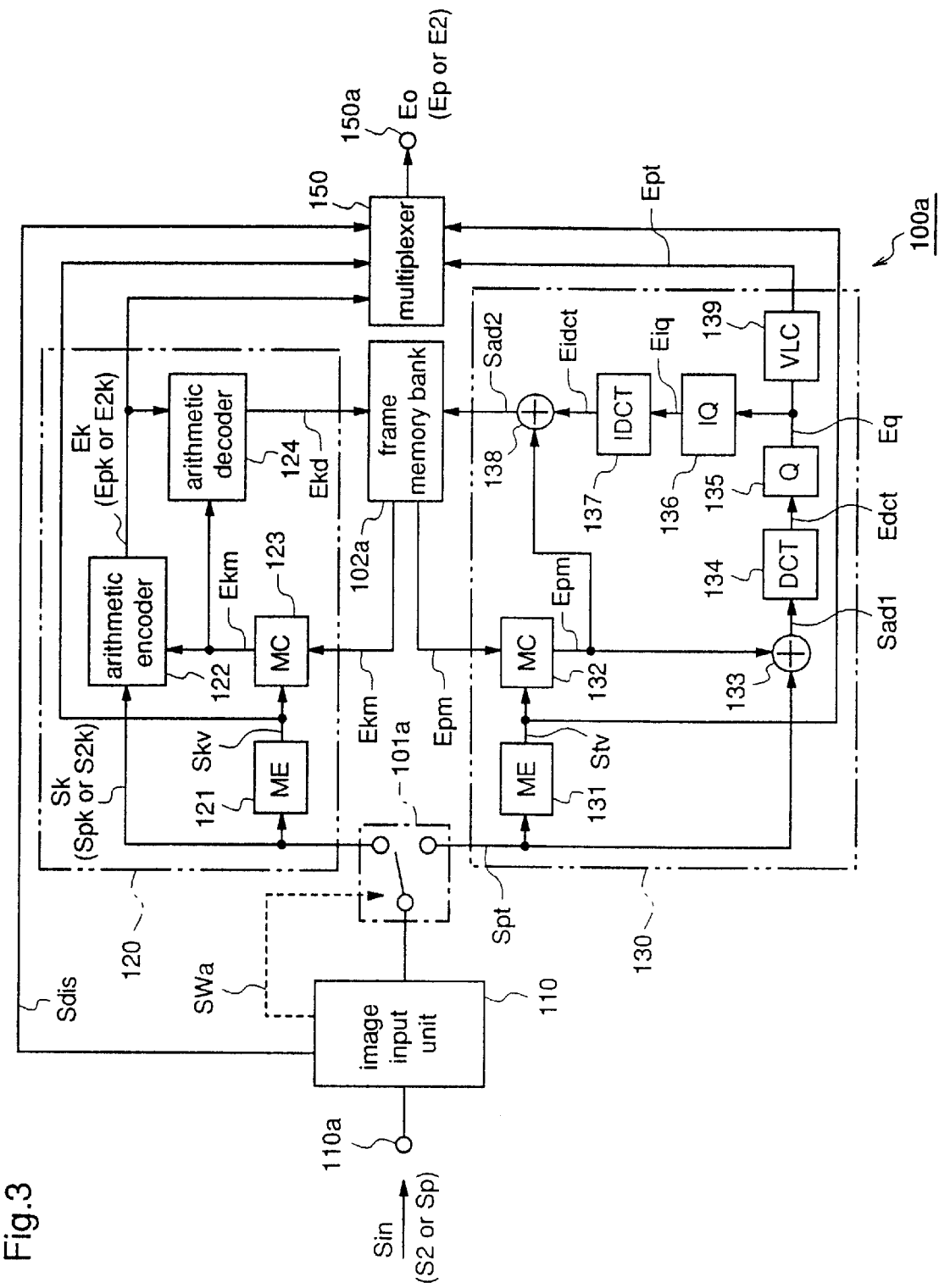
FIG. 3 is a block diagram illustrating an image coding apparatus according to a second embodiment of the invention.

FIGS. 1(a) and 1(b) are diagrams illustrating data structures for image transmission according to a first embodiment of the present invention. FIG. 1(a) shows a data structure of a coded arbitrary shape signal obtained by coding an arbitrary shape image signal corresponding to each of plural objects constituting a display image. The data structure for image transmission according to the first embodiment is applied to a coding and decoding system in which an arbitrary shape image signal is compressively coded and transmitted and, further, the coded signal is decoded and displayed. That is, in this system, the image coding method and apparatus are basically constructed to perform a coding process for the arbitrary shape image signal while the image decoding method and apparatus are basically constructed to perform a decoding process for the coded arbitrary shape signal.

In FIG. 1(a), reference numeral 500 designates a coded arbitrary shape signal obtained by coding an arbitrary shape image signal corresponding to each of plural objects constituting an image of one display image. The coded arbitrary shape signal 500 includes a 32-bit synchronous signal 501 at the beginning, a 1-bit shape identifier (image identifier) 502 that follows the signal 501, and an additional header 503 that follows the identifier 502. In the FIG., the shape identifier 502 is represented as "SID".

Further, the coded arbitrary shape signal 500 includes coded shape bit streams 51A which are obtained by coding a shape signal that represents the shape of each object as a constituent of the arbitrary shape image signal, and coded texture bit streams (coded pixel value bit streams) 52A which are obtained by coding a texture signal (pixel value signal) that comprises a luminance signal and a color difference signal for color display of each object as a constituent of the arbitrary shape image signal. To be specific, in the coded arbitrary shape signal 500, for each of blocks into which an object region including an object on a display image is divided, a coded shape bit stream 51a and a coded texture bit stream 52A are arranged in this order.

More specifically, following the header 503, arranged are a coded shape bit stream 51A1 and a coded texture bit stream 52A1 corresponding to a block A1, a coded shape bit stream 51A2 and a coded texture bit stream 52A2 corresponding to a block A2, and a coded shape bit stream 51A3 and a coded texture bit stream 52A3 corresponding to a block A3.

Further, the coded shape bit streams 51A1, 51A2, and 51A3 comprise variable-length coded data 504, 509, and 514 corresponding to shape motion vectors (in FIG. 1(a), "shape MV"); and variable-length coded data 505, 510, and 515 corresponding to binary shape signals, each representing whether pixels within the block are located inside the object or outside the object (in the FIG., "shape data"), respectively.

The coded texture bit streams 52A1, 52A2, and 52A3 comprise 5-bit coded data 506, 511, and 516 corresponding the quantization scales (in FIG. 1(a), "quantization scale"), variable-length coded data 507, 512, and 517 corresponding to texture motion vectors (in the FIG., "texture MV"); and variable-length coded data 508, 513, and 518 corresponding to quantized signals obtained by subjecting the texture signal to DCT and quantization (in the figure, "texture DCT coefficients"), respectively.

The synchronous signal 501 is a signal indicating the head of a coded arbitrary shape signal corresponding to one object, and this is a unique coded signal. The shape identifier (SID) 502 is a signal indicating whether or not both of coded shape bit streams and coded texture bit streams are included in the coded image signal. When the value of the shape identifier (SID) is 0, it indicates that both of the coded shape bit streams and the coded texture bit streams exist in the coded image signal. When SID=1, the shape identifier indicates that only the coded shape bit streams exist in the coded signal. Therefore, in the data structure of FIG. 1(a), the shape identifier (SID) 502 is 0. The header 503 includes information relating to, for example, the time to display the image of the corresponding object, the attribute of the image, and the prediction mode for coding. However, these data have no relationship with the present invention and, therefore, do not require detailed description.

The shape MV is the coded data of a motion vector which represents a motion of an image within a block between the present frame and the previous frame, and this is used for prediction of a shape signal of a specific block in the present frame from a shape signal of the corresponding block in the previous frame. Further, the shape data is obtained by subjecting a shape signal to arithmetic coding, and the quantization scale is a parameter for inversely quantizing DCT coefficients which are obtained by subjecting a texture signal to DCT and quantization. The texture MV is the coded data of a texture motion vector which represents a motion of an image within a block between the present frame and the previous frame, and this is used for prediction of a texture signal in the present frame from a texture signal in the previous frame. Further, the texture DCT coefficients are obtained by subjecting the quantized texture signal to variable-length coding.

In the coded arbitrary shape signal 500, actually, many pieces of side information (data) are arranged before the texture DCT coefficients although these data are not shown in the FIG., and these side data sometimes require a large number of bits.

FIG. 1(b) shows a data structure of a coded binary signal obtained by coding a binary image signal. In FIG. 1(b), reference numeral 600 designates a coded binary signal obtained by coding a binary image signal S2 that represents image information as a binary signal on one display image. The coded binary signal 600 includes a 32-bit synchronous signal 601 at the beginning, a 1-bit shape identifier (image identifier) 602 that follows the synchronous signal 601, and an additional header 603 that. follows the shape identifier 602. Further, the coded binary signal 600 includes coded shape bit streams 61B obtained by coding shape signals constituting the binary image signal S2. In FIG. 1(b), the shape identifier is shown as SID.

To be specific, in the coded binary shape signal 600, the coded shape bit streams 61B are successively arranged correspondingly to the respective blocks into which the display image is divided. More specifically, coded shape bit streams 61B1, 61B2, 61B3, 61B4, 6135, . . . respectively corresponding to the blocks B1, B2, B3, B4, B5, . . . are arranged in this order.

Further, the coded shape bit streams 61B1~61B5 comprise variable-length coded data 604, 606, 608, 610, and 612 corresponding to shape motion vectors (in the figure, "shape MV"), and variable-length coded data 605, 607, 609, 611, and 613 corresponding to shape signals representing the image on the display image by binary signals (in the FIG., "shape data"), respectively.

The synchronous signal 601, the shape identifier (SID) 602, and the header 603 are identical to the synchronous signal 501, the shape identifier (SID) 502, and the header 503 in the coded arbitrary shape signal 500, respectively, and the data of the blocks B1~B5 . . . are only the coded shape bit streams. Since the coded binary signal 600 includes no coded texture bit streams, the shape identifier (SID) 602 is 1.

In this first embodiment, the shape identifier (SID) 502 in the coded arbitrary shape signal 500 and the shape identifier 602 in the coded binary signal 600 are disposed, for each frame, in the coded signals 500 and 600, respectively.

As shown in FIGS. 1(a) and 1(b), the bit number of the coded data of the shape signal or the texture signal is variable because the bit number required for coding varies according to the image included in the display image or in the block of the display image. Therefore, it is impossible to predict the position of the quantization scale 506, i.e., how many bits exist between the head of the shape data 505 and the quantization scale 506. Further, whether the coded texture bit stream 52A is positioned after the coded shape bit stream 51A or not cannot be decided without the shape identifier 502. Therefore, when coding and transmitting the shape signal without the shape identifier, it is necessary to insert a dummy coded texture bit stream between the coded shape bit streams ox the adjacent blocks, but the insertion of the dummy coded texture bit stream increases the bit number when the shape signal is coded. By the way, instead of disposing at the header of each image, a shape identifier may be disposed at the head of the whole image sequence, or it may be disposed for a plurality of images.

In MPEG4, besides the arbitrary shape image signal and the binary image signal, transparency information representing the transparency of each pixel can be processed. Such transparency information is usually expressed by a signal of 3 bits or more, and it is separable into a binary signal as shape information (binary transparency signal) and a multivalued transparency signal representing the transparency information excluding the shape information. In this case, the multivalued transparency signal can be treated in the same manner as a texture signal.

Hereinafter, a description is given of a process of coding a shape signal and a texture signal, which signals are components of an arbitrary shape image signal.

Initially, with respect to a shape signal, an object region including an object on the display image is divided into plural blocks (shape blocks), and the shape signal is coded block by block. In this first embodiment, each shape block is a display region comprising 16×16 samples (pixels), and a shape signal corresponding to each shape block is coded by the arithmetic coding method employed in JBIG.

With respect to a texture signal, as described above, an object region including an object on the display image is divided into plural blocks (texture blocks), and the texture signal is compressively coded block by block. In this first embodiment, each texture block is a display region comprising 16×16 samples (pixels). In the compressive coding process, DCT and quantization are carried out as follows. The texture block is divided into four display regions (sub-blocks) each comprising 8×8 samples (pixels), and the texture signal is subjected to DCT and quantization, sub-block by sub-block. Then, quantized signals provided by the above-described process are subjected to variable-length coding to generate coded texture bit streams.

The coded shape bit streams and the coded texture bit streams so generated are multiplexed together with other required signals, thereby creating a coded arbitrary shape signal 500 having a data structure shown in FIG. 1(a).

Further, a process of coding a shape signal as a constituent of a binary image signal in JBIG is almost identical to the above-described shape signal coding method employed for MPEG4.

That is, a display image is divided into plural blocks (shape blocks), and the shape signal is coded block by block, thereby creating a coded binary signal 600 having a data structure shown in FIG. 1(b). In this first embodiment, the shape block is a display-region comprising 16×16 samples (pixels). A shape signal corresponding to each shape block is coded using the arithmetic coding method employed in JBIG.

As described above, in the first embodiment of the invention, the coded binary signal corresponding to a binary image signal includes the coded shape bit streams 61B obtained by coding the shape signal that represents the display image of binary information, and the shape identifier 602 indicating that only the coded shape bit streams are included as display data, it is possible to analyze a coded binary signal including no coded texture bit streams, by referring to the image identifier, using a data analysis method adapted to a coded signal including coded texture bit streams.

To be specific, using a data analysis method for analyzing a coded signal of an arbitrary shape image signal (coded arbitrary shape signal) including both of a shape signal and a texture signal (pixel value signal), a coded signal of a binary image signal including only a shape signal as display information (coded binary signal) can be analyzed. Therefore, even though a dummy coded pixel value bit stream is not added to each coded shape bit stream when coding the binary image signal, the coded shape bit stream of the binary signal can be decoded by the decoding process based on MPEG4. That is, without increasing the number of bits in the coding process, both the binary image signal and the arbitrary shape image signal can be decoded by an image decoding apparatus adapted to a single coding method.

As described above, the first embodiment of the invention employs, as a coded arbitrary shape signal and a coded binary signal, the coded arbitrary shape signal 500 and the coded binary signal 600 which are obtained by inter-frame predictive coding, respectively. It is needless to say that a coded arbitrary shape signal provided by intra-frame coding has a data structure excluding the shape MVs and texture MVs from the coded arbitrary shape signal 500 while a coded binary signal provided by intra-frame coding has a data structure excluding the shape MVs from the coded binary signal 600.

Further, the first embodiment of the invention employs, as a coded arbitrary shape signal and a coded binary signal, the coded arbitrary shape signal 500 in which a coded shape bit stream and a coded texture bit stream are arranged for each block, and the coded binary signal 600 in which a coded shape bit stream is arranged for each block, respectively. However, a coded signal having a data structure for image transmission according to the invention is not restricted to those shown in FIGS. 1(*a*) and 1(*b*).

For example, a coded arbitrary shape signal 500*b* having a data structure shown in FIG. 2(*a*) may be employed, which data structure comprises, for each frame, a synchronous signal 501, a shape identifier (SID) 502, an additional header 503, a shape data part 51, and a texture data part 52. Further, a coded binary signal 600*b* having a data structure shown in FIG. 2(*b*) may be employed, which data structure comprises, for each frame, a synchronous signal 601, a shape identifier (SID) 602, an additional header 603, and a shape data part 61.

The shape data part 51 is obtained by collecting, for one frame, the coded shape bit streams corresponding to the respective blocks in the coded arbitrary shape signal as shown in FIG. 1(*a*). The texture data part 52 is obtained by collecting, for one frame, the coded texture bit streams corresponding to the respective blocks in the coded arbitrary shape signal shown in FIG. 1(*a*). Further, the shape data part 61 is obtained by collecting, for one frame, the coded shape bit streams corresponding to the respective blocks in the coded binary signal shown in FIG. 1(*b*).

Embodiment 2

FIG. 3 is a block diagram illustrating an image coding apparatus according to a second embodiment of the present invention. In FIG. 3, reference numeral 10*a* designates an image coding apparatus which creates a coded image signal having a data structure for image transmission according to the first embodiment of the invention. This apparatus 100*a* is constructed as follows. When the apparatus 100*a* receives, as an input image signal Sin, a binary image signal S2 for displaying a binary image, from a scanner of a facsimile machine, it outputs a coded binary signal (E2) 600 shown in FIG. 1(*b*) as a coded image signal Eo. On the other hand, when the apparatus 100*a* receives, as an input image signal Sin, a digital image signal Sp from a video camera or an image reproduction apparatus, it outputs a coded arbitrary shape signal (Ep) 500 shown in FIG. 1(*a*) as a coded image signal Eo for each object.

The image coding apparatus 100*a* comprises an image input unit 110 which subjects the input image signal Sin to a pre-coding process to generate a binary shape signal and a texture signal, and outputs a switch control signal SWa; a shape coding unit (first coding means) 120 which subjects the shape signal to an arithmetic coding process; a texture coding unit (second coding means) 130 which subjects the texture signal to a coding process including DCT; a switch 101*a* which supplies the output from the image input unit 110 to one of the coding units 120 and 130, according to the switch control signal SWa; and a frame memory bank 102 which stores a prediction shape signal and a prediction texture signal.

The image input unit 110 is constructed as follows. The image input unit 110 distinguishes between a binary image signal from a scanner or the like and a digital video signal from a camera or an image recording/reproduction unit (VTR), and the binary image signal is subjected to thresholding to generate a shape signal while the digital video signal is subjected to a chromakey process to generate a texture signal. In the chromakey process, an arbitrary shape image signal corresponding to each object of a display image is separated from an image signal of a background image. The arbitrary shape image signal separated is processed to generate a shape signal representing the shape of the object, and a texture signal for gradation color display of the image and comprising a luminance signal and a color difference signal. Further, the image input unit 110 outputs an identifier signal (image identifier) Sdis that indicates which signal is processed between the binary image signal and the arbitrary shape image signal.

Figure 7:
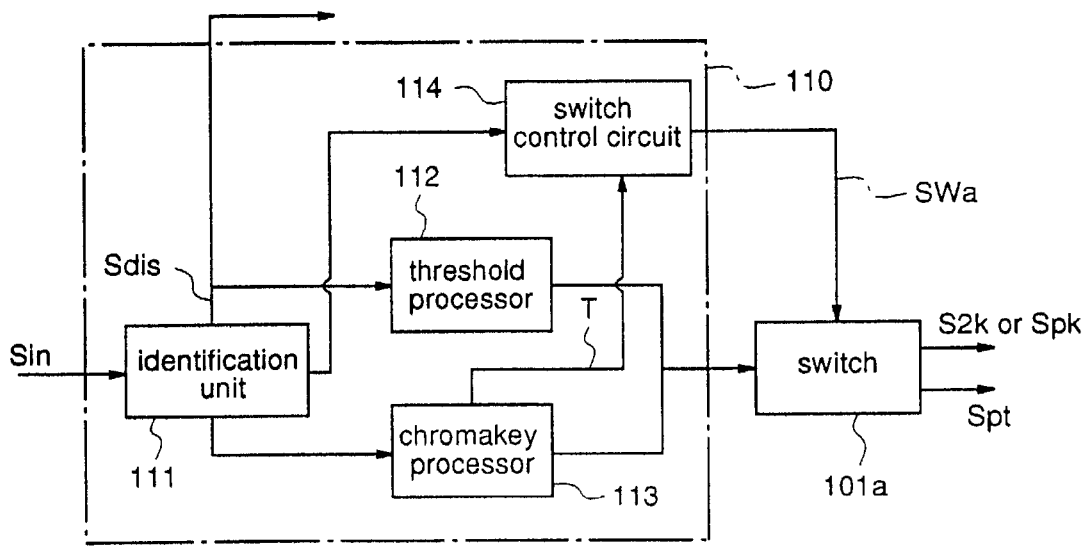
FIG. 7(*a*) is a block diagram showing an image input unit included in the image coding apparatus according to the second embodiment, and FIG. 7(*b*) is a block diagram showing a data analyzer included in the image decoding apparatus according to the third embodiment.
Figure 7:
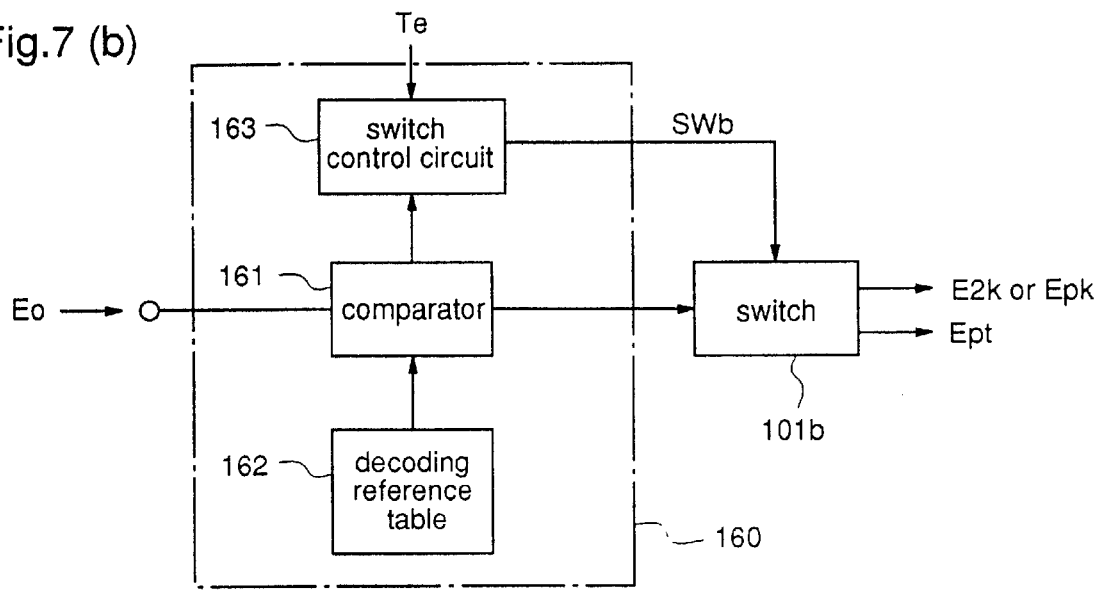

To be specific, as shown in FIG. 7(*a*), the image input unit 110 comprises an identification unit 111 which decides whether the digital image input Sin is a binary image signal or an arbitrary shape image signal, and separates this signal; a thresholding unit 112 which subjects the binary image signal to thresholding for each of blocks which divide the display image, thereby creates a binary shape signal; a chromakey unit 113 which subjects the arbitrary shape image signal to the chromakey process for each object region corresponding to each object on the display image, thereby generates a binary shape signal and a multivalued texture signal, and outputs a timing signal T at the end of the processing for the texture signal; and a switch control circuit 114 which controls the switch 101*a* by the switch control signal SWa, on the basis of the identifier signal Sdis from the identification unit 111 and the timing signal T from the chromakey unit 113.

The shape coding unit 120 comprises a shape motion detector 121 which receives the shape signal S2k corresponding to the binary image or the shape signal Spk corresponding to the arbitrary shape image, and generates a shape motion vector Skv by block matching or the like, for each block, while referring to a shape signal of a frame previous to the present frame which is being processed; and a shape motion compensator 123 which transforms the shape motion vector Skv to an address of the frame memory bank 102a, and obtains a prediction shape signal Ekm from the frame memory bank 102a, based on the address. Further, the shape coding unit 120 comprises an arithmetic encoder 122 which codes the shape signal Sk from the switch 101a, block by block, by an arithmetic coding process using the prediction shape signal Ekm, thereby generating a coded shape bit stream Ek corresponding to each block; and an arithmetic decoder 124 which decodes the coded shape bit stream Ek by an arithmetic decoding process using the prediction shape signal Ekm. The output Ekd from the arithmetic decoder 124 is stored in the frame memory bank 102a.

The texture coding unit 130 comprises a texture motion detector 131 which receives the texture signal Spt, and generates a texture motion vector Stv by block matching or the like, for each block, while referring to a texture signal of a frame previous to the present frame which is being processed; and a texture motion compensator 132 which transforms the texture motion vector Stv to an address of the frame memory bank 102a, and obtains a prediction texture signal Epm from the frame memory bank 102a, based on the address. Further, the texture coding unit 130 comprises a first adder 133 which adds the texture signal Spt and the prediction texture signal Epm; a cosine transformer 134 which subjects the output Sad1 from the adder 133 to block-by-block DCT, thereby generating OCT coefficients Edct; and a quantizer 135 which subjects the OCT coefficients Edct to block-by-block quantization.

Furthermore, the texture coding unit 130 comprises a variable-length encoder 139 which performs the output Eq from the quantizer 135 to block-by-block variable-length coding, thereby generating a coded texture bit stream Ep corresponding to each block; an inverse quantizer 136 which performs the output Eq from the quantizer 135 to inverse quantization; an inverse cosine transformer 137 which subjects the output Eiq from the inverse quantizer 136 to inverse DCT; and a second adder 138 which adds the output Eidct from the inverse cosine transformer 137 and the prediction texture signal Epm. The output Sad2 from the second adder 138 is stored in the frame memory bank 102a as a prediction texture signal.

The image coding apparatus 100a further includes a multiplexer 150 which multiplexes the shape identifier Sdis from the image input unit 110, the shape motion vector Skv and the coded shape bit stream Ek from the shape coding unit 120, and the texture motion vector Stv and the coded texture bit stream Ept from the texture coding unit 130, together with other necessary data. The multiplexer 150 is constructed as follows. When the binary image signal S2 is input, the multiplexer 150 multiplexes the shape identifier Sdis and the coded shape bit stream from the shape coding unit 120, together with other necessary data, and outputs the coded binary signal (E2) 600 shown in FIG. 1(b). When the arbitrary shape image signal Sp is input, the multiplexer 150 multiplexes the shape identifier Sdis, the coded shape bit stream from the shape coding unit 120, and the coded texture bit stream from the texture coding unit 130, together with other necessary data, and outputs the coded arbitrary shape signal (Ep) 500 shown in FIG. 1(a).

A description is given of the operation of the image coding apparatus 100a.

Figure 4:
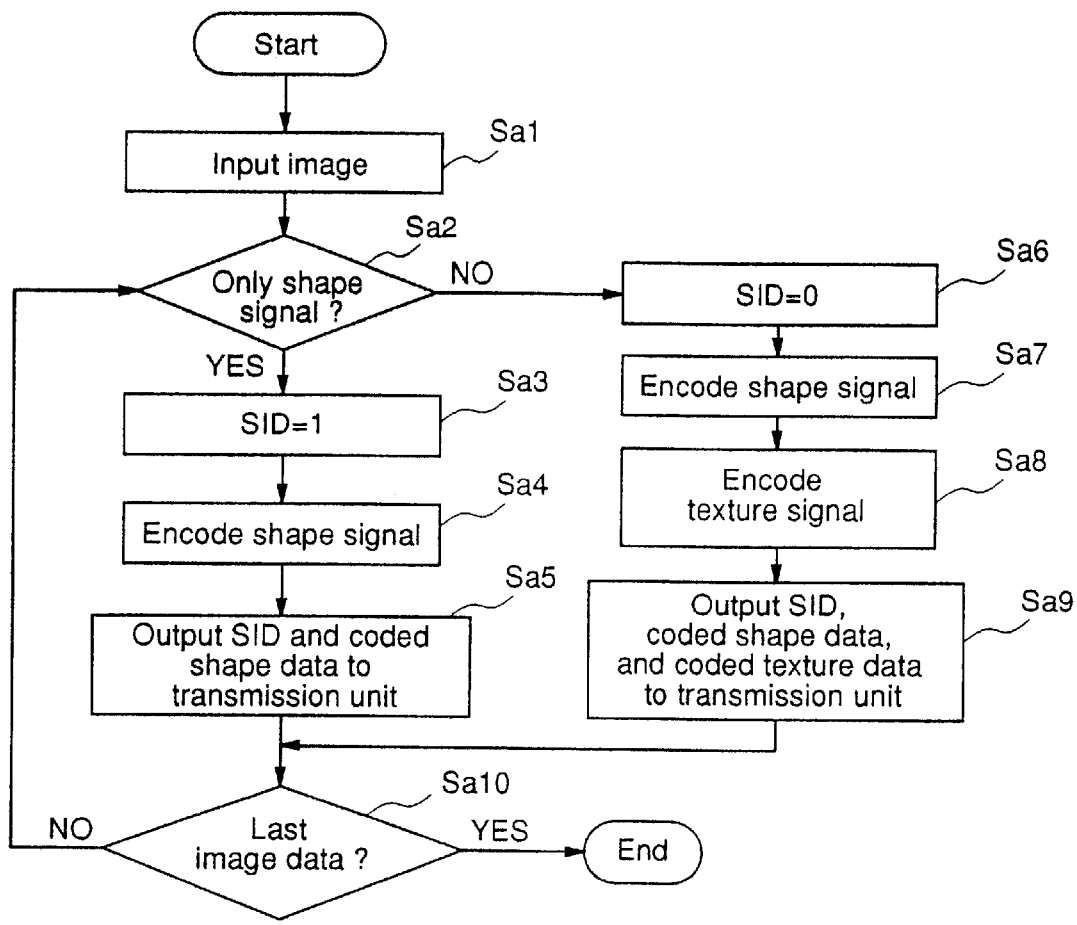
FIG. 4 is a flowchart for explaining a coding process by the image coding apparatus according to the second embodiment.

FIG. 4 is a flowchart showing the coding process by the image coding apparatus according to the second embodiment of the invention.

When a digital image input Sin is input to the image coding apparatus 100a (Step Sa1), the image input unit 110 decides whether the digital image input Sin is a binary image signal including only a shape signal and output from a scanner, or a digital video signal including both of a shape signal and a texture signal and output from a camera or an image recording/reproduction apparatus (VTR) (Step Sa2).

When the digital image input Sin is a binary image signal, the image input unit 110 generates, as a shape identifier (SID), a 1-bit identifier signal of which value is "1" (Step Sa3) and extracts a binary shape signal S2k by thresholding of the digital image input Sin. At this time, the switch 101a is controlled by the switch control signal SWa so that the shape signal S2k is input to the shape coding unit 120, and the shape coding unit 120 performs arithmetic coding of the shape signal S2k (Step Sa4).

That is, in the shape coding unit 120, the shape motion detector 121 generates a shape motion vector Skv from the shape signal S2k for each block. To be specific, the shape signal of the present frame, which is currently processed, is compared with the shape signal of the previous frame by block matching, thereby detecting a motion of image between the present frame and the previous frame, and the motion information is provided as the motion vector Skv. This motion detection is described in more detail in, for example, U.S. Pat. No. 4,897,720. When the shape motion vector Skv is input to the shape motion compensator 123, the compensator 123 transforms the shape motion vector Skv to an address of the frame memory bank 102a, and fetches a prediction shape signal Ekm from the frame memory bank 102a, according to the address. When the prediction shape signal Ekm and the shape signal S2k from the image input unit 110 are input to the arithmetic encoder 122, the arithmetic encoder 122 subjects the shape signal S2k to an arithmetic coding process based on the prediction shape signal Ekm, and outputs shape data (coded shape bit stream 61B) E2k obtained by coding the shape signal S2k. The arithmetic coding method is described in more detail in the specification of JBIG standard. At this time, in the arithmetic decoder 124, the shape data E2k is reproduced as decoded shape data Ekd in an arithmetic decoding process using the prediction shape signal Ekm, and the decoded shape data Ekd is stored in the frame memory bank 102a.

Thereafter, the shape identifier Sdis, the shape motion vector Skv, and the shape data E2k are multiplexed in the multiplexer 150, and the multiplexed data is output from the output terminal 150a toward a data transmission unit (Step Sa5).

In the image coding apparatus 100a, a control unit (not shown) decides whether or not the data processed through Steps Sa2~Sa5 is the data of the last block in the last frame (Step Sa10) and, when the processed data is not the data of the last block in the last frame, the process by the image coding apparatus 100a returns to Step Sa2. When it is the data of the last block in the last frame, the image coding process is ended.

On the other hand, when it is decided in Step Sa2 that the digital image input Sin is an arbitrary shape image signal Sp including a shape signal and a texture signal, a 1-bit identifier signal Sdis, of which value is "0", is generated as a shape identifier (SID) in the image input unit 110 (Step Sa6) and, furthermore, a-shape signal Spk and a texture signal Spt are generated by the chromakey process of the digital image input Sin. At this time, the switch 101a is controlled by the switch control signal SWa output from the image input unit 110 so that the shape signal Spk is input to the shape coding unit 120 while the texture signal Spt is input to the texture coding unit 130.

Thereby, in the shape coding unit 120, the shape signal Spk of the arbitrary shape image signal Sp is subjected to arithmetic coding in the same manner as the above-described arithmetic coding of the shape signal S2k of the binary image signal S2 (Step Sa7). In the texture coding unit 130, the texture signal Spt is subjected to coding (Step SaB).

More specifically, in the texture coding unit 130, the texture motion detector 131 extracts a texture motion vector Stv from the texture signal Spt, and the texture motion compensator 132 obtains a prediction texture signal Epm from the frame memory bank 102a according to the motion vector Stv. The first adder 133 obtains difference data Sad1 between the prediction texture signal Epm and the texture signal Spt of the input arbitrary shape image signal. This difference data is transformed to DCT coefficients Edct in a frequency domain by the cosine transformer 134, and the DCT coefficients Edct are quantized by the quantizer 135. Further, the quantized DOCT coefficients Eq are subjected to variable-length coding by the variable-length encoder 139 and sent to the multiplexer 150. To the multiplexer 150, the texture motion vector Stv of the corresponding block is input as well.

The quantized DOCT coefficients Eq are subjected to inverse quantization by the inverse quantizer 136, and the output Eiq from the inverse quantizer 136 is subjected to inverse cosine transformation by the inverse cosine transformer 137 and sent to the second adder 138, as a reproduced texture signal Eidct. In the second adder 138, the reproduced texture signal Eidct and the prediction texture signal Epm are added, and the sum Sad2 is stored in the frame memory bank 102a.

When the digital image input is an arbitrary shape image signal, the multiplexer 150 is supplied with the shape identifier Sdis from the image input unit 110, the shape motion vector Skv and the shape data Epk from the shape coding unit 120, the texture motion vector Stv and the texture DCT coefficients Ept from the texture coding unit 130, and other necessary signals. In the multiplexer 150, these data are arranged in a prescribed order, and the coded arbitrary shape signal (Ep) 500 shown in FIG. 1(a) is output from the multiplexer 150 (Step Sa9).

Furthermore, as described with respect to the binary image signal, in the image coding apparatus 100a, a control unit (not shown) decides whether the data processed through Steps Sa6~Sa9 is data of the last block in the last frame (Step Sa10). When the processed data is not the data of the last block in the last frame, a shape signal and a texture signal corresponding to the next block are subjected to Steps Sa6~Sa9. When the processed data (shape signal and texture signal) is the data of the last block in the last frame, the coding process by the image coding apparatus 100a is completed.

The output terminal 150a of the multiplexer 150 is connected to a transmission unit for transmitting the coded data or a storage unit for storing the coded data, although these units are not shown in the FIG.

As described above, according to the second embodiment of the invention, the image coding apparatus 100a for coding a digital image input is constructed so that it decides whether the digital image input is a binary image signal or an arbitrary shape image signal, and outputs an identifier signal (shape identifier) Sids according to the result of the decision, together with the coded image signal. Therefore, in a decoding apparatus for decoding a coded signal of a binary image signal or an arbitrary shape image signal, when an input coded signal is a coded binary signal including no coded texture bit streams, this is detected by the above-described shape identifier, and the content of the decoding process can be changed from the process adapted to a coded arbitrary shape signal including both of coded shape bit streams and coded texture bit streams to the process adapted to the coded binary signal.

Therefore, when coding a binary image signal including only a shape signal, it is not necessary to add a dummy coded texture bit stream to each coded shape bit stream, which dummy stream enables the binary shape signal to be decoded by a decoding method corresponding to a coded arbitrary shape signal. As a result, it is possible to create a coded image signal having a data structure which enables coded signals according to different coding methods to be decoded by an image decoding apparatus that employs only a single coding method, without increasing the code quantity required for the coding process.

Embodiment 3

Figure 5:
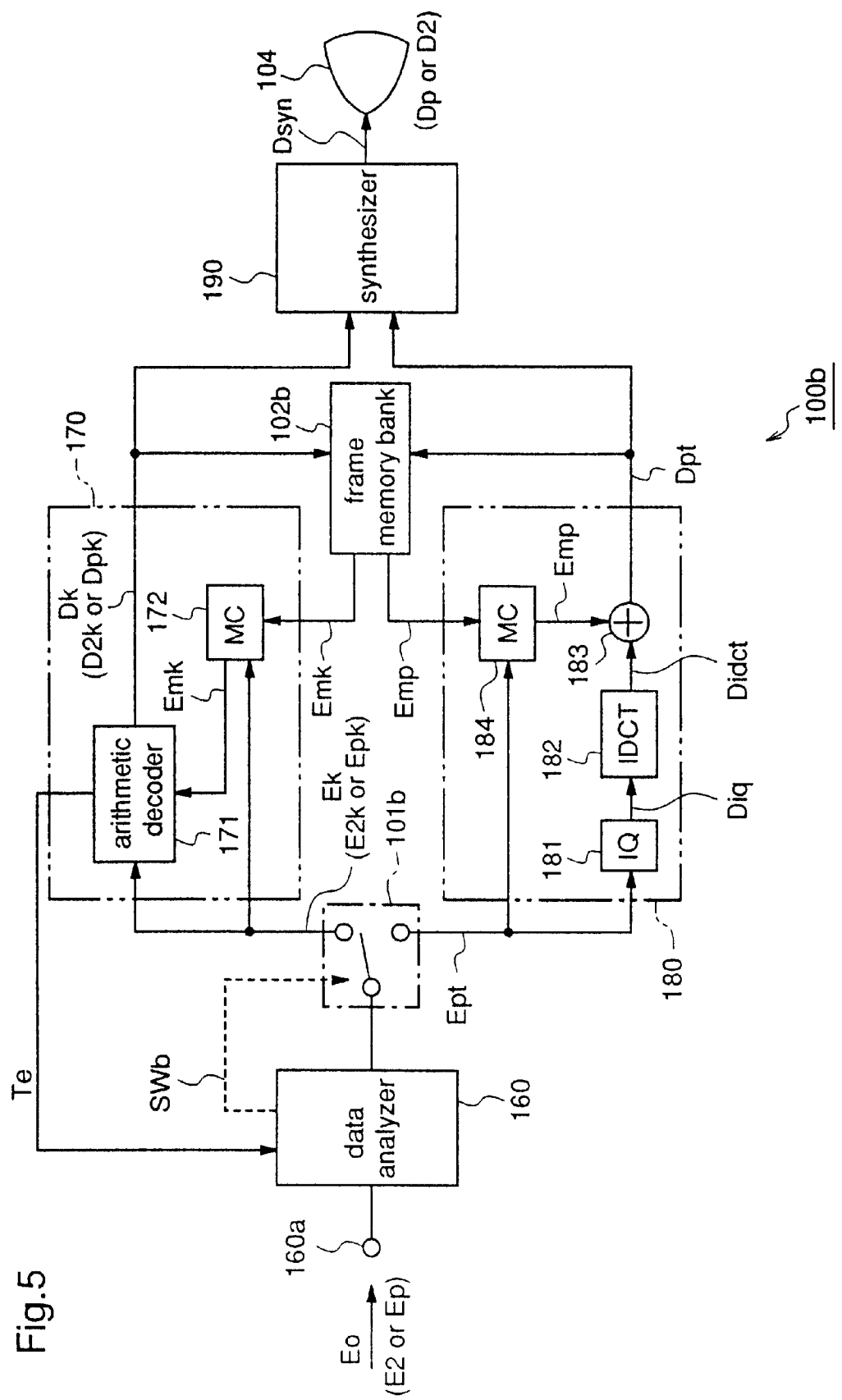
FIG. 5 is a block diagram illustrating an image decoding apparatus according to a third embodiment of the invention.

FIG. 5 is a block diagram illustrating an image decoding apparatus according to a third embodiment of the present invention. In FIG. 5, reference numeral 100b designates an image decoding apparatus which performs decoding of coded data having a data structure for image transmission according to the first embodiment of the invention. This apparatus 100b is constructed as follows. When the apparatus 100b receives a coded binary signal (E2) 600 as shown in FIG. 1(b) as coded data Eo, it outputs a decoded binary signal D2 as decoded image data Dsyn.

On the other hand, when the apparatus 100b receives a coded arbitrary shape signal (Ep) 500 as shown in FIG. 1(a) as coded data Eo, it outputs a decoded arbitrary shape signal Dp as decoded image data Dsyn, for each object.

More specifically, the image decoding apparatus 100b comprises a data analyzer 160 which analyzes the coded data Eo input to the input terminal 160a and outputs a switch control signal SWb according to the analysis result; a shape decoding unit (first decoding means) 170 which subjects the shape data (the coded shape bit stream obtained by coding the shape signal) to an arithmetic decoding process; a texture decoding unit (second decoding means) 180 which subjects the texture DCT coefficients Ept to a decoding process including inverse DCT; a switch 101b which supplies the coded signal analyzed by and output from the data analyzer 160 to one of the decoding units 170 and 180, according to the switch control signal; and a frame memory bank 102 which stores a prediction shape signal and a prediction texture signal.

When decoding of a coded shape bit stream corresponding to one block has ended, the shape decoding unit 170 detects the end of the coded shape bit stream Ek (E2k or Epk) corresponding to the block, and outputs an end detection signal Te corresponding to the block toward the data analyzer 160.

Further, the data analyzer 160 analyzes the input coded data to examine the 1-bit shape identifier that follows the 32-bit synchronous signal at the head, which shape identifier is one of the shape identifier 502 in the coded arbitrary shape signal 500 shown in FIG. 1(a) and the shape identifier 602 in the coded binary signal 600 shown in FIG. 1(b). When the set value of the shape identifier (SID) is 0, the data analyzer 160 controls the switch 101b with the switch control signal SWb so that the coded shape bit stream in the input coded signal is input to the shape decoding unit 170 and the coded texture bit stream in the coded signal is input to the texture decoding unit 180. When the set value of the shape identifier (SID) is 1, the data analyzer 160 controls the switch 101b with the switch control signal SWb so that the input coded data is input to the shape decoding unit 170.

To be specific, as shown in FIG. 7(b), the data analyzer 160 comprises a table storage unit 162 which contains a decoding reference table; a comparator 161 which compares the bit stream of the input coded signal with the bit stream of the decoding reference table, thereby identifying the shape identifier, the coded shape bit stream, and the coded texture bit stream, which are included in the coded data; and a switch control circuit 163 which controls the switch 101b by the switch control signal SWb, according to the comparison result from the comparator 161 and the end detection signal Te.

The shape decoding unit (first decoding means) 170 comprises a shape motion compensator 172 which receives the shape motion vector corresponding to the binary image or an arbitrary shape motion vector corresponding to the arbitrary shape image, generates an address of the prediction shape signal stored in the frame memory bank 102b according to the motion vector, and obtains the prediction shape signal Emk from the frame memory bank 102b; and an arithmetic decoder 171 which decodes the input shape data Ek with reference to the prediction shape signal Emk to generate a reproduced shape signal (decoded shape signal) Dk. The reproduced shape signal Dk is stored in the frame memory bank 102b. When decoding of a coded shape bit stream corresponding to one block has ended, the arithmetic decoder 171 detects the end of the coded shape bit stream Ek (E2k or Epk) corresponding to the block, and outputs an end detection signal Te. The motion compensation is described, in more detail, in U.S. Pat. No. 5,157,742, and the arithmetic decoding is described in the specification of JBIG.

The texture decoding unit (second decoding means) 180 comprises a texture motion compensator 184 which generates, according to the texture motion vector, an address of the prediction texture signal, and obtains the prediction texture signal Emp from the frame memory bank 102b using the address; an inverse quantizer 181 which receives the quantization scale and the DCT coefficients in the coded texture bit stream, and subjects the DCT coefficients to inverse quantization; an inverse cosine transformer 182 which subjects the inversely quantized DCT coefficients Diq to inverse cosine transformation; and an adder 183 which adds the prediction texture signal Emp and the inversely cosine-transformed signal Didct, and outputs a reproduced texture signal (decoded texture signal) Dpt. The reproduced texture signal Dpt from the adder 183 is stored in the frame memory bank 102b.

The image decoding apparatus 100b further includes a synthesizer 190 which synthesizes the reproduced texture signal Dpt and the corresponding reproduced shape signal Dk with desired image data, respectively, and outputs synthesized image data Dsyn including the reproduced arbitrary shape signal Dp corresponding to the coded arbitrary shape signal Ep toward the display unit 104. Further, the synthesizer 190 outputs the reproduced binary signal D2 corresponding to the coded binary signal E2. Although the signals output from the synthesizer 190 are input to the display unit 104, the signals may be input to a printer (not shown). Further, in the synthesizer 190, the reproduced binary signal D2 may be synthesized with another arbitrary shape image signal.

In this third embodiment, when decoding the arbitrary shape image signal, with respect to pixels wherein the reproduced shape signal is zero, pixel values in the reproduced texture signal are replaced with pixel values of a prescribed image. The prescribed image is an image prepared in advance at the receiving end, or an image reproduced by another image decoding apparatus.

A description is given of the operation of the image decoding apparatus so constructed.

Figure 6:
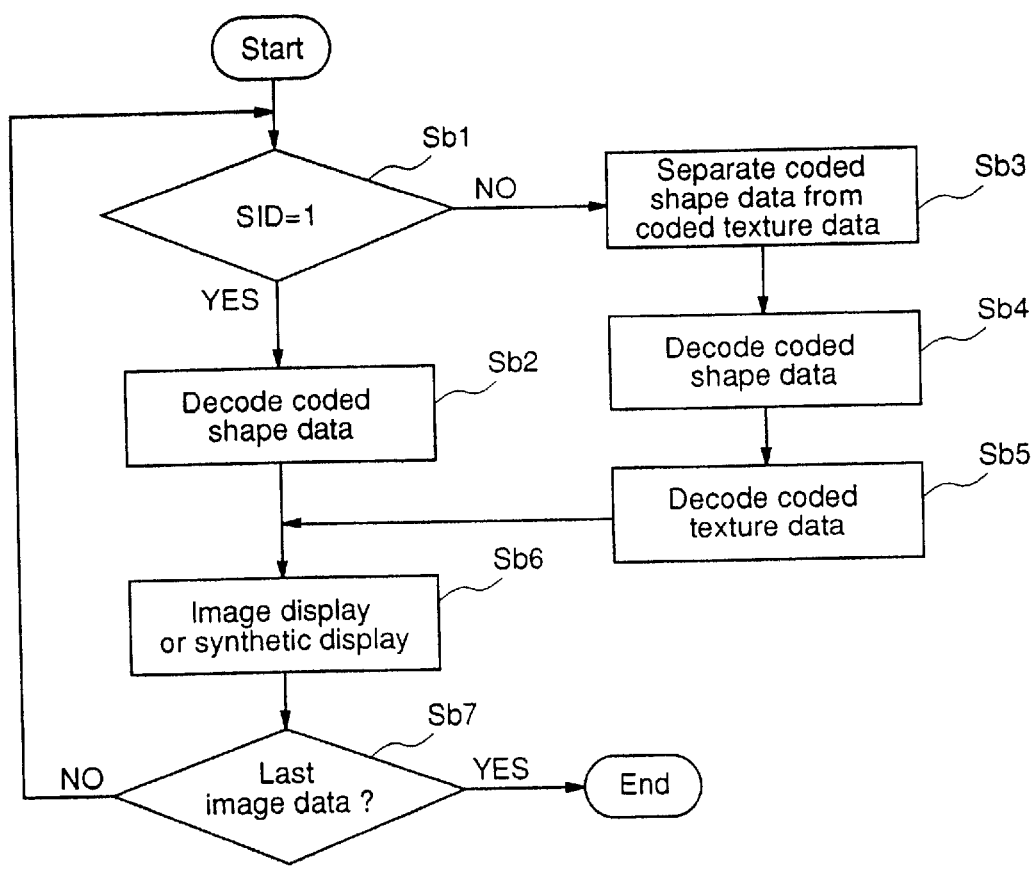
FIG. 6 is a flowchart for explaining a decoding process by the image decoding apparatus according to the third embodiment.

FIG. 6 is a flowchart of the decoding process by the image decoding apparatus 100b according to the third embodiment of the invention. When a coded image signal having a data structure shown in FIG. 1(a) or 1(b) is input to the image decoding apparatus 100b, the data analyzer 160 analyzes the 1-bit shape identifier that follows the 32-bit synchronous signal, and decides whether the value of the shape identifier (SID) is 1 or not (Step Sb1).

When the result of the decision is SID=1, the input coded image signal Eo is a coded binary signal E2 that includes only coded shape bit streams as image information. So, the data analyzer 160 controls the switch 101b with the switch control signal SWb so that the coded shape bit stream corresponding to each block of the coded binary signal is always input to the shape decoding unit 170. Thereby, in the shape decoding unit 170, the coded shape bit streams in the coded binary signal are subjected to decoding (Step Sb2).

More specifically, the shape motion vector MV is input to the shape motion compensator 172 and the arithmetic decoder 171. Then, the shape motion compensator 172 generates an address of the prediction shape signal stored in the frame memory bank 102b according to the shape motion vector MV, and obtains the prediction shape signal Emk from the frame memory bank 102b. When the prediction shape signal Emk is input to the arithmetic decoder 171, the arithmetic decoder 171 performs arithmetic decoding of the coded shape bit stream E2k with reference to the prediction shape signal Emk, thereby generating a decoded binary signal D2k. The decoded binary signal D2k is output toward the frame memory bank 102b and the synthesizer 190 and, from the synthesizer 190, it is output toward the display unit 104 for image display (Step Sb6). The decoded binary signal may be displayed after being synthesized with another arbitrary shape image signal.

Thereafter, it is decided whether the coded binary signal is data of the last block in the last frame (Step Sb7). When the coded binary signal is not data of the last block in the last frame, a coded binary signal corresponding to the next block is subjected to Steps Sb1, Sb2, and Sb6. When the coded binary signal is data of the last block in the last frame, decoding of the coded binary signal is ended.

On the other hand, when the result of the decision in Step Sb1 is SID=0, the input coded image signal includes, as image information, coded shape bit streams and coded texture bit streams. Therefore, the data analyzer 160 controls the switch 101b with the switch control signal SWb so that the coded shape bit stream corresponding to each block of the coded arbitrary shape signal is input to the shape decoding unit 170 while the coded texture bit stream corresponding to each block is input to the texture decoding unit 180. Thereby, the coded shape bit stream and the coded texture bit stream are separated from each other (Step Sb3), and the coded shape bit stream is decoded by the shape decoding unit 170 while the coded texture bit stream is decoded by the texture decoding unit 180 (Steps Sb4 and Sb5).

To be specific, the coded shape bit stream Epk is decoded by the shape decoder 170, like the coded shape bit stream E2k of the binary image signal. When decoding of the coded shape bit stream Epk corresponding to one block has ended, the arithmetic decoder 171 detects the end of the coded shape bit stream Epk corresponding to the block and outputs an end detection signal Te toward the data analyzer 160. Receiving the end detection signal Te, the data analyzer 160 controls the switch 101b with the switch control signal SWb so that the input coded image signal is input to the texture decoding unit 180.

Thereby, the coded texture bit stream Ept is sent from the data analyzer 160 to the texture decoding unit 180. In the decoding unit 180, the quantization scale and the DCT coefficients in the bit stream are input to the inverse quantizer 181, and the DCT coefficients are subjected to inverse quantization. Thereafter, the inversely quantized signals Diq are subjected to inverse cosine transformation by the inverse cosine transformer 182.

Meanwhile, the texture motion vector MV is input to the texture motion compensator 184. The compensator 184 generates an address for obtaining a prediction texture signal according to the texture motion vector MV, and obtains the prediction texture signal Emp from the frame memory bank 102b using the address.

The adder 183 performs addition of the output Didct from the inverse cosine transformer 182 and the prediction texture signal Emp, and outputs the decoded texture signal Dpt. The decoded texture signal Dpt is input to the frame memory bank 102b and the synthesizer 190. The synthesizer 190 synthesizes the decoded and reproduced texture signal Dpt and the corresponding decoded and reproduced shape signal Dk with a desired image to generate synthesized image data Dsyn. When decoding of the coded texture bit stream has ended, the data analyzer 160 detects the end of the coded texture bit stream, and controls the switch 101b by the switch control signal SWb so that the input coded image signal is input to the shape decoding unit 170.

Further, the reproduced and synthesized data is output from the synthesizer 190 toward the display unit 104 for image display (Step Sb6).

Thereafter, it is decided whether the coded arbitrary shape signal is data of the last block in the last frame (Step Sb7). When the coded arbitrary shape signal is not data of the last block in the last frame, a coded arbitrary shape signal of the next block is subjected to Steps Sb3~Sb7. When the coded arbitrary shape signal is data of the last block in the last frame, decoding of the coded arbitrary shape signal is ended.

In this third embodiment, with respect to pixels wherein the reproduced shape signal is zero, pixel values in the decoded and reproduced texture signal are replaced with pixel values of a prescribed image. The prescribed image is an image prepared in advance at the receiving end, or an image reproduced by another image decoding apparatus.

As described above, according to the third embodiment of the invention, the image decoding apparatus 100b includes the data analyzer 160 which analyzes the input coded data. The data analyzer 160 detects a shape identifier which indicates whether the input coded image signal is a coded binary signal Including only coded shape bit streams as image information or a coded arbitrary shape signal including both of coded shape bit streams and coded texture bit streams and, according to the value of the shape identifier, the analyzer 160 controls the switch 101b so that the bit stream of the input coded signal is input to one of the shape decoding unit 170 and the texture decoding unit 180. So, even though a dummy coded texture bit stream is not added to each coded shape bit stream when creating a coded binary signal, it is possible to perform decoding of the coded binary signal by a decoding method corresponding to a coded arbitrary shape signal. Therefore, when both of a binary image signal and an arbitrary shape image signal, which have different data structures, are coded by a single coding method and these coded signals are decoded by a single decoding method, it is possible to efficiently perform coding, transmission, and decoding of the binary image signal with suppressed bit number.

Embodiment 4

Figure 8:
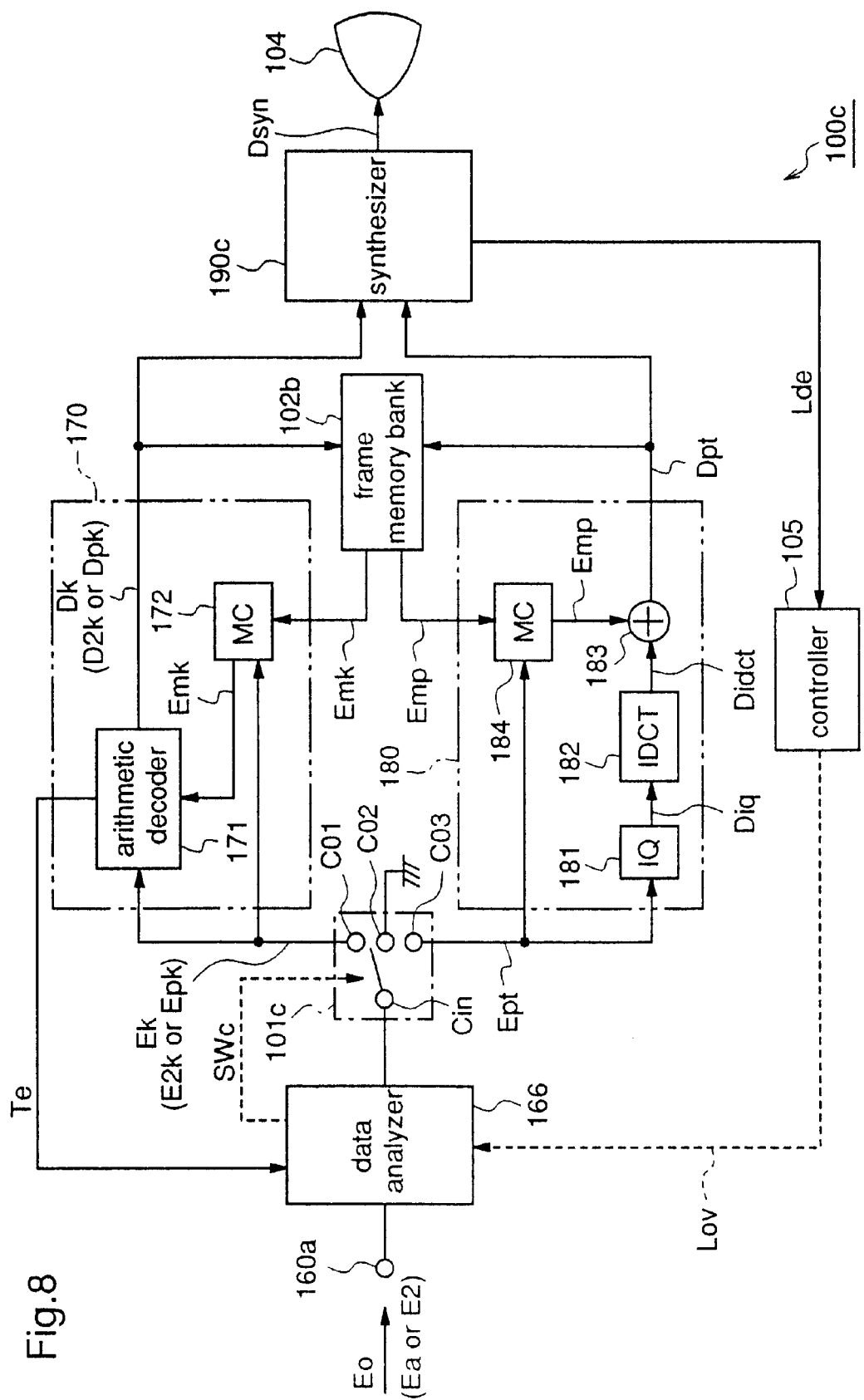
FIG. 8 is a block diagram illustrating an image decoding apparatus according to a fourth embodiment of the invention.

FIG. 8 is a block diagram illustrating an image decoding apparatus according to a fourth embodiment of the present invention. In FIG. 8, reference numeral 100c designates an image decoding apparatus according to this fourth embodiment. The image decoding apparatus 100c includes a controller 105, in addition to the structure of the image decoding apparatus 100b according to the third embodiment. The controller 105 monitors the load on the decoding process of the texture decoding unit 180 according to the operating state of the synthesizer 190c, and outputs an overload detection signal Lov when the load exceeds a prescribed value. Further, the image decoding apparatus 100c includes, instead of the data analyzer 160 according to the third embodiment, a data analyzer 166 which generates a switch control signal SWc according to the end detection signal Te and the overload detection signal Lov. The other structure of the data analyzer 166 is identical to that of the data analyzer 160. Further, the image decoding apparatus 100c includes, instead of the switch 101b according to the third embodiment, a switch 101c which has an input terminal Cin, to which a coded image signal from the data analyzer 166 is input, and three output contacts Co1, Co2 and Co3, and selects one of the three contacts in response to the switch control signal SWc. The output contact Co1 is connected to the input of the arithmetic decoder 171, the output contact Co2 is grounded, and the output contact Co3 is connected to the input of the inverse quantizer 181 and to the input of the motion compensator 184.

Furthermore, the controller 105 has a plurality of functions for managing the whole decoding apparatus. One of the functions is as follows. When synthesis of an image corresponding to one frame is not completed within a time interval for image display of one frame, which interval is set in advance, the controller 105 detects that the load Lde on the decoding process in the texture decoding unit 180 is heavy and outputs the switch control signal SWc.

Receiving the overload detection signal Lov, the data analyzer 166 controls the switch 101c by the switch control signal SWc so that the input terminal Cin is switched between the first output contact Co1 and the second output contact Co2. More specifically, the switch 101c is controlled so that the coded texture bit stream Ept of the coded arbitrary shape signal Ep is input to the grounded end while the coded shape bit stream Ekt of the coded arbitrary shape signal Ep is input to the arithmetic decoder 171.

Further, in this fourth embodiment, the synthesizer 190c has the following function in addition to the function of the synthesizer 190 according to the third embodiment. That is, when the decoding process of the coded texture signal is heavily loaded as described above, the synthesizer 190c synthesizes the decoded shape signal corresponding to the present frame being processed with the decoded texture signal of the previous frame, instead of the decoded texture signal corresponding to the present frame.

When the data analyzer 166 is not supplied with the overload detection signal Lov, i.e., when the image decoding process is not heavily loaded, the data analyzer 166 controls the switch 101c by the switch control signal SWc so that the input terminal Cin is connected to one of the first output contact Co1 and the third output contact Co3. Thereby, the image decoding apparatus 100c according to the fourth embodiment performs an image decoding process identical to that of the image decoding apparatus 100b according to the third embodiment.

A description is given of the operation of the image decoding apparatus 100c according to the fourth embodiment.

Since the fundamental operation of the image decoding apparatus 100c is identical to that of the image decoding apparatus 100b according to the third embodiment, only the operation relating to the controller 105 will be described hereinafter.

For example, when the coded arbitrary shape signal Ep is being decoded in the texture decoding unit 180, if synthesis of the decoded image signal corresponding the frame being processed is not completed by the time when the image of this frame is to be displayed, the controller 105 detects that the image decoding process is heavily loaded and outputs the overload detection signal Lov toward the data analyzer 166. Then, the switch 101c is controlled by the switch control signal SWc from the data analyzer 166, whereby the coded shape bit stream Epk of the coded arbitrary shape signal Ep from the data analyzer 166 is supplied through the first output contact Co1 of the switch 101c to the shape decoding unit 170 while the coded texture bit stream Ept of the coded arbitrary shape signal Ep is supplied through the second output contact Co2 of the switch 101c toward the ground.

Further, instead of the decoded texture signal corresponding to the present frame being processed, the decoded texture signal of the previous frame is synthesized with the decoded shape signal corresponding to the present frame.

As described above, according to the fourth embodiment of the invention, the load of the arithmetic processor in the image decoding apparatus is monitored and, when decoding of the arbitrary shape image signal corresponding to each frame is late for the timing to display the image corresponding to each frame, only the coded shape bit stream in the coded arbitrary shape signal is reproduced, and image display is performed using a coded texture bit stream which has previously been reproduced. Therefore, even when the decoding process is heavily loaded, it is possible to realize image display in which the displayed image is not discontinued and the image flows smoothly.

In this fourth embodiment, as a method of detecting the load on the decoding process, when the decoded image signal corresponding to each frame is late for the timing to display the image corresponding to the frame, it is decided that the decoding process is heavily loaded. However, She load detecting method is not restricted thereto.

Further, in this fourth embodiment, when the decoding process is over-loaded, only the coded shape bit stream in the coded arbitrary shape signal is decoded and the coded texture bit stream in the coded arbitrary shape signal is not decoded. However, only the coded texture bit stream may be decoded without decoding the coded shape bit stream.

In this case, instead of the decoded shape signal corresponding to the present frame being processed, the decoded shape signal corresponding to the previous frame is synthesized with the decoded texture signal corresponding to the present frame.

Embodiment 5

Figure 9:
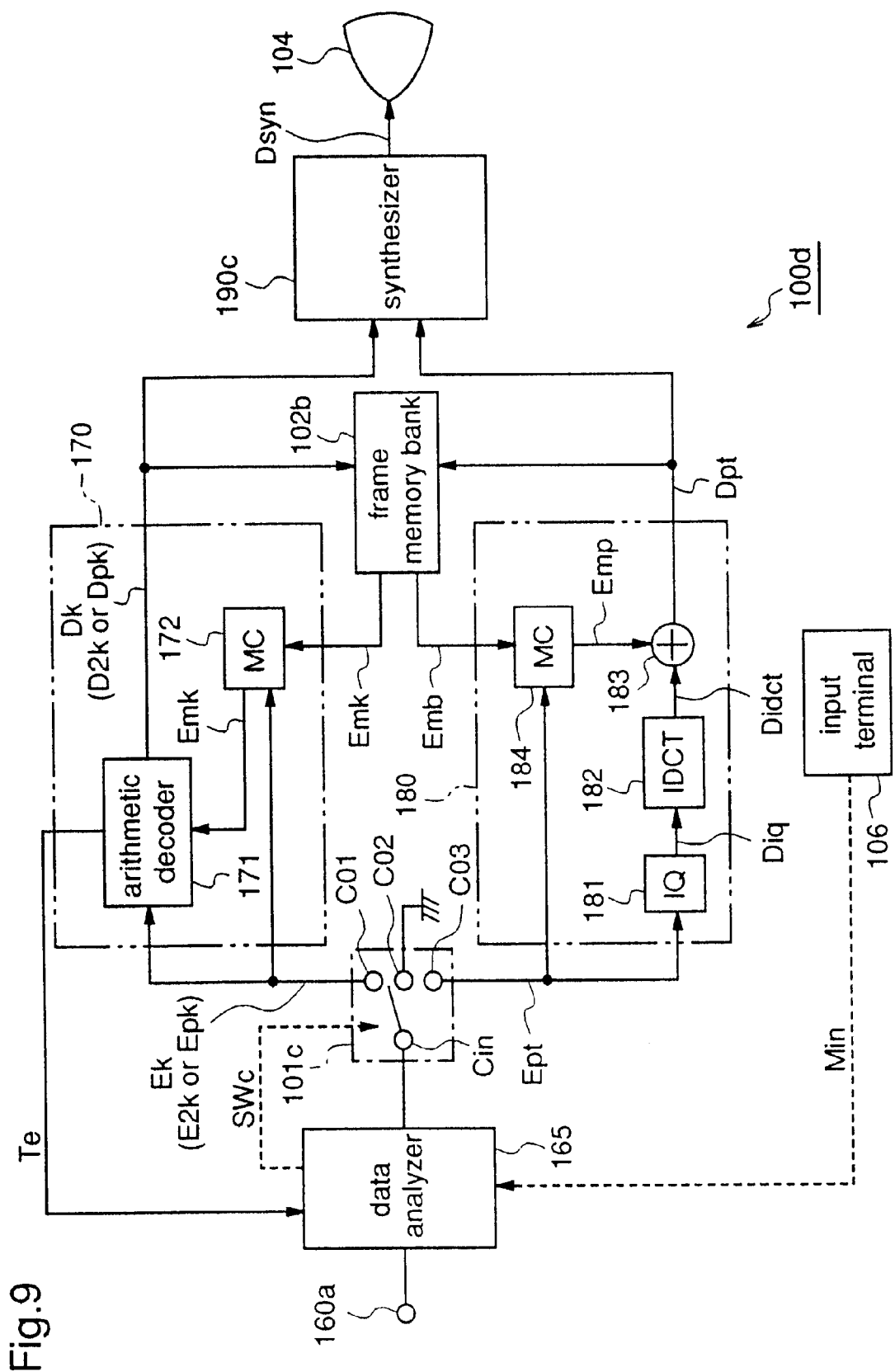
FIG. 9 is a block diagram illustrating an image decoding apparatus according to the fifth embodiment of the invention.

FIG. 9 is a block diagram illustrating an image decoding apparatus according to a fifth embodiment of the present invention. In FIG. 9, reference numeral 100d designates an image decoding apparatus according to this fifth embodiment. The image decoding apparatus 100d includes an input terminal 106, such as a mouse or a remote controller, for inputting a manual control signal Min from the outside to the image decoding apparatus 100d, instead of the controller 105 for detecting the load on the decoding process, included in the image decoding apparatus 100c according to the fourth embodiment. The manual control signal Min from the input terminal 106 is input to the data analyzer 165, instead of the overload detection signal Lov. Other parts are identical to those described for the fourth embodiment.

Receiving the manual control signal Min, the data analyzer 165 controls the switch 101c by the switch control signal SWc so that the input terminal Cin is connected to one of the first output contact Co1 and the second output contact Co2. More specifically, the switch 101c is controlled so that the coded texture bit stream Ept of the coded arbitrary shape signal Ep is input to the grounded end while the coded shape bit stream Ekt of the coded arbitrary shape signal Ep is input to the arithmetic decoder 171.

Also in this fifth embodiment, as in the fourth embodiment, when the manual control signal Min is being output toward the data analyzer 165, instead of the decoded texture signal corresponding to the present frame being processed, the decoded texture signal corresponding to the previous frame is synthesized with the decoded shape signal corresponding to the present frame.

When the data analyzer 165 does not receive the manual control signal Min, it controls the switch 101c by the switch control signal SWc so that the input terminal Cin is connected to one of the first output contact Co1 and the third output contact Co3. Thereby, the image decoding apparatus 100d according to the fifth embodiment performs an image decoding process identical to that of the image decoding apparatus 100b according to the third embodiment.

As described above, the image decoding apparatus 100d according to the fifth embodiment is provided with the input terminal 106, such as a mouse or a remote controller, for inputting the manual control signal Min from the outside, and the control of the switch 101c by the data analyzer 165 is changed according to the manual control signal Min from the input terminal 106. Therefore, until the user obtains a reproduced image by the user's control, only the coded shape bit stream can be decoded without decoding the coded texture bit stream, and this enables the user to quickly detect the head of the object image when reproducing a coded signal recorded in a record medium.

In the second to fifth embodiments of the invention, the coding process or the decoding process is applied to the coded arbitrary shape signal 500 (FIG. 1(a)) and the coded binary signal 600 (FIG. 1(b)) which correspond to the inter-frame prediction coding method. However, the fundamental principle of the present invention, i.e., to add an image identifier for identifying image signals having different data structures, such as an arbitrary shape image signal and a binary image signal when coding these image signals for transmission, and to detect the image identifier when decoding these coded signals so as to make the decoding process correspond to the coded signals, such as a coded arbitrary shape signal and a coded binary signal, can be applied to the coded arbitrary shape signal 500b having the data structure shown in FIG. 2(a) and the coded binary signal 600b having the data structure shown in FIG. 2(b).

Further, in the first to fifth embodiments of the invention, as image identifiers for identifying coded image signals having different data structures, employed are shape identifiers (SID=0 or 1) each comprising a 1-bit code for identifying a coded arbitrary shape signal or a coded binary signal. However, image identifiers comprising 2-bit codes (SID=00, 01, 10, or 11) or 3-bit codes may be employed. In this case, it is possible to identify more coded image signals by the image identifiers.

When a plurality of coded image signals are identified with, the image identifiers, for a prescribed coded image signal, an image identifier, of which bit number is different from those of image identifiers of other coded image signals, may be employed. For example, a coded image signal including an image identifier comprising a 2-bit code and a coded image signal including an image identifier comprising a 3-bit code may be treated by a system corresponding to a single coding method. In this case, code allocation to each image identifier can be carried out with high efficiency.

Hereinafter, a description is given of a data structure for image transmission and an image decoding method, which employ image identifiers comprising codes of two or more bits.

Embodiment 6

FIGS. 10(a)–10(c) are diagrams for explaining data structures for image transmission according to a sixth embodiment of the present invention. FIG. 10(a) shows a data structure of a coded arbitrary shape signal obtained by coding an arbitrary shape image signal corresponding to each of plural objects constituting a display image. FIG. 10(b) shows a data structure of a coded binary signal obtained by coding a binary image signal. FIG. 10(c) shows a data structure of a coded rectangle signal (coded pixel value signal) obtained by coding a rectangle image signal including, as display data, only a texture signal (pixel value signal) for color display of an image.

These data structures for image transmission according to the sixth embodiment are applied to a system in which a rectangle image signal including, as display data, only a texture signal (i.e., luminance signal and color difference signal) is compressively coded and transmitted and, further, the coded rectangle image signal is decoded and displayed. That is, in this system, the image coding method and apparatus are constructed to perform a coding process for the rectangle image signal while the image decoding method and apparatus are constructed to perform a decoding process for the coded rectangle image signal (coded pixel value signal).

In FIG. 10(a), reference numeral 1500 designates a coded arbitrary shape signal obtained by coding an arbitrary shape image signal corresponding to each of plural objects constituting an image of one display image. This coded arbitrary shape signal 1500 is identical to the coded arbitrary shape signal 500 according to the first embodiment except that a two-bit image identifier 1502 is used instead of the 1-bit shape identifier 502.

In FIG. 10(b), reference numeral 1600 designates a coded binary signal obtained by coding a binary image signal that represents image information on one display image with a binary signal. The coded binary signal 1600 is identical to the coded binary shape signal 600 according to the first embodiment except that a two-bit image identifier 1602 is employed instead of the 1-bit shape identifier 602.

In FIG. 10(c), reference numeral 1700 designates a coded pixel value signal which is a coded rectangle signal obtained by coding a rectangle signal that includes information about the vertical and horizontal size of one display image (one frame). This coded pixel value signal (coded rectangle signal) 1700 is identical to the coded pixel value signal 700a shown in FIG. 23(c) except that a two-bit image identifier 1702 is inserted between the synchronous signal 701 and the header 703.

The 2-bit image identifiers (SID) 1502, 1602, and 1702 have values of 01, 10, and 00, respectively, and the coded signals 1500, 1600, and 1700 are identified by the values of these image identifiers.

A description is given of the function and effect.

In the sixth embodiment so constructed, the coded pixel value signal 1700 corresponding to the rectangle image signal includes coded texture bit streams 71C obtained by coding a texture signal, and a two-bit image identifier 1702 indicating that the signal 1700 includes only the coded texture bit streams as display data. So, by referring to the image identifier 1702, among the three coded signals, i.e., the coded arbitrary shape signal 1500, the coded binary signal 1600, and the coded pixel value signal 1700, the coded pixel value signal 1700 can be distinguished from the other signals 1500 and 1600.

To be specific, in an image decoding apparatus adapted to MPEG2 and constructed to decode the coded pixel value signal 1700, even when the coded arbitrary shape signal 1500 or the coded binary signal 1600 is input, these coded signals can be recognized as signals different from the coded pixel value signal 1700 by the image identifier. Therefore, it is possible to avoid that the coded arbitrary shape signal 1500 or the coded binary signal 1600 is subjected to the decoding process adapted to MPEG2 and the decoding operation comes to a rupture. Further, when these coded signals are input, the fact that these signals are not decodable can be displayed on the display image.

In this sixth embodiment of the invention, the coded arbitrary shape signal 1500, the coded binary signal 1600, and the coded rectangle signal (coded pixel value signal) 1700 have the data structures obtained by inter-frame prediction coding of an arbitrary shape image signal, a binary image signal, and a rectangle image signal, respectively. However, these coded signals may have data structures obtained by intra-frame coding of the respective image signals.

Furthermore, in the respective coded signals employed in this sixth embodiment, both or either of the coded shape bit stream and the coded texture bit stream are/is arranged for each block. However, in each coded signal, prescribed coded bit streams may be arranged for each frame.

Embodiment 7

Figure 10:
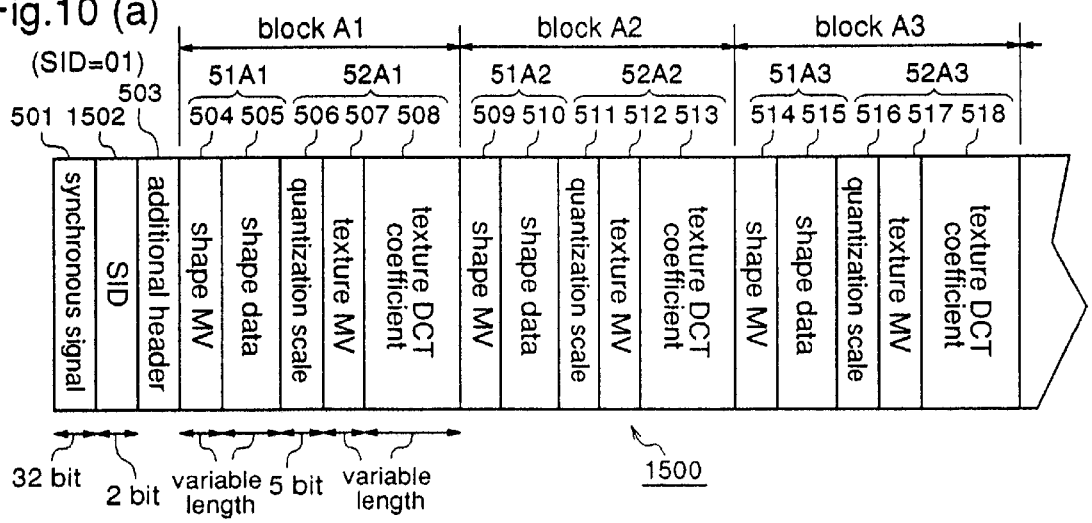
FIGS. 10(*a*), 10(*b*), and 10(*c*) are diagrams showing data structures of a coded arbitrary shape signal, a coded binary signal, and a coded rectangle signal, respectively, as data structures for image transmission according to a sixth embodiment of the invention.
Figure 10:
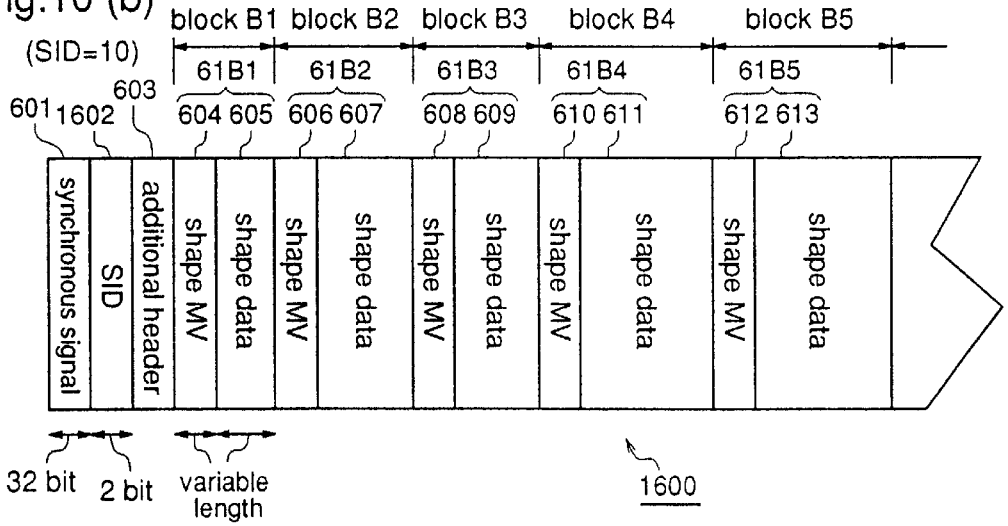
Figure 10:
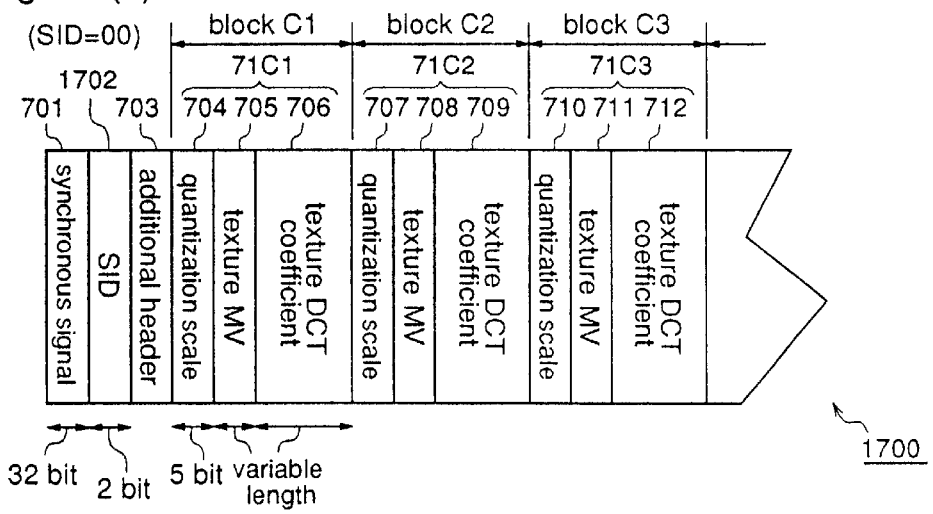
Figure 11:
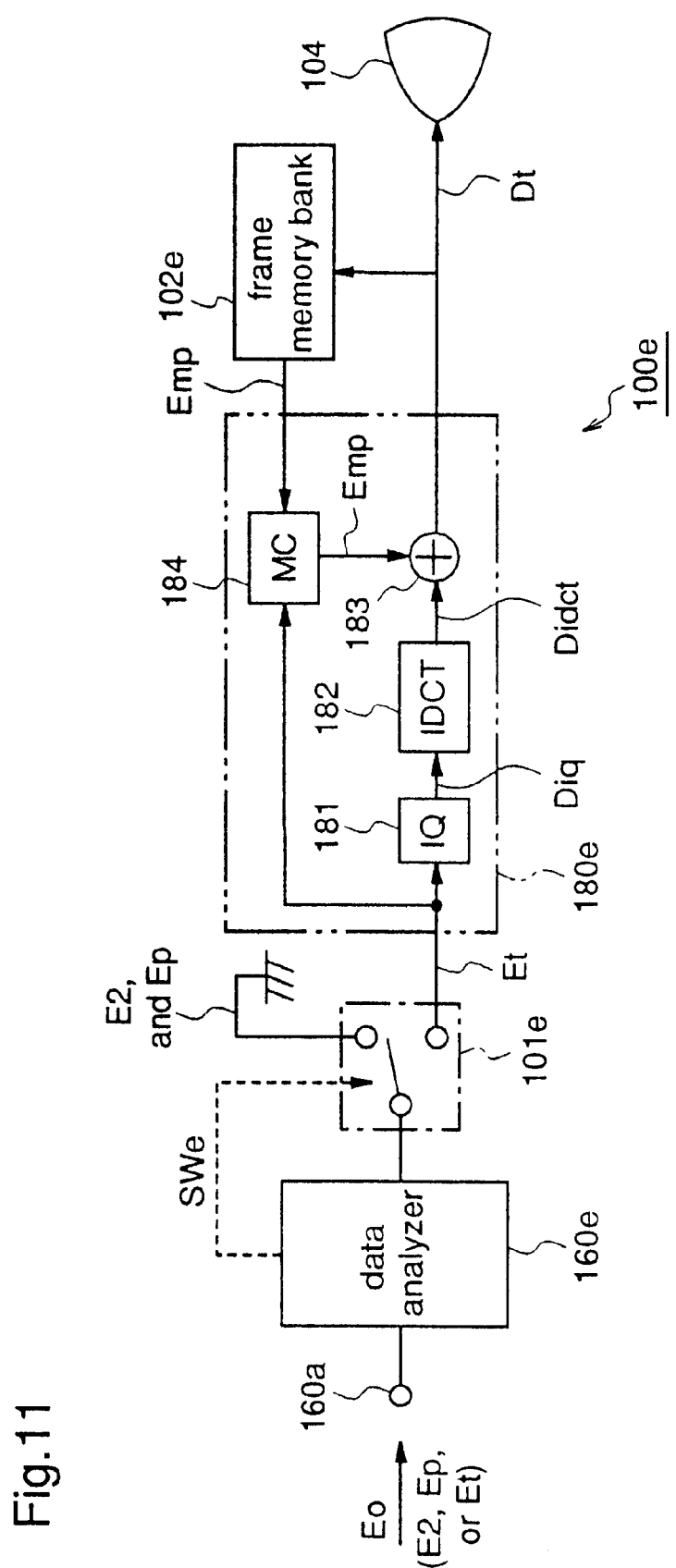
FIG. 11 is a block diagram illustrating an image decoding apparatus according to a seventh embodiment of the invention.

FIG. 11 is a block diagram illustrating an image decoding apparatus according to a seventh embodiment of the invention. In FIG. 11, reference numeral 100e designates an image decoding apparatus for decoding coded data having the data structures for image transmission according to the sixth embodiment of the invention. This image decoding apparatus 100e is constructed as follows. When the apparatus 100e receives, as coded data Eo, the coded arbitrary shape signal (Ep) 1500 shown in FIG. 10(a) and the coded binary signal (E2) 1600 shown in FIG. 10(b), it does not decode these coded signals but displays that these coded signals currently being input are not decodable. On the other hand, when the apparatus 100e receives, as coded data Eo, the coded rectangle signal (Et) 1700 shown in FIG. 10(c), it outputs a decoded rectangle signal Dt as decoded image data.

More specifically, the image decoding apparatus 100e comprises a data analyzer 160e which analyzes the coded data Eo input to the input terminal 160*a* and outputs a switch control signal SWe according to the analysis result; a texture decoding unit 180*e* which subjects the coded rectangle signal (coded pixel value signal) Et to a decoding process including inverse DCT; a switch 101*e* which supplies the coded signal analyzed by and output from the data analyzer 160*e* to one of the decoding unit 180*e* and the grounded end; and a frame memory bank 102*e* which stores a prediction texture signal.

The data analyzer 160*e* analyzes the input coded data to examine the two-bit image identifier that follows the 32-bit synchronous signal at the head, which image identifier is one of the image identifier (SID=01) 1502 in the coded arbitrary shape signal 1500 shown in FIG. 10(*a*), the image identifier (SID=10) 1602 in the coded binary signal shown in FIG. 10(*b*), and the image identifier (SID=00) 1702 in the coded rectangle signal shown in FIG. 10(*c*). When the set value of the image identifier (SID) is 01 or 10, the data analyzer 160*e* controls the switch 101*e* with the switch control signal SWe so that the input coded signal is applied to the grounded end. When the set value of the image identifier (SID) is 00, the data analyzer 160*e* controls the switch 101*e* with the switch control signal SWe so that the input coded data is input to the decoding unit 180*e*.

Further, the structure of the data analyzer 160*e* is identical to that of the data analyzer 160 according to the third embodiment shown in FIG. 7(*b*), and the structure of the texture decoding unit 180*e* is identical to that of the texture decoding unit 180 according to the third embodiment.

In the image decoding apparatus 100*e*, the decoded (reproduced) texture signal Dt, i.e., the output from the decoding unit 180*e*, is directly input to the frame memory bank 102*e* and to the display unit 104. However, a synthesizer identical to the synthesizer 190 employed for the third embodiment (refer to FIG. 5) may be disposed before the display unit 104 so that the decoded texture signal Dt is synthesized with another decoded arbitrary shape signal.

A description is given of the operation of the image decoding apparatus 100*e*.

Figure 12:
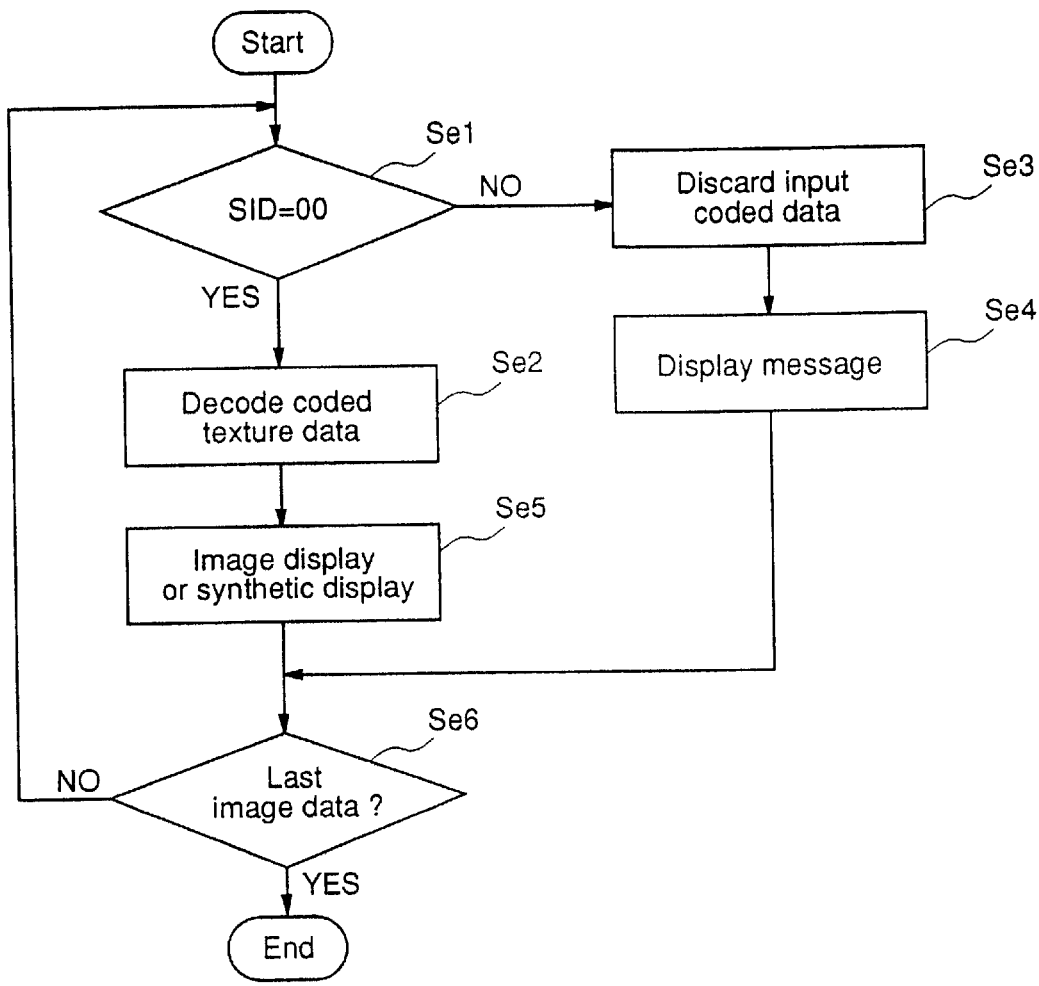
FIG. 12 is a flowchart for explaining a decoding process by the image decoding apparatus according to the seventh embodiment.

FIG. 12 is a flowchart of the decoding process by the image decoding apparatus 100*e* according to the seventh embodiment of the invention. When a coded image signal having a data structure shown in any of FIGS. 10(*a*), 10(*b*), and 10(*c*) is input to the image decoding apparatus 100*e*, the data analyzer 160*e* analyzes the 2-bit image identifier that follows the 32-bit synchronous signal, and decides whether the value of the image identifier (SID) is 00 or not (Step Se1).

When the result of the decision is not SID=00 but SID=01 or SID=10, since the input coded image signal Eo is a coded arbitrary shape signal Ep or a coded binary signal E2, the data analyzer 160*e* controls the switch 101*e* with the switch control signal SWe so that the coded signal is supplied to the grounded end. Thereby, the coded arbitrary shape signal Ep or the coded binary signal E2 is discarded (Step Se3). Therefore, the coded image signal E2 or Ep including coded shape bit streams is never processed by the decoding unit 180*e*.

While the coded arbitrary shape signal Ep or the coded binary signal E2 is being input to the apparatus 100*e*, the apparatus 100*e* displays a message that the coded signal being currently input cannot be processed by this decoding apparatus 100*e* (Step Se4).

Thereafter, it is decided whether the input coded signal is data of the last block of the last frame (Step Se6). When the input coded signal is not data of the last block of the last frame, an input coded signal corresponding to the next block is subjected to Steps Se1, Se3, Se4, and Se6. Conversely, when the input signal is data of the last block of the last frame, decoding of the input signal is ended.

On the other hand, when the result of the decision in Step Se1 is SID=00, since the input coded data Eo is a coded rectangle signal Et, the data analyzer 160*e* controls the switch 101*e* with the switch control signal SWe so that the coded signal is input to the decoding unit 180*e*. Thereby, the texture decoding unit 180*e* decodes the coded texture bit stream included in the coded rectangle signal Et (Step Se2).

To be specific, in the decoding unit 180*e*, the quantization scale and the DCT coefficients included in the bit stream are input to the inverse quantizer 181, and the DCT coefficients are subjected to inverse quantization. Thereafter, the inversely quantized signal Diq is subjected to inverse cosine transformation by the inverse cosine transformer 182.

Meanwhile, the texture motion vector MV is input to the texture motion compensator 184. The compensator 184 generates an address for obtaining a prediction texture signal according to the texture motion vector MV, and obtains the prediction texture signal Emp from the frame memory bank 102*e* using the address.

The adder 183 performs addition of the output Didct from the inverse cosine transformer 182 and the prediction texture signal Emp, and outputs the decoded texture signal Dpt (decoded rectangle signal) toward the display unit 104 (Step Se5). Simultaneously, the decoded texture signal Dt is input to the frame memory bank 102*e*. A synthesizer may be disposed after the decoding unit to synthesize the decoded rectangle signal with another arbitrary shape image signal, for display.

Thereafter, it is decided whether the coded rectangle signal Et is data of the last block of the last frame (Step Se6). When the signal Et is not data of the last block of the last frame, a coded rectangle signal of the next block is subjected to Steps Se1, Se2, Se5, and Se6. When the signal Et is data of the last block of the last frame, decoding of the coded rectangle signal is ended.

As described above, according to the sixth embodiment of the invention, the image decoding apparatus 100*e* includes the data analyzer 160*e* which analyzes the input coded data. The data analyzer 160*e* detects, with the two-bit image identifier, whether the coded image signal input to the apparatus is a coded signal including coded shape bit streams as image information (i.e., the coded binary signal E2 or the coded arbitrary shape signal Ep) or a coded rectangle signal Et including no coded shape bit streams and, according to the result of the decision, the analyzer 160*e* controls the switch 101*e* so that the input coded signal is input to one of the grounded end and the decoding unit 180*e*. Therefore, even when the coded arbitrary shape signal Ep or the coded binary signal E2 is input to the image decoding apparatus 100*e* adapted to the coded rectangle signal Et, these coded signals are not decoded, whereby the decoding operation is prevented from coming to a rupture.

In this seventh embodiment of the invention, emphasis has been placed on the image decoding apparatus 100*e* which selects, according to an image identifier, a coded signal including coded shape bit streams from the coded signals having the data structures according to the sixth embodiment, i.e., the coded arbitrary shape signal 1500, the coded binary signal 1600, and the coded rectangle signal 1700. However, when the image input unit 110 in the image coding apparatus 100*a* according to the second embodiment (refer to FIG. 3) is constructed so that it can identify an arbitrary shape image signal, a binary image signal, and a rectangle image signal, it is possible to implement an image coding apparatus that performs coding of these image signals with image identifiers for identifying the coded signals corresponding to these image signals.

Embodiment 8

Figure 13:
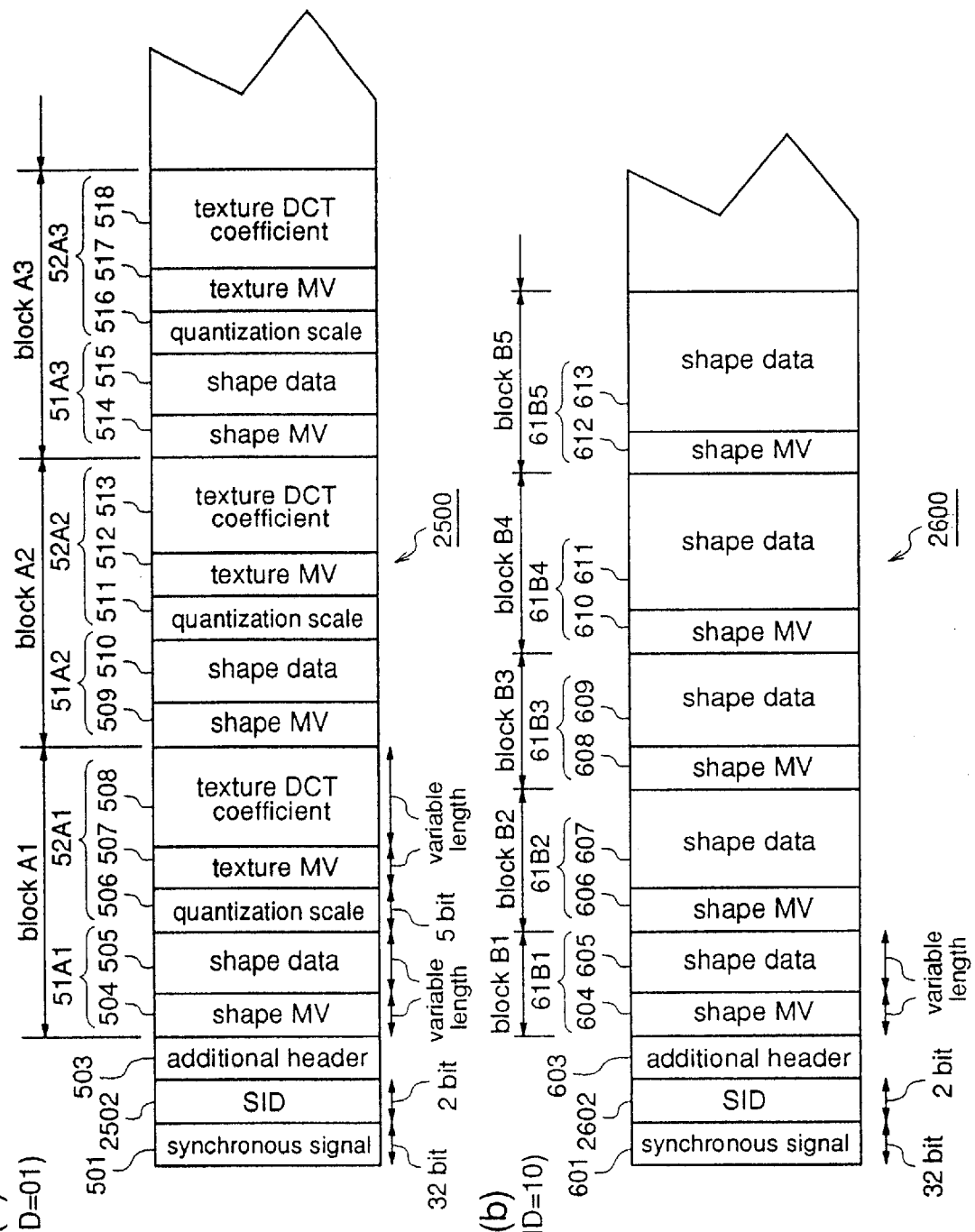
FIGS. 13(*a*) and 13(*b*) are diagrams illustrating a data structure of a coded arbitrary shape signal and a data structure of a coded binary signal, respectively, as data structures for image transmission according to an eighth embodiment of the invention.
Figure 14:
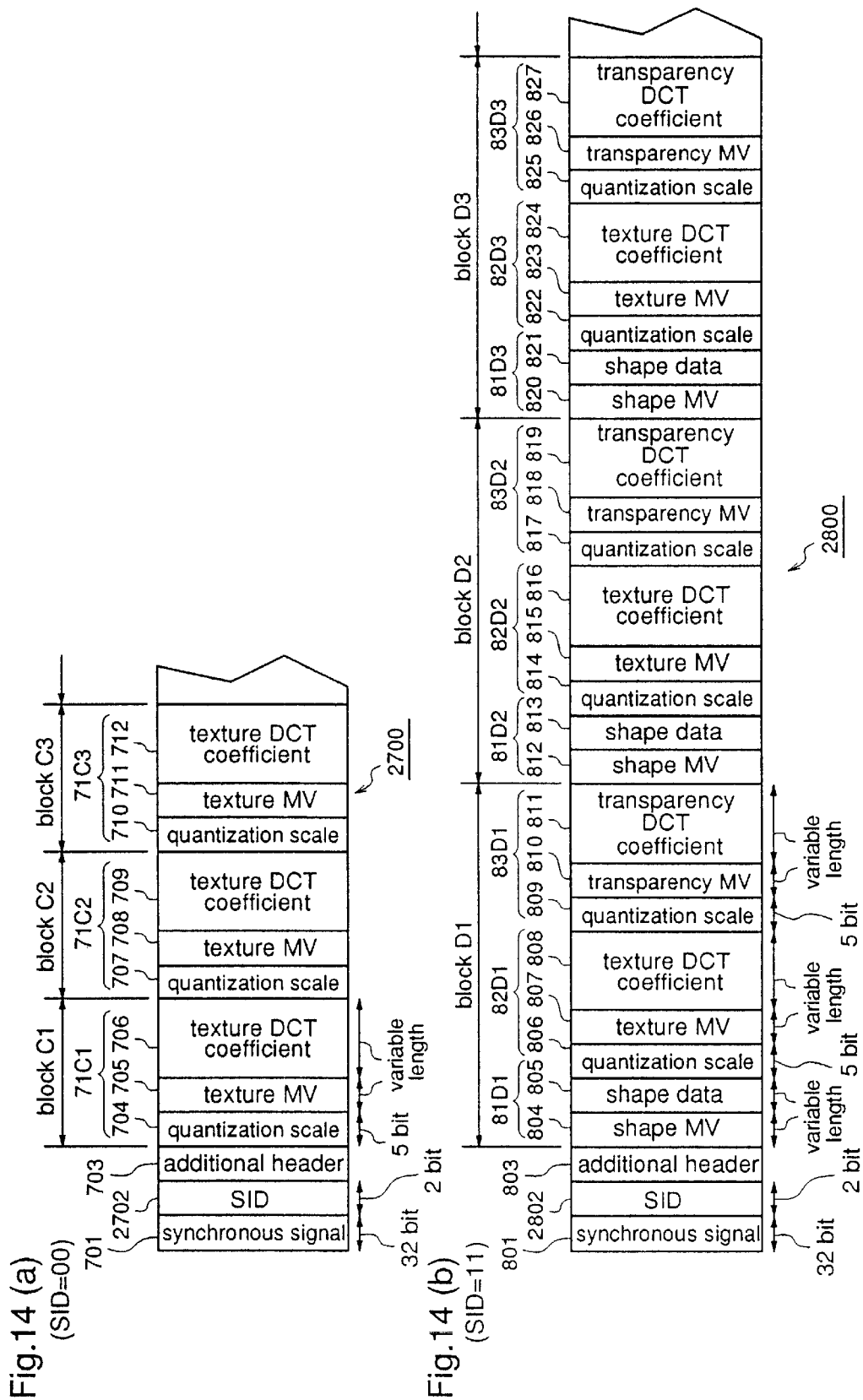
FIGS. 14(*a*) and 14(*b*) are diagrams illustrating a data structure of a coded rectangle signal and a data structure of a coded arbitrary shape signal with transparency information, respectively, as data structures for image transmission according to the eighth embodiment.

FIGS. 13(a) and 13(b) and FIGS. 14(a) and 14(b) are diagrams for explaining data structures for image transmission according to an eighth embodiment of the present invention. More specifically, FIG. 13(a) shows a data structure of a coded arbitrary shape signal (first coded arbitrary shape signal) 2500 obtained by coding an arbitrary shape image signal including both of coded shape bit streams and coded texture bit streams, and FIG. 13(b) shows a data structure of a coded binary signal 2600 obtained by coding a binary image signal. FIG. 14(b) shows a data structure of a coded rectangle signal (coded pixel value signal) 2700 obtained by coding a rectangle image signal, and FIG. 14(b) shows a data structure of a coded arbitrary shape signal with transparency information (second coded arbitrary shape signal) 2800 obtained by coding an arbitrary shape image signal including transparency information.

These data structures for image transmission according to the eighth embodiment are applied to a system in which the arbitrary shape image signal including transparency information is compressively coded and transmitted and, further, the second coded arbitrary shape signal obtained by the compressive coding is decoded and displayed. That is, in this system, the image coding method and apparatus are constructed to perform a coding process for the arbitrary shape image signal including transparency information while the image decoding method and apparatus are constructed to perform a decoding process for the second coded arbitrary shape signal.

The first coded arbitrary shape signal 2500 shown in FIG. 13(a) is identical to the coded arbitrary shape signal 1500 according to the sixth embodiment shown in FIG. 10(a), that is, it is obtained by replacing the 1-bit shape identifier 502 in the coded arbitrary shape signal 500 according to the first embodiment with a two-bit image identifier 2502.

The coded binary shape signal 2600 shown in FIG. 13(b) is identical to the coded binary shape signal 1600 according to the sixth embodiment shown in FIG. 10(b), that is, it is obtained by replacing the 1-bit shape identifier 602 in the coded binary shape signal 600 according to the first embodiment with a two-bit image identifier 2602.

Figure 23:
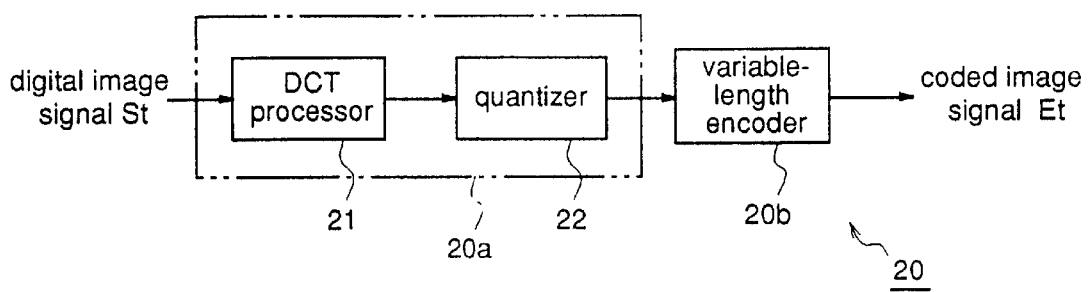
FIGS. 23(a)–23(c) are diagrams for explaining a communication system using a data compressive coding process based on MPEG2, more specifically.
Figure 23:
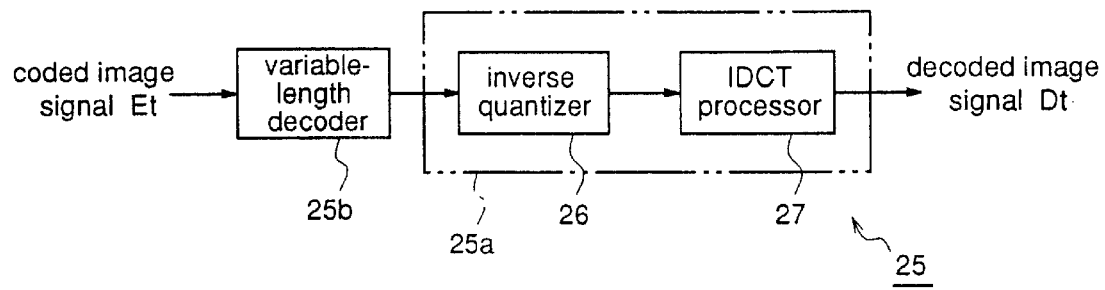
Figure 23:
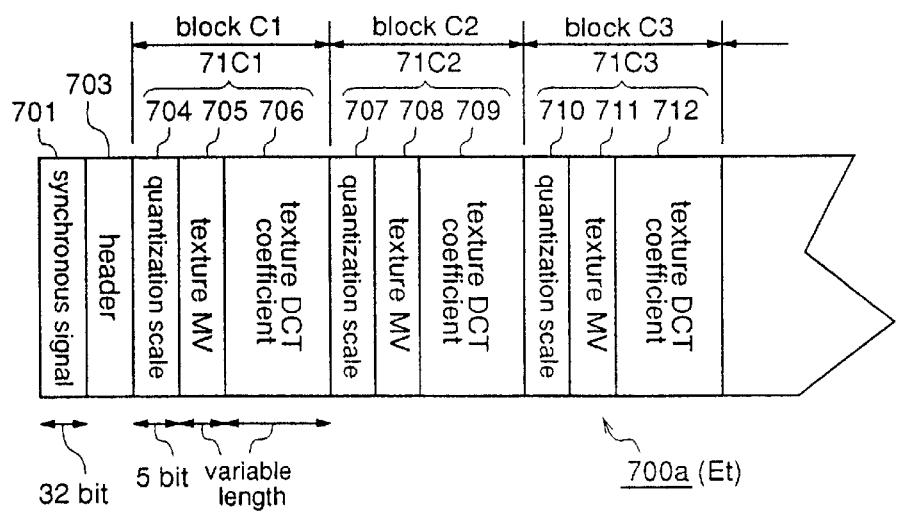
Figure 24:
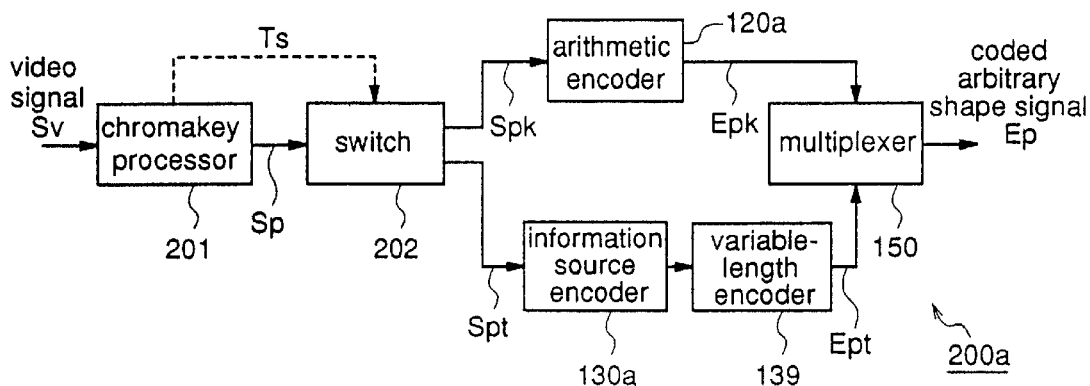
FIGS. 24(a)–24(c) are diagrams for explaining a communication system using a data compressive coding process based on MPEG4, more specifically.
Figure 24:
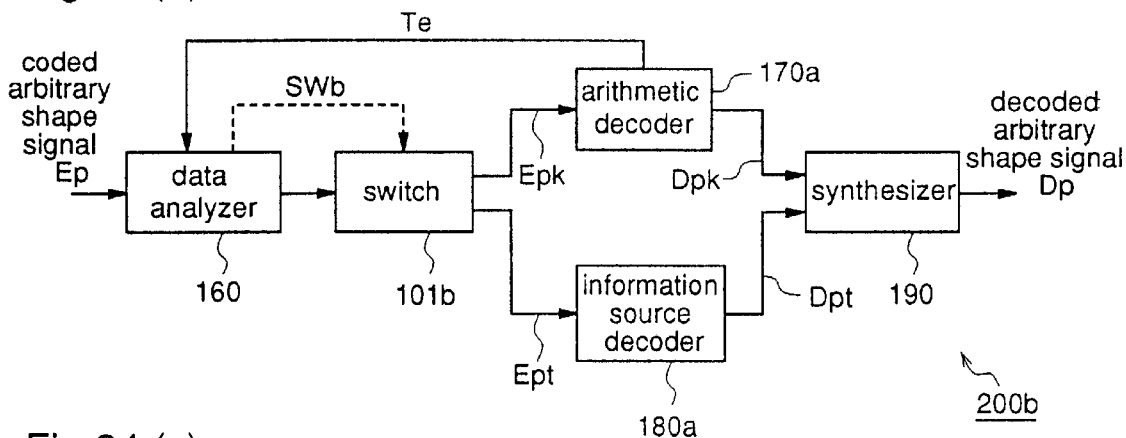
Figure 24:
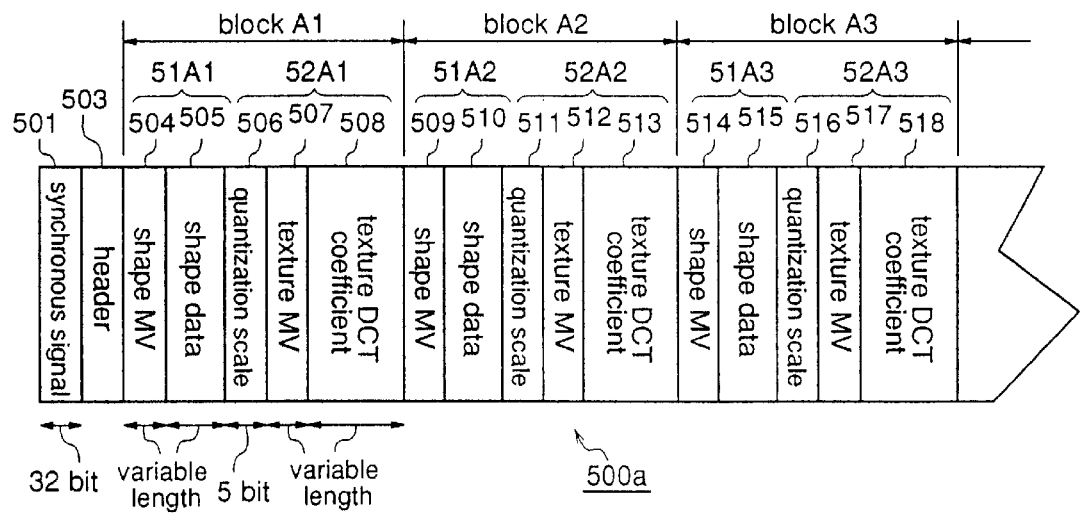

The coded pixel value signal 2700 shown in FIG. 14(a) is identical to the coded pixel value signal 1700 according to the sixth embodiment shown in FIG. 10(c), that is, it is obtained by inserting a two-bit image identifier 2702 between the synchronous signal 701 and the header 703 in the coded pixel value signal 700a shown in FIG. 23(c).

The second coded arbitrary shape signal 2800 shown in FIG. 14(b) includes a 32-bit synchronous signal 801 at the beginning, a two-bit image identifier (SID) 2802 that follows the synchronous signal 801, and an additional header 803 that follows the image identifier 2802.

Further, the second coded arbitrary shape signal 2800 includes coded shape bit streams 81D obtained by coding a shape signal (binary transparency signal) that represents the shape of each object as a constituent of the arbitrary shape image signal with transparency information; coded texture bit streams (coded pixel value streams) 82D obtained by coding a texture signal (pixel value signal) that comprises a luminance signal and a color difference signal for color display of each object as a constituent of the arbitrary shape image signal with transparency information; and coded transparency bit streams 83D obtained by coding a multi-valued transparency signal that represents the transparency of each object as a constituent of the arbitrary shape image signal with transparency information.

To be specific, in the coded arbitrary shape signal 2800, for each of plural blocks into which an object region including an object on a display image is divided, a coded shape bit stream 81D, a coded texture bit stream 82D, and a coded transparency bit stream 83D are arranged in this order.

More specifically, following the header 803, arranged are a coded shape bit stream 81D1, a coded texture bit stream 82D1, and a coded transparency bit stream 83D1 corresponding to a block D1; a coded shape bit stream 81D2, a coded texture bit stream 82D2, and a coded transparency bit stream 83D2 corresponding to a block D2; and a coded shape bit stream 8103, a coded texture bit stream 82D3, and a coded transparency bit stream 83D3 corresponding to a block D3.

Further, as shown in FIG. 14(b), the coded shape bit streams 81D1, 81D2, and 81D3 comprise variable-length coded data 804, 812, and 820 corresponding to shape motion vectors (in the Figure referred to simply as shape MV); and variable-length coded data 805, 813, and 821 corresponding to binary shape signals (binary transparency signals), each signal indicating whether pixels within the block are located inside the object or outside the object (in the Figure shape data), respectively.

The coded texture bit streams 82D1, 82D2, and 82D3 comprise 5-bit coded data 806, 814, and 822 corresponding to quantization scales (in the Figure quantization scale); variable-length coded data 807, 815, and 823 corresponding to texture motion vectors (in the Figure texture MV); and variable-length coded data 808, 816, and 824 corresponding to quantized signals obtained by subjecting the texture signal to DCT and quantization (in the Figure texture DCT coefficients), respectively.

The coded transparency bit streams 83D1, 83D2, and 83D3 comprise 5-bit coded data 809, 817, and 825 corresponding to quantization scales (in the Figure quantization scale); variable-length coded data 810, 818, and 826 corresponding to transparency motion vectors (in the Figure transparency MV); and variable-length coded data 811, 819, and 827 corresponding to quantized signals obtained by subjecting the multivalued transparency signal to DCT and quantization (in the Figure transparency DCT coefficients), respectively.

The synchronous signal 801 is a signal indicating the head of a coded arbitrary shape signal corresponding to one object, and this is a unique coded signal. The shape identifier (SID) 2802 is a signal indicating which type is the coded image signal among the above-described four types of coded image signals, i.e., it is a signal for identifying the kind of the bit streams included in the coded image signal. When the value of the image identifier (SID) is 01, it indicates that both of the coded shape bit streams and the coded texture bit streams exist in the coded image signal. When SID=10, the image identifier indicates that only the coded shape bit streams exist in the coded signal. When SID=00, the image identifier indicates that only the coded texture bit streams exist in the coded signal. When SID is 11, the image identifier indicates that the coded shape bit streams, the coded texture bit streams, and the coded transparency bit streams exist in the coded signal.

The header 803 includes information relating to, for example, the time to display the image of the corresponding object, the attribute of the image, and the prediction mode for coding. However, these data have no relationship with the present invention and, therefore, do not require detailed description.

The shape MV is the coded data of a motion vector which shows a motion of an image within a block between the present frame and the previous frame, and this is used for prediction of a shape signal of a specific block in the present frame from a shape signal of the corresponding block in the previous frame. Further, the shape data is obtained by subjecting a shape signal to arithmetic coding, and the quantization scale (in the coded texture bit stream) is a parameter for inversely quantizing DCT coefficients which are obtained by subjecting a texture signal to DCT and quantization. The texture MV is a coded signal of a texture motion vector which shows a motion of an image within a block between the present frame and the previous frame, and this is used for prediction of a texture signal of the present frame from a texture signal of the previous frame. Further, the texture DCT coefficients are obtained by subjecting a quantized signal of the texture signal to variable-length coding. Further, the transparency MV is a coded signal of a transparency motion vector which shows a motion of an image within a block between the present frame and the previous frame, and this is used for prediction of a multivalued transparency signal of the present frame from a multivalued transparency signal of the previous frame. Furthermore, the quantization scale (in the coded transparency bit stream) is a parameter for inversely quantizing transparency DCT coefficients which are obtained by subjecting a multivalued transparency signal to DCT and quantization. The transparency DCT coefficients are obtained by subjecting a quantized signal of the transparency signal to variable-length coding.

In the coded arbitrary shape signal 2800, actually, various kinds of side information (data) are arranged before the texture DCT coefficients although these data are not shown in the Figure and these side data sometimes require a large number of bits.

A description is now given of the function and effect.

In the eighth embodiment so constructed, since the four coded image signals having different data structures, i.e., the first coded arbitrary shape signal 2500 corresponding to an arbitrary shape image signal, the coded binary signal 2600 corresponding to a binary image signal, the coded pixel value signal (coded rectangle signal) 2700 corresponding to a rectangle image signal, and the second coded arbitrary shape signal 2800 corresponding to an arbitrary shape image signal with transparency information, include the two-bit image identifiers 2502, 2602, 2702, and 2802 for identifying these coded signals, respectively. Therefore, those four coded signals can be identified at the decoding end by referring to the image identifiers.

To be specific, in an image decoding apparatus adapted to MPEG4 and constructed to decode the coded arbitrary shape signal mentioned above, even when the coded binary signal and the coded rectangle signal are input besides the first and second coded arbitrary shape signals, the image identifiers enable the apparatus to appropriately decode the coded binary signal and the coded rectangle signal. Therefore, it is possible to avoid that the coded binary signal and the coded rectangle signal are subjected to the decoding process adapted to M2EG4 and the decoding operation comes to a rupture.

In this eighth embodiment of the invention, the first and second coded arbitrary shape signals, the coded binary signal, and the coded rectangle signal have the data structures obtained by inter-frame prediction coding of an arbitrary shape image signal, an arbitrary shape image signal with transparency information, a binary image signal, and a rectangle image signal, respectively. However, these coded signals may have data structures obtained by intra-frame coding of the respective image signals.

Furthermore, in the respective coded signals employed in this eighth embodiment, at least one of the coded shape bit stream, the coded texture bit stream, and the coded transparency bit stream is arranged for each block. However, in each coded signal, prescribed coded bit streams may be arranged for each frame (refer to FIGS. 2(a) and 2(b)).

Furthermore, in the data structure of the second coded arbitrary shape signal 2800 (coded signal of the arbitrary shape image signal with transparency information) shown in FIG. 14(b), each of the coded transparency bit streams 83D includes a transparency MV and a quantization scale, like the coded texture bit streams 82D. However, it is not always necessary for the coded transparency bit stream 83D in the second coded arbitrary shape signal 2800 to have the transparency MV and the quantization scale.

When the coded signal of the arbitrary shape image signal with transparency information has the data structure in which the coded transparency bit streams 83D do not include transparency MVs and quantization scales, decoding of the transparency DCT coefficients is carried out using the texture MVs and the quantization scales of the coded texture bit streams 82D.

Embodiment 9

Figure 15:
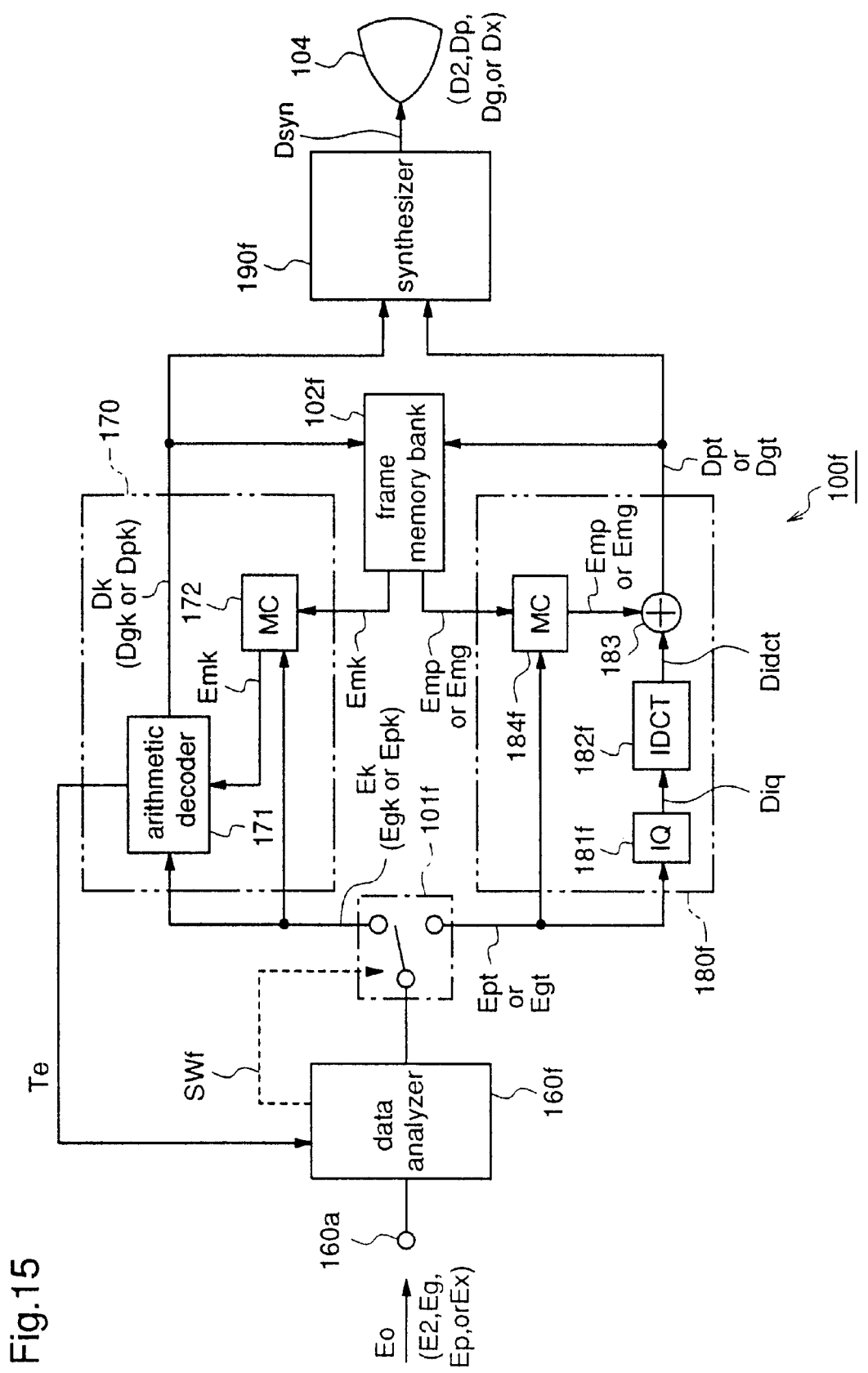
FIG. 15 is a block diagram illustrating an image decoding apparatus according to a ninth embodiment of the invention.

FIG. 15 is a block diagram illustrating an image decoding apparatus according to a ninth embodiment of the present invention. In FIG. 15, reference numeral 100f designates an image decoding apparatus which performs decoding of coded data having the data structure for image transmission according to the eighth embodiment. The image decoding apparatus 100f is constructed to perform a decoding process according to the data structure of a coded signal input as coded data.

More specifically, the apparatus 100f is constructed as follows. When the apparatus 100f receives the coded binary signal (E2) 2600 shown in FIG. 13(b) as coded data Eo, it outputs a decoded binary signal D2 as decoded image data Dsyn. When the apparatus 100f receives the first coded arbitrary shape signal (Ep) 2500 shown in FIG. 13(a) as coded data Eo, it outputs a decoded arbitrary shape signal Dp as decoded image data Dsyn, for each object. When the apparatus 100f receives the coded rectangle signal (Et) 2700 shown in FIG. 14(a) as coded data Eo, it outputs a decoded rectangle signal Dt as decoded image data Dsyn. When the apparatus 100f receives the second coded arbitrary shape signal (Ex) 2800 shown in FIG. 14(b) as coded data Eo, it outputs a decoded arbitrary shape signal Dx with transparency information as decoded image data Dsyn, for each object.

Hereinafter, the structure of the image decoding apparatus 100f will be described in detail.

The apparatus 100f comprises a data analyzer 160f which analyzes the coded data Eo input to the input terminal 160a and outputs a switch control signal SWf according to the analysis result; a shape decoding unit (first decoding means) 170 which subjects the shape data (coded shape signal) to an arithmetic decoding process; a texture decoding unit (second decoding means) 180*f* which subjects the texture DCT coefficients Ept and the transparency DCT coefficients Egt to a decoding process including inverse DCT; a switch 101*f* which supplies the coded signal analyzed by and output from the data analyzer 160*f* to one of the decoding units 170 and 180*f*, according to the switch control signal SWf; and a frame memory bank 102*f* which stores a prediction shape signal, a prediction texture signal, and a prediction transparency signal.

The data analyzer 160*f* analyzes the input coded signal to examine the 2-bit image identifier that follows the 32-bit synchronous signal at the head (any of the image identifiers 2502, 2602, 2702, and 2802 in the coded signals shown in FIGS. 13(*a*), 13(*b*), 14(*a*), and 14(*b*), respectively), and controls the switch 100*f* according to the set value of the image identifier (SID).

When SID=01, the switch 101*f* is controlled by the switch control signal SWf so that the coded shape bit streams of the input coded signal are input to the shape decoding unit 170 and the coded texture bit streams of the coded signal are input to the texture decoding unit 180*f*. When SID=10, the switch 101*f* is controlled by the switch control signal SWf so that the input coded data is input to the shape decoding unit 170. When SID=00, the switch 101*f* is controlled by the switch control signal SWf so that the coded texture bit streams of the input coded signal are input to the texture decoding means 180*f*. When SID=11, the switch 101*f* is controlled by the switch control signal SWf so that the coded shape bit streams of the input coded signal are input to the shape decoding unit 170, and the coded texture bit streams and the coded transparency bit streams are input to the texture decoding unit 180*f*.

Like the data analyzer 160 according to the third embodiment shown in FIG. 7(*b*), the data analyzer 160*f* comprises a table storage unit 162, a comparator 161, and a switch control circuit 163. In this ninth embodiment, the comparator 161 compares the bit stream of the input coded signal with the bit stream of the decoding reference table stored in the table storage unit 162, and identifies the image identifier, coded shape bit stream, coded texture bit stream, and coded transparency bit stream, which are included in the coded data. According to the result of the identification, the comparator 161 outputs a switch control signal SWf toward the switch 101*f*.

The texture decoding unit (second decoding means) 180*f* includes a texture motion compensator 184*f* which generates, according to the texture motion vector or the transparency motion vector, an address for obtaining a prediction texture signal or a prediction transparency signal, and obtains a prediction texture signal Emp or a prediction transparency signal Emg from the frame memory bank 102*b* using the address. Further, the texture decoding unit 180*f* includes an inverse quantizer 181*f* which receives the quantization scale and the DCT coefficients in the coded texture bit stream or the coded transparency bit stream, and subjects the DCT coefficients to inverse quantization; and an inverse cosine transformer 182*f* which subjects the inversely quantized DCT coefficients Diq to inverse cosine transformation. Furthermore, the texture decoding unit 180*f* includes an adder 183 which adds the prediction texture signal Emp or the prediction transparency signal Emg to the inversely cosine-transformed signal Didct, and outputs a reproduced texture signal (decoded texture signal) Dpt or a reproduced transparency signal (decoded transparency signal) Dpg. The reproduced texture signal Dpt or the reproduced transparency signal Dpg from the adder 183 is stored in the frame memory bank 102*f*.

The image decoding apparatus 100*f* further includes a synthesizer 190*f* which synthesizes the output of the decoding unit 180*f* (both of the reproduced texture signal Dpt and the reproduced transparency signal Dpg, or only the reproduced texture signal Dpt) and the output of the decoding unit 170 (the reproduced shape signal Dk corresponding to the output of the decoding unit 180*f*) with desired image data, and outputs synthesized image data Dsyn including the reproduced arbitrary shape signal Dx with transparency information or the reproduced arbitrary shape signal Dp toward the display unit 104. Although the synthesizer 190*f* according to the ninth embodiment outputs the reproduced binary signal D2 from the decoding unit 170 or the reproduced rectangle signal Dt from the decoding unit 180*f* directly to the display unit 104, the signal D2 or Dt may be synthesized with another arbitrary shape image signal in the synthesizer 190*f*. Although the signal output from the synthesizer 190*f* is input to the display unit 104, it may be input to an information output apparatus such as a printer (not shown).

In this ninth embodiment, with respect to pixels wherein the reproduced shape signal is zero, pixel values in the reproduced texture signal and the reproduced transparency signal are replaced with pixel values of a prescribed image. The prescribed image is an image prepared in advance at the receiving end, or an image reproduced by another image decoding apparatus.

A description is given of the operation of the image decoding apparatus 100*f* according to the ninth embodiment.

Figure 16:
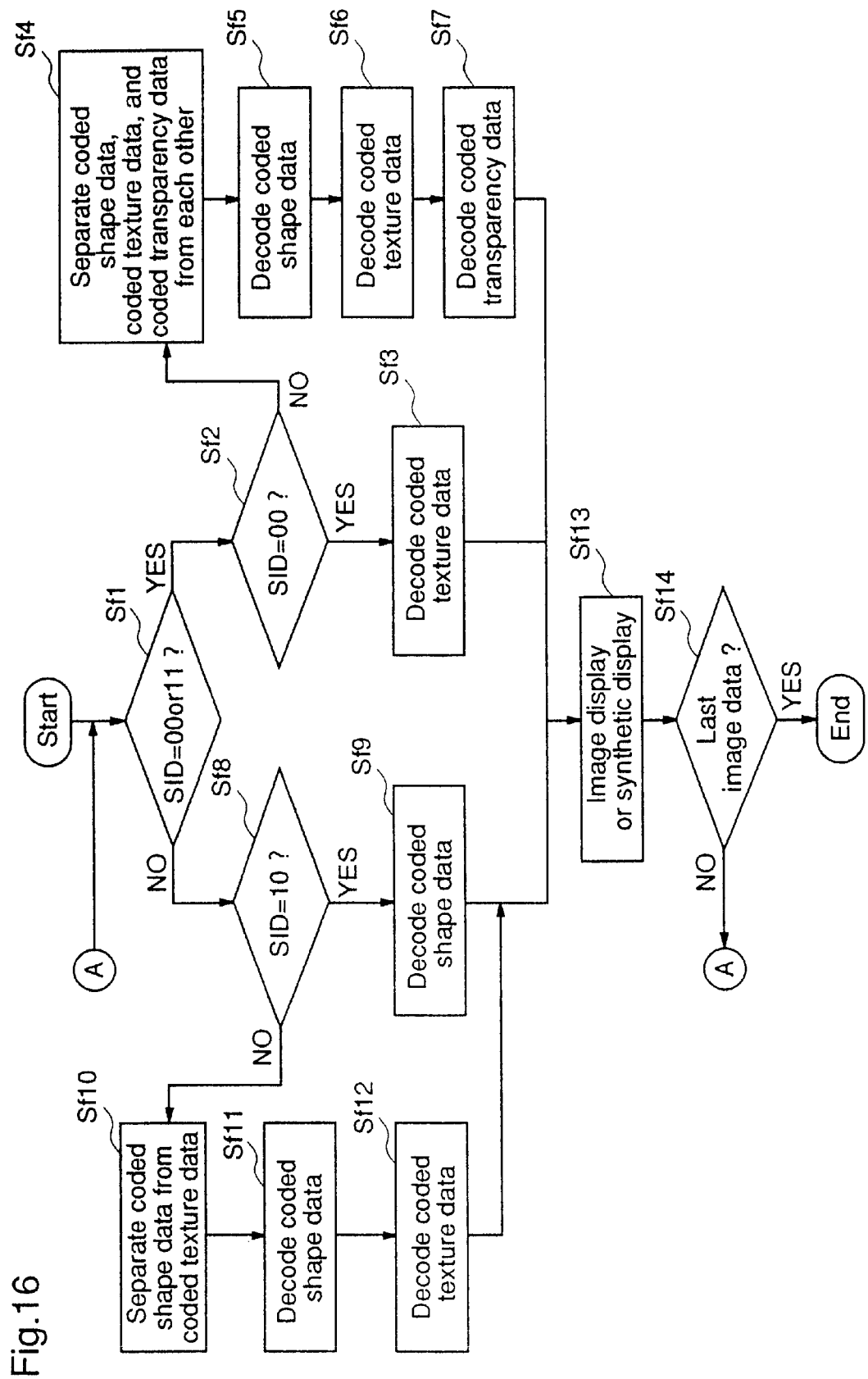
FIG. 16 is a flowchart for explaining a decoding process by the image decoding apparatus according to the ninth embodiment.

FIG. 16 is a flowchart of the decoding process by the image decoding apparatus 100*f*. When a coded image signal having a data structure shown in any of FIGS. 13(*a*), 13(*b*), 14(*a*), and 14(*b*) is input to the image decoding apparatus 100*f*, the data analyzer 160*f* analyzes the 2-bit image identifier that follows the 32-bit synchronous signal in the coded image signal, and decides whether the value of the image identifier is "SID=00 or 11" or not (Step Sf1).

When the result of the decision is SID 00 or 11, it is decided whether SID=00 or not (Step Sf2). When the result of the decision in Step Sf2 is SID=00, since the input coded image signal Eo is the coded rectangle signal Et, the data analyzer 160*f* controls the switch 101*f* with the switch control signal SWf so that the coded signal is always input to the texture decoding unit 180*f*. Thereby, in the texture decoding unit 180*f*, the coded texture bit streams in the coded rectangle signal are subjected to decoding (Step Sf3). The decoding process in Step Sf3 is identical to the decoding process in Step Se2 according to the seventh embodiment. Then, the decoded rectangle signal is sent through the synthesizer 190*f* to the display unit 104 to be displayed (Step Sf13). In the synthesizer 190*f*, the decoded rectangle signal Dg may be synthesized with another arbitrary shape image signal.

Thereafter, it is decided whether the coded rectangle signal Et is data of the last block of the last frame (Step Sf14). When the coded rectangle signal is not data of the last block of the last frame, a coded rectangle signal corresponding to the next block is subjected to Steps Sf1~Sf3, Sf13, and Sf14. Conversely, when the coded rectangle signal is data of the last block of the last frame, decoding of the coded rectangle signal is ended.

On the other hand, when the result of the decision in Step Sf2 is SID=11, the input coded image signal is the second coded arbitrary shape signal Ex including, as image information, the coded shape bit streams, the coded texture bit streams, and the coded transparency bit streams. So, the data analyzer 160f controls the switch 101f with the switch control signal SWf so that the coded shape bit stream corresponding to each block of the coded arbitrary shape signal Ex with transparency signal is input to the shape decoding unit 170 while the coded texture bit stream and the coded transparency bit stream corresponding to the block are input to the texture decoding unit 180f. Thereby, in the second coded arbitrary shape signal Ex, the coded shape bit stream is separated from the coded texture bit stream and the coded transparency bit stream (Step Sf4), and the separated shape bit stream is decoded by the shape decoding unit 170 (Step Sf5) while the separated texture bit stream and the transparency bit stream are decoded by the texture decoding unit 180f (Steps Sf6 and Sf7).

To be specific, the coded shape bit stream Epk is decoded by the shape decoder 170, like the coded shape bit stream E2k of the binary image signal. When decoding of the coded shape bit stream Epk corresponding to one block has ended, the arithmetic decoder 171 detects the end of the coded shape bit stream Epk corresponding to this block and outputs an end detection signal Te toward the data analyzer 160f. Receiving the end detection signal Te, the data analyzer 160f controls the switch 101b with the switch control signal SWb so that the input coded image signal is input to the texture decoding unit 180f.

Thereby, the coded texture bit stream Ept and the coded transparency bit stream Epg are sent from the data analyzer 160f to the texture decoding unit 180f. In the decoding unit 180f, the quantization scale and the DCT coefficients of each bit stream are input to the inverse quantizer 181f, and the DCT coefficients are subjected to inverse quantization. Thereafter, the inversely quantized signal Diq is subjected to inverse cosine transformation by the inverse cosine transformer 182f.

Meanwhile, the texture motion vector MV and the transparency motion vector MV are input to the texture motion compensator 184f. The compensator 184f generates addresses for obtaining a prediction texture signal and a prediction transparency signal, according to these motion vectors MV, and obtains a prediction texture signal Emp and a prediction transparency signal Emg from the frame memory bank 102b using the addresses.

The adder 183 performs addition of the output Didct from the inverse cosine transformer 182f and the prediction texture signal Emp or the prediction transparency signal Emg, and outputs a decoded texture signal Dpt or a decoded transparency signal Cog. These decoded signals Dpt and Dpg are input to the frame memory bank 102f and the synthesizer 190f. In the synthesizer 190f, the reproduced texture signal Dpt, the reproduced transparency signal Dpg, and the corresponding reproduced shape signal Dk are synthesized with a desired image to generate synthesized image data Dsyn. When decoding of the coded transparency bit stream has ended, the data analyzer 160f detects the end of the coded transparency bit stream, and controls the switch 101f by the switch control signal SWb so that the input coded image signal is input to the shape decoding unit 170.

Further, the reproduced and synthesized data (decoded arbitrary shape signal with transparency information) Dx is output from the synthesizer 190f to the display unit 104 for image display (Step Sf13).

Thereafter, it is decided whether the second coded arbitrary shape signal is data of the last block of the last frame (Step Sf14). When it is not data of the last block of the last frame, a second coded arbitrary shape signal corresponding to the next block is subjected to Steps Sf1, Sf2, Sf4~Sf7, Sf13, and Sf14. Conversely, when it is data of the last block of the last frame, decoding of the second coded arbitrary shape signal is ended.

When it is decided in Step Sf1 that the value of the image identifier is not "SID=00 or 11", it is decided in Step Sf8 whether SID=10 or not. When the result of the decision in Step Sf8 is SID=10, since the input coded image signal Eo is the coded binary signal E2 that includes only the coded shape bit streams as image information, the data analyzer 160f controls the switch 101f with the switch control signal SWf so that the coded shape bit stream corresponding to each block in the coded binary signal is always input to the shape decoding unit 170. Thereby, in the shape decoding unit 170, the coded shape bit streams in the coded binary signal are subjected to decoding (Step Sf9). The decoding process in Step Sf9 is identical to the decoding process in Step Sb2 according to the third embodiment. Then, the decoded binary signal D2 is sent through the synthesizer 190f to the display unit 104 to be displayed (Step Sf13). In the synthesizer 190f, the decoded binary signal D2 may be synthesized with another arbitrary shape image signal.

Thereafter, it is decided whether the coded binary signal is data of the last block of the last frame (Step Sf14). When it is not data of the last block of the last frame, a coded binary signal corresponding to the next block is subjected to Steps Sf1, Sf8, Sf9, Sf13, and Sf14. Conversely, when it is data of the last block of the last frame, decoding of the coded binary signal is ended.

On the other hand, when the result of the decision in Step Sf8 is SID=01, the input coded image signal is the first coded arbitrary shape signal including, as image information, the coded shape bit streams and the coded texture bit streams. So, the data analyzer 160f controls the switch 101f with the switch control signal SWf so that the coded shape bit stream corresponding to each block of the coded arbitrary shape signal is input to the shape decoding unit 170 while the coded texture bit stream corresponding to the block is input to the texture decoding unit 180f. Thereby, in the first coded arbitrary shape signal, the coded shape bit stream and the coded texture bit stream are separated from each other (Step Sf10), and the separated shape bit stream is decoded by the shape decoding unit 170 (Step Sf11) while the separated texture bit stream is decoded by the texture decoding unit 180f (Step Sf12). Further, these streams are displayed by the display unit 104 (Step Sf13). The decoding processes in Steps Sf11 and Sf12 are identical to the decoding processes in Steps Sb4 and Sb5 according to the third embodiment, respectively, and the image display in Step Sf13 is identical to the image display in Step SbG according to the third embodiment.

Thereafter, it is decided whether the first coded arbitrary shape signal Ep is data of the last block of the last frame (Step Sf14). When it is not data of the last block of the last frame, a first coded arbitrary shape signal Ep corresponding to the next block is subjected to Steps Sf1, Sf8, and Sf10~Sf14. Conversely, when it is data of the last block of the last frame, decoding of the first coded arbitrary shape signal Ep is ended.

In the decoding process according to this ninth embodiment, when decoding the first or second coded arbitrary shape image signal, with respect to pixels wherein the reproduced shape signal is zero, pixel values in the reproduced texture signal and the reproduced transparency signal are replaced with pixel values of a prescribed image. The prescribed image is an image prepared in advance at the receiving end, or an image reproduced by another image decoding apparatus.

As described above, according to the ninth embodiment of the invention, the image decoding apparatus 100f includes the data analyzer 160f for analyzing the input coded data. The data analyzer 160f detects an image identifier indicating which coded signal is the input coded image signal among the coded binary signal E2, the first coded arbitrary shape signal Ep, the second coded arbitrary shape signal Ex, and the coded rectangle signal Eg and, according to the value of the image identifier, the analyzer 160f controls the switch 101f so that the bit streams in the input coded signal are appropriately input to one of the shape decoding unit 170 and the texture decoding unit 180f. Therefore, the above-mentioned four coded image signals having different data structures can be decoded by decoding processes corresponding to a single coding method.

In this ninth embodiment of the invention, the coded shape bit stream is decoded by the arithmetic decoding method (first decoding method) in the shape decoding unit 170, and the coded texture bit stream and the coded transparency bit stream are decoded by the same decoding method including DCT. In other words, the decoding method for the coded texture bit stream (second decoding method) is identical to the decoding method for the coded transparency bit stream (third decoding method). However, the coded transparency bit stream may be decoded by a decoding method including wavelet processing or the like (third decoding method) which is different from the decoding method including DCT (second decoding method).

In this ninth embodiment of the invention, emphasis has been placed on the image decoding apparatus 100f which identifies the coded signals having the data structure described for the eighth embodiment, i.e., first and second coded arbitrary shape signals, a coded binary signal, and a coded rectangle signal, using their image identifiers, and performs decoding processes according to the respective data structures. However, when the image input unit 110 in the image coding apparatus 100a according to the second embodiment shown in FIG. 3 is constructed so that it can identify an arbitrary shape image signal, a binary image signal, a rectangle image signal, and an arbitrary shape image signal with transparency information, it is possible to implement an image coding apparatus that performs coding of these image signals with image identifiers for identifying the coded signals corresponding to these image signals.

Embodiment 10

Figure 17:
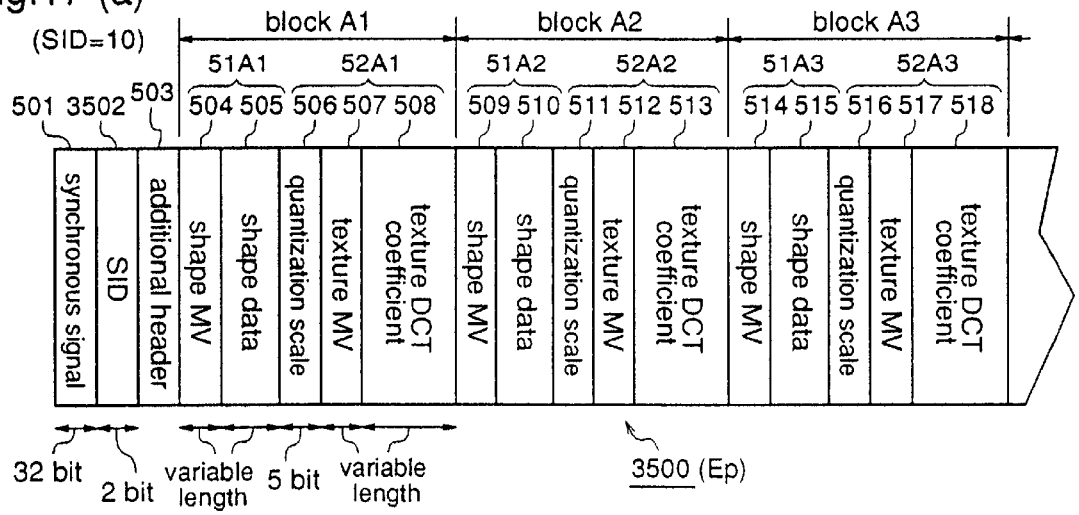
FIGS. 17(a), 17(b), and 17(c) are data structures of a coded arbitrary shape signal, a coded binary signal, and a coded rectangle signal, respectively, as data structures for image transmission according to a tenth embodiment of the invention.
Figure 17:
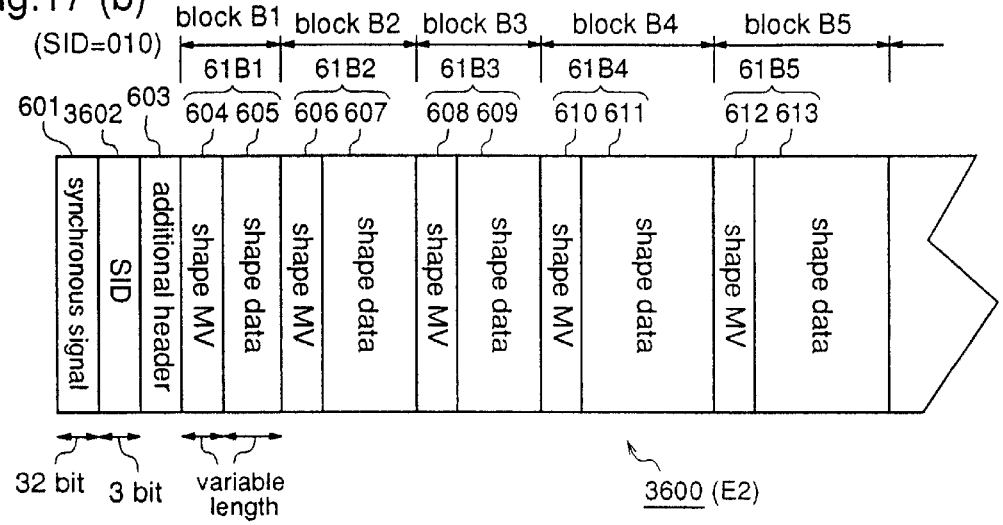
Figure 17:
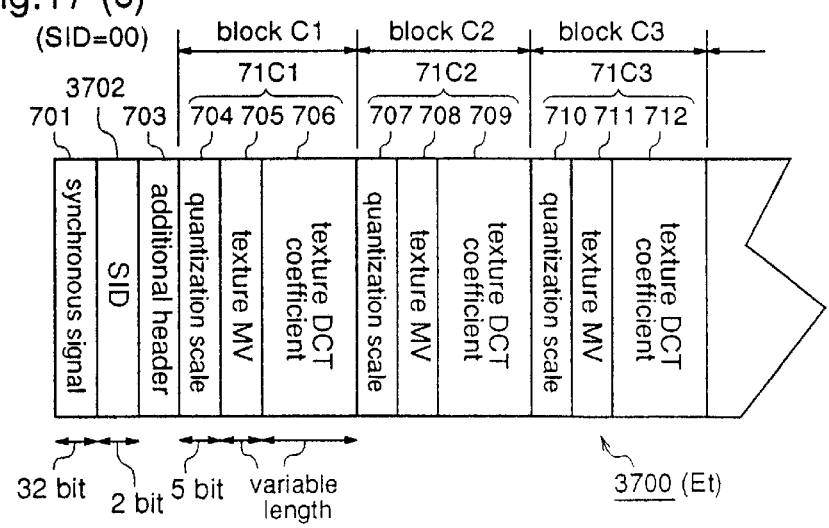

FIGS. 17(a)–17(c) and FIGS. 18(a)–18(b) are diagrams for explaining data structures for image transmission according to a tenth embodiment of the present invention. More specifically, FIG. 17(a) shows a data structure of a coded arbitrary shape signal (first coded arbitrary shape signal) 3500 obtained by coding an arbitrary shape image signal including both of coded shape bit streams and coded texture bit streams, FIG. 17(b) shows a data structure of a coded binary signal 3600 obtained by coding a binary image signal, and FIG. 17(c) shows a data structure of a coded rectangle signal (coded pixel value signal) 3700 obtained by coding a rectangle image signal which includes, as display data, only a texture signal (pixel value signal) for color display of an image. Further, FIG. 18(a) shows a data structure of a coded arbitrary shape signal with transparency information (second coded arbitrary shape signal) 3800 obtained by coding an arbitrary shape image signal including transparency information, and FIG. 18(b) shows a data structure of a coded transparency signal 3900 obtained by coding an arbitrary shape transparency signal including both of coded shape bit streams and coded transparency bit streams.

These data structures for image transmission according to the tenth embodiment are applied to a system in which the arbitrary shape image signal including transparency information is compressively coded and transmitted and, further, the second coded arbitrary shape signal obtained by the compressive coding is decoded and displayed. That is, in this system, the image coding method and apparatus are constructed to perform a coding process for the arbitrary shape image signal including transparency information while the image decoding method and apparatus are constructed to perform a decoding process for the second coded arbitrary shape signal.

The first coded arbitrary shape signal 3500 shown in FIG. 17(a) is identical to the coded arbitrary shape signal 2500 according to the eighth embodiment shown in FIG. 13(a), that is, it is obtained by replacing the 1-bit shape identifier 502 in the coded arbitrary shape signal 500 according to the first embodiment with a two-bit image identifier 3502.

The coded binary shape signal 3600 shown in FIG. 17(b) is identical to the coded binary shape signal 2600 according to the eighth embodiment shown in FIG. 13(b), that is, it is obtained by replacing the 1-bit shape identifier 602 in the coded binary shape signal 600 according to the first embodiment with a two-bit image identifier 3602.

The coded rectangle signal (coded pixel value signal) 3700 shown in FIG. 17(c) is identical to the coded rectangle signal 2700 according to the eighth embodiment shown in FIG. 14(a), that is, it is obtained by inserting a two-bit image identifier 3702 between the synchronous signal 701 and the header 703 in the coded pixel value signal 700a shown in FIG. 23(c).

The second coded arbitrary shape signal 3800 shown in FIG. 18(a) is identical to the second coded arbitrary shape signal 2800 according to the eighth embodiment shown in FIG. 14(b), and has a two-bit image identifier 3802.

Further, the coded transparency signal shown in FIG. 18(b) includes a 32-bit synchronous signal 901 at the beginning, a 3-bit image identifier (SID) 3902 that follows the synchronous signal 901, and an additional header 903 that follows the identifier 3902.

Further, the coded transparency signal 3900 includes coded shape bit streams 91E obtained by coding a shape signal (binary transparency signal) that represents the shape of each object as a constituent of the arbitrary shape transparency signal; and coded transparency bit streams 92E obtained by coding a multivalued transparency signal used for gradation display of the transparency of each object as a constituent of the arbitrary shape image signal. To be specific, in the coded transparency signal 3900, for each of plural blocks into which an object region including an object on a display image is divided, a coded shape bit stream 91E and a coded transparency bit stream 92E are arranged in this order.

More specifically, following the header 903, arranged are a coded shape bit stream 91E1 and a coded transparency bit stream 92E1 corresponding to a block E1; a coded shape bit stream 91E2 and a coded transparency bit stream 92E2 corresponding to a block E2; and a coded shape bit stream 91E3 and a coded transparency bit stream 92E3 corresponding to a block E3.

Further, as shown in FIG. 18(b), the coded shape bit streams 91E1, 91E2, and 91E3 comprise variable-length coded data 904, 909, and 914 corresponding to shape motion vectors (in the figure, referred to simply as shape MV); and variable-length coded data 905, 910, and 915 corresponding to binary shape signals (binary transparency signals), each signal indicating whether pixels within the block are located inside the object or outside the object (in the Figure shape data), respectively.

The coded transparency bit streams 92E1, 92E2, and 92E3 comprise 5-bit coded data 906, 911, and 916 corresponding to quantization scales (in the Figure quantization scale);

variable-length coded data 907, 912, and 917 corresponding to transparency motion vectors (in the Figure transparency MV); and variable-length coded data 908, 913, and 918 corresponding to quantized signals obtained by subjecting the multi-valued transparency signal to DCT and quantization (in the Figure transparency DCT coefficients), respectively.

The synchronous signal 901 is a signal indicating the head of a coded transparency signal corresponding to one object, and this is a unique coded signal. The image identifier (SID) 3902 is a signal indicating which type is the coded image signal among the above-mentioned five types of coded image signals, i.e., it is a signal for identifying the kind of the bit streams included in the coded image signal. When the value of the image identifier (SID) is 10, the identifier indicates that both of the coded shape bit streams and the coded texture bit streams exist, as display data, in the coded image signal. When SID=010, the image identifier indicates that only the coded shape bit streams exist in the coded signal. When SID=00, the image identifier indicates that only the coded texture bit streams exist in the coded signal. When SID is 11, the image identifier indicates that the coded shape bit streams, the coded texture bit streams, and the coded transparency bit streams exist in the coded signal. Further, when SID=011, the image identifier indicates that the coded shape bit streams and the coded transparency bit streams exist in the coded signal.

The header 903 includes information relating to, for example, the time to display the image of the corresponding object, the attribute of the image, and the prediction mode for coding. However, these data have no relationship with the present invention and, therefore, do not require detailed description.

The shape MV is the coded data of a motion vector which shows a motion of an image within a block between the present frame and the previous frame, and this is used for prediction of a shape signal of a specific block in the present frame from a shape signal of the corresponding block in the previous frame. Further, the shape data is obtained by subjecting a shape signal to arithmetic coding, and the quantization scale is a parameter for inversely quantizing DOCT coefficients which are obtained by subjecting a multivalued transparency signal to DOCT and quantization. The transparency MV is a coded signal of a transparency motion vector which shows a motion of an image within a block between the present frame and the previous frame, and this is used for prediction of a multivalued transparency signal of the present frame from a multivalued transparency signal of the previous frame. Further, the transparency DOCT coefficients are obtained by subjecting a quantized signal of the multivalued transparency signal to variable-length coding.

In the coded transparency signal 3900, actually, various kinds of side information (data) are arranged before the transparency DOCT coefficients although these data are not shown in the Figure and these side data sometimes require a large number of bits.

A description is now given of the function and effect.

In the tenth embodiment so constructed, since the five coded image signals having different data structures, i.e., the first coded arbitrary shape signal 3500, the coded binary signal 3600, the coded rectangle signal 3700, the second coded arbitrary shape signal 3800, and the coded transparency signal 3900 include the image identifiers 3502, 3602, 3702, 3802, and 3902 for identifying these coded signals, respectively. Therefore, these five coded signals can be identified at the decoding end by referring to the image identifiers.

To be specific, in an image decoding apparatus adapted to MPEG4 and constructed to decode the coded arbitrary shape signal mentioned above, even when the coded binary signal and the coded rectangle signal are input besides the first and second coded arbitrary shape signals and the arbitrary shape transparency signal, the image identifiers enable the apparatus to appropriately decode the coded binary signal and the coded rectangle signal. Therefore, it is possible to avoid that the coded binary signal and the coded rectangle signal are subjected to the decoding process adapted to MPEG4 and the decoding operation comes to a rupture.

While in this tenth embodiment the respective coded signals having different data structures are obtained by inter-frame prediction coding, these coded signals may be obtained by intra-frame coding.

Furthermore, in the respective coded signals employed in this tenth embodiment, at least one of the coded shape bit stream, the coded texture bit stream, and the coded transparency bit stream is arranged for each block. However, in each coded signal, prescribed coded bit streams may be arranged for each frame.

Figure 18:
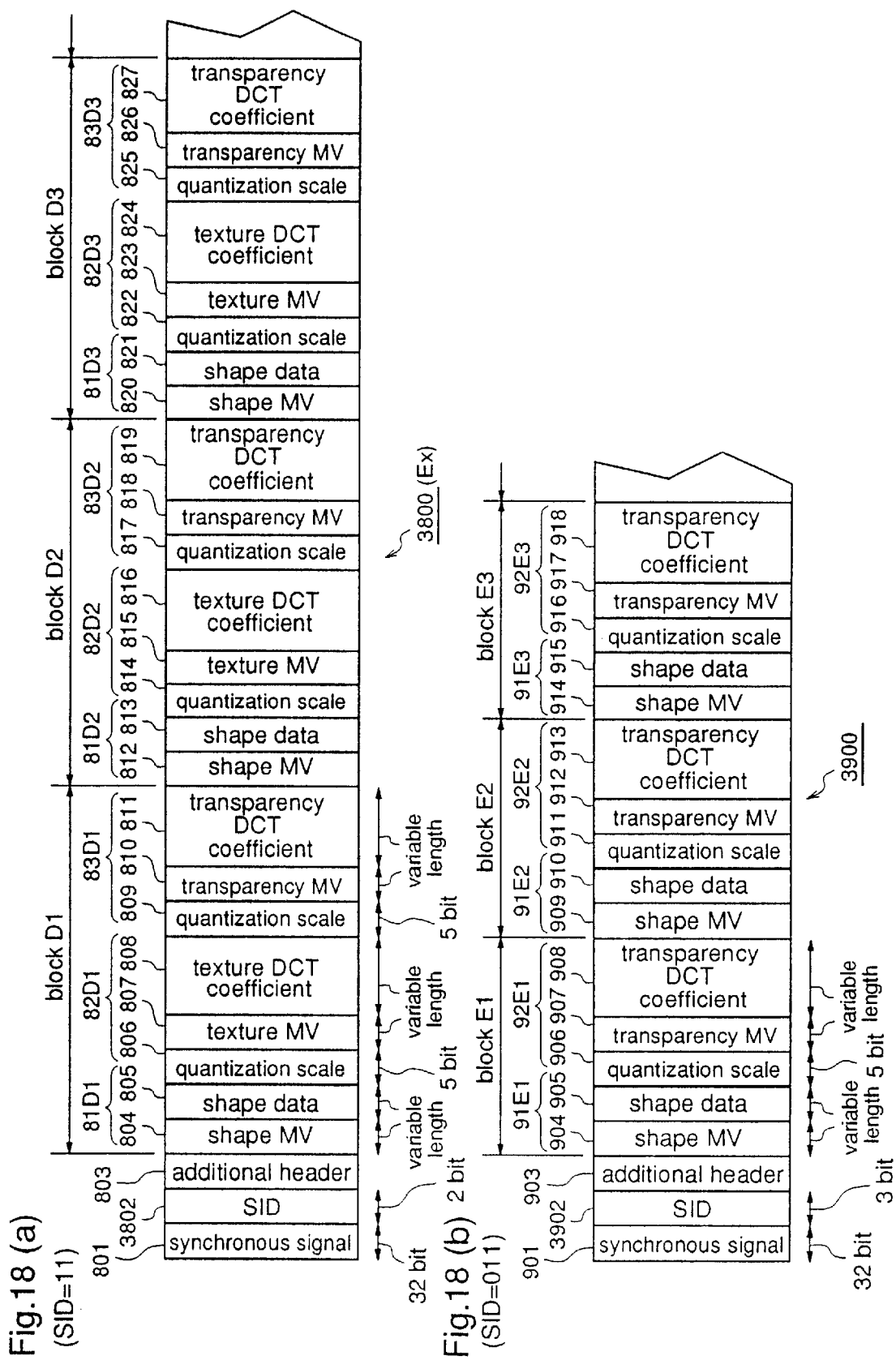
FIGS. 18(a) and 18(b) are diagrams showing a data structure of a coded arbitrary shape signal with transparency information and a data structure of a coded transparency signal, respectively, as data structures for image transmission according to the tenth embodiment.

Furthermore, in the data structure of the second coded arbitrary shape signal 3800 (coded signal of the arbitrary shape image signal with transparency information) shown in FIG. 18(*a*), each of the coded transparency bit streams 83D includes a transparency MV and-a quantization scale, as in the eighth embodiment of the invention. However, it is not always necessary for the coded transparency bit stream 83D in the second coded arbitrary shape signal 3800 to have the transparency MV and the quantization scale, and decoding of the transparency DCT coefficients may be carried out using the texture MV and the quantization scale in the coded texture bit stream 82D.

Embodiment 11

Figure 19:
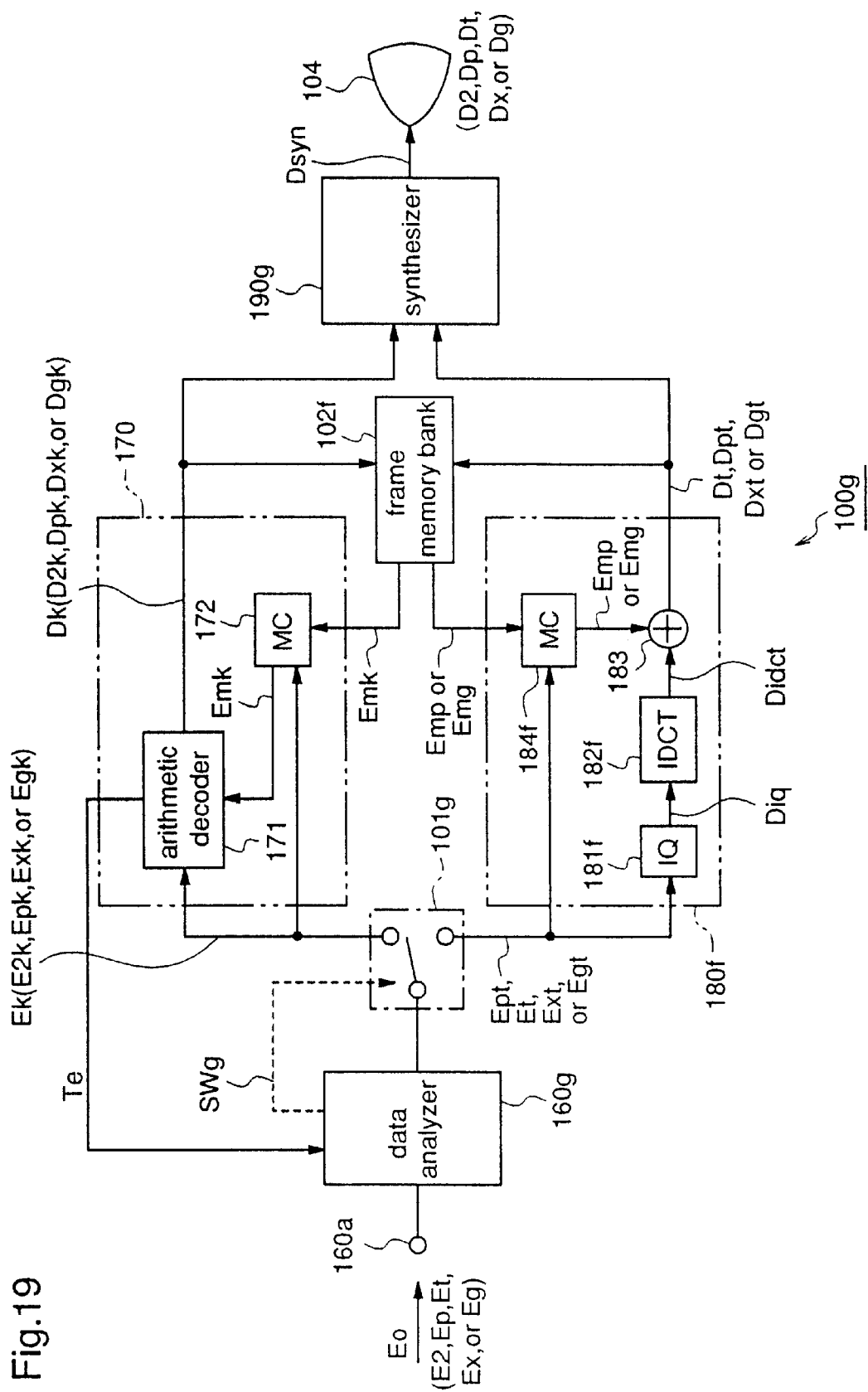
FIG. 19 is a block diagram illustrating an image decoding apparatus according to an eleventh embodiment of the invention.

FIG. 19 is a block diagram illustrating an image decoding apparatus according to an eleventh embodiment of the present invention. In FIG. 11, reference numeral 100g designates an image decoding apparatus which performs decoding of coded data having the data structure for image transmission according to the tenth embodiment. The image decoding apparatus 100g is constructed to perform a decoding process according to the data structure of a coded signal input as coded data.

More specifically, the apparatus 100g is constructed as follows. When the apparatus 100g receives the coded binary signal (E2) 3600 shown in FIG. 17(*b*) as codeed data Eo, it outputs a decoded binary signal D2 as decoded image data Dsyn. When the apparatus 100g receives the first coded arbitrary shape signal (Ep) 3500 shown in FIG. 17(*a*) as coded data Eo, it outputs a decoded arbitrary shape signal Dp as decoded image data Dsyn, for each object. When the apparatus 100g receives the coded rectangle signal (Et) 3700 shown in FIG. 17(*c*) as coded data Eo, it outputs a decoded rectangle signal Dt as decoded image data Dsyn. When the apparatus 100g receives the second coded arbitrary shape signal (Ex) 3800 shown in FIG. 18(*a*) as coded data Eo, it outputs a decoded arbitrary shape signal Dx with transparency information as decoded image data Dsyn, for each object. When the apparatus 100g receives the coded transparency signal (Ep) 3900 shown in FIG. 18(b), it outputs a decoded transparency signal Dg as decoded image data Dsyn for each object.

Hereinafter, the structure of the image decoding apparatus 100g will be described in detail.

The apparatus 100g comprises a data analyzer 160g which analyzes the coded data Eo input to the input terminal 160a and outputs a switch control signal SWg according to the analysis result; a shape decoding unit (first decoding means) 170 which subjects the shape data (coded shape signal) to an arithmetic decoding process; a texture decoding unit (second decoding means) 180f which subjects the texture DCT coefficients Ept and the transparency DCT coefficients Egt to a decoding process including inverse DCT; a switch 101g which supplies the coded signal analyzed by and output from the data analyzer 160g to one of the decoding units 170 and 180f, according to the switch control signal; and a frame memory bank 102f which stores a prediction shape signal, a prediction texture signal, and a prediction transparency signal.

The data analyzer 160g analyzes the input coded signal to examine the 2-bit image identifier that follows the 32-bit synchronous signal at the head (i.e., any of the image identifiers 3502, 3702, and 3802 in the coded signals shown in FIGS. 17(a), 17(c), and 18(a), respectively), and controls the switch 101g according to the set value of the image identifier (SID).

When the set value of the image identifier (SID) is 10, the switch 101g is controlled by the switch control signal SWg so that the coded shape bit streams of the input coded signal are input to the shape decoding unit 170 and the coded texture bit streams of the coded signal are input to the texture decoding unit 180f. When SID=010, the switch 101g is controlled by the switch control signal SWg so that the input coded data is input to the shape decoding unit 170. When SID=00, the switch 101g is controlled by the switch control signal SWg so that the coded texture bit streams of the input coded signal are input to the texture decoding means 180f. When SID=11, the switch 101g is controlled by the switch control signal SWg so that the coded shape bit streams of the input coded signal are input to the shape decoding unit 170, and the coded texture bit streams and the coded transparency bit streams are input to the texture decoding unit 180f. When SID=011, the switch 101g is controlled by the switch control signal SWg so that the coded shape bit streams in the input coded signal are input to the shape decoding unit 170 while the coded transparency bit streams are input to the texture decoding unit 180f.

Like the data analyzer 160 according to the third embodiment shown in FIG. 7(b), the data analyzer 160g comprises a table storage unit 162, a comparator 161, and a switch control circuit 163. In this eleventh embodiment, the comparator 161 compares the bit stream of the input coded signal with the bit stream of the decoding reference table stored in the table storage unit 162, and identifies the image identifier, coded shape bit stream, coded texture bit stream, and coded transparency bit stream, which are included in the coded data. According to the result of the identification, the comparator 161 controls the switch 101g with the switch control signal SWg.

The image decoding apparatus 100g further includes a synthesizer 190g which synthesizes the output of the decoding unit 180f (both of the reproduced texture signal Dpt and the reproduced transparency signal Dpg, or only the reproduced texture signal Dpt or the reproduced transparency signal Dgt) and the output of the decoding unit 170 (the reproduced shape signal Dk corresponding to the output of the decoding unit 180f) with desired image data, and outputs synthesized image data Dsyn including one of the reproduced arbitrary shape signal Dx with transparency information, the reproduced arbitrary shape signal Dp, and the reproduced transparency signal Dg, toward the display unit 104. Although the synthesizer 190g according to the eleventh embodiment outputs the reproduced binary signal D2 from the decoding unit 170 or the reproduced rectangle signal Dt from the decoding unit 180f directly to the display unit 104, the signal D2 or Dt may be synthesized with another arbitrary shape image signal in the synthesizer 190g. Although the signal output from the synthesizer 190g is input to the display unit 104, it may be input to an information output apparatus such as a printer (not shown). Other constituents are identical to those already described for the ninth embodiment.

In this eleventh embodiment, with respect to pixels wherein the reproduced shape signal is zero, pixels values in the reproduced texture signal are replaced with pixel values of a prescribed image. The prescribed image is an image prepared in advance at the receiving end, or an image reproduced by another image decoding apparatus.

A description is given of the operation of the image decoding apparatus 100g according to the eleventh embodiment.

Figure 20:
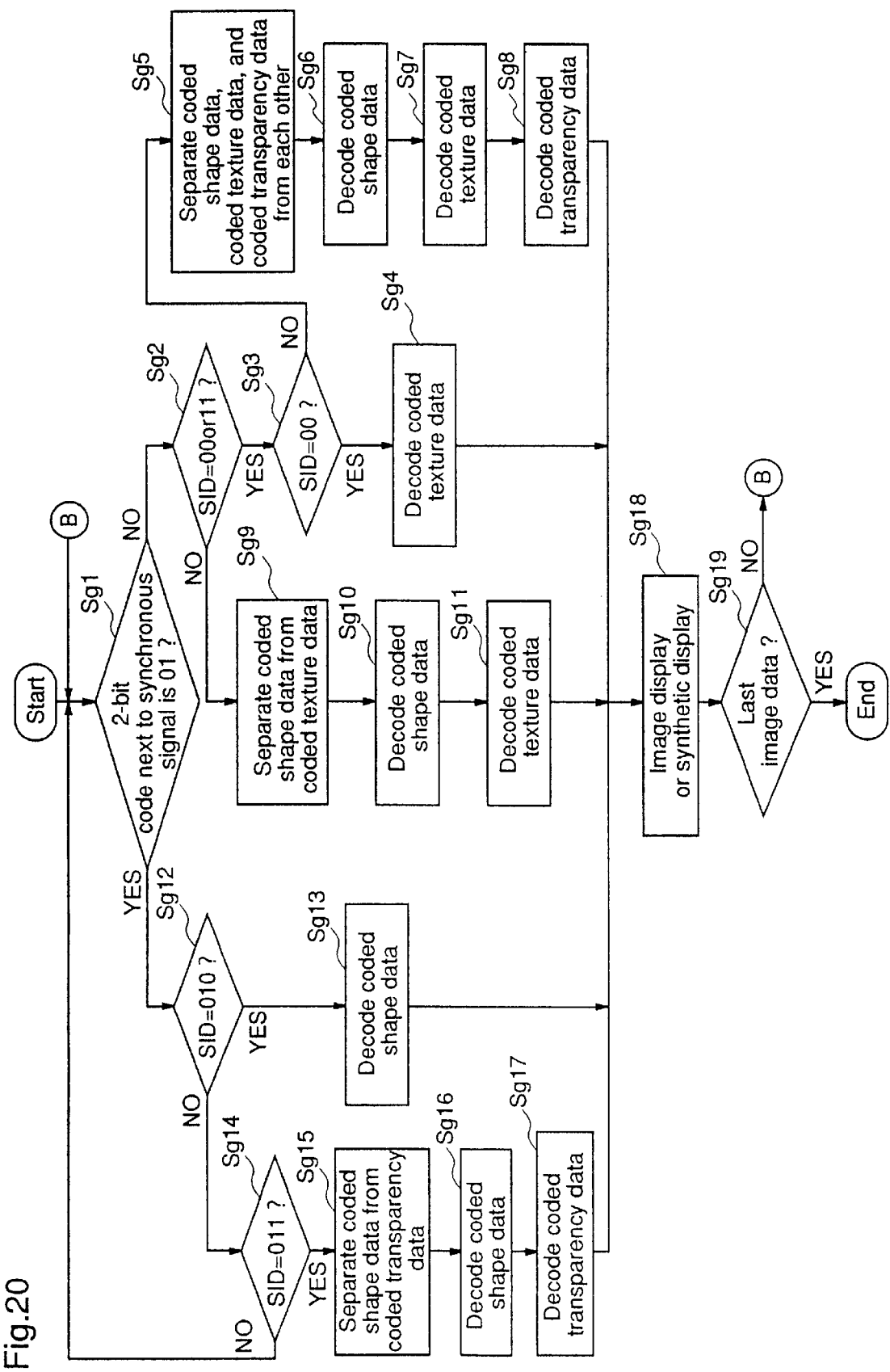
FIG. 20 is a flowchart for explaining a decoding process by the image decoding apparatus according to the eleventh embodiment.

FIG. 20 is a flowchart of the decoding process by the image decoding apparatus 100g. When a coded image signal having the data structure shown in any of FIGS. 17(a), 17(b), 17(c), 18(a), and 18(b) is input to the image decoding apparatus 100g, the data analyzer 160g analyzes the 2-bit code that follows the 32-bit synchronous signal in the coded image signal, and decides whether this 2-bit code is 01 or not (Step Sg1). When the 2-bit code is not 01, it is further decided whether the 2-bit code is, as the value of the image identifier, "SID=00 or 11" or not (Step Sg2).

When the result of the decision in Step Sg2 is SID=00 or 11, it is decided whether SID=00 or not (Step Sg3). When the result of the decision in Step Sg3 is SID=00, since the input coded image signal Eo is the coded rectangle signal (coded pixel value signal) Et, the data analyzer 160g controls the switch 101g with the switch control signal SWg so that the coded signal is always input to the texture decoding unit 180f. Thereby, in the texture decoding unit 180f, the coded texture bit streams (coded pixel value bit streams) in the coded rectangle signal are subjected to decoding (Step Sg4). The decoding process in Step Sg4 is identical to the decoding process in Step Se2 according to the seventh embodiment. Thereafter, the decoded rectangle signal Dt is sent through the synthesizer 190g to the display unit 104 to be displayed as an image (Step Sg18). In the synthesizer 190g, the decoded rectangle signal Dt may be synthesized with another arbitrary shape image signal.

Next, it is decided whether the coded rectangle signal Et is data of the last block of the last frame (Step Sg19). When the coded rectangle signal is not data of the last block of the last frame, a coded rectangle signal Et corresponding to the next block is subjected to Steps Sg1~Sg4, Sg18, and Sg19. Conversely, when the coded rectangle signal is data of the last block of the last frame, decoding of the coded rectangle signal is ended.

On the other hand, when the result of the decision in Step Sg3 is SID=11, the input coded image signal is the second coded arbitrary shape signal including, as image information, the coded shape bit streams, the coded texture bit streams, and the coded transparency bit streams. So, the data analyzer 160g controls the switch 101g with the switch control signal SWg so that the coded shape bit stream corresponding to each block of the second coded arbitrary shape signal is input to the shape decoding unit 170 while the coded texture bit stream and the coded transparency bit stream corresponding to the block are input to the texture decoding unit 180f. Thereby, in the second coded arbitrary shape signal, the coded shape bit stream is separated from the coded texture bit stream and the coded transparency bit stream (Step Sg5), and the separated shape bit stream is decoded by the shape decoding unit 170 (Step Sg6) while the separated texture bit stream and transparency bit stream are decoded by the texture decoding unit 180f (Steps Sg7 and Sg8). The processes in Steps Sg5~Sg8 are identical to those in Steps Sf4~Sf7 according to the ninth embodiment. The decoded shape signal Dxk, the decoded texture signal Dxt, and the decoded transparency signal Dgt are synthesized by the synthesizer 190g, and the second decoded arbitrary shape signal Dx, as the synthesized signal Dsyn, is input to the display unit 104 and displayed as an image (Step Sg18).

Thereafter, it is decided whether the second coded arbitrary shape signal Ex is data of the last block of the last frame (Step Sg19). When it is not data of the last block of the last frame, a second coded arbitrary shape signal Ex corresponding to the next block is subjected to Steps Sg1~Sg3, Sg5~Sg8, Sg18, and Sg19. Conversely, when it is data of the last block of the last frame, decoding of the second coded arbitrary shape signal is ended.

When it is decided in Step Sg2 that SID=10, the input coded image signal Eo is the first coded arbitrary shape signal Ep including, as image information, the coded shape bit streams and the coded texture bit streams. So, the data analyzer 160g controls the switch 101g with the switch control signal SWg so that the coded shape bit stream corresponding to each block of the coded arbitrary shape signal is input to the shape decoding unit 170 while the coded texture bit stream corresponding to the block is input to the texture decoding unit 180f. Thereby, in the coded arbitrary shape signal, the coded shape bit stream and the coded texture bit stream are separated from each other (Step Sg9), and the separated shape bit stream is decoded by the shape decoding unit 170 (Step Sg10) while the separated texture bit stream is decoded by the texture decoding unit 180f (Steps Sg11). The decoding processes in Steps Sg9~SSg11 are identical to those in Steps Sf10~Sf12 according to the ninth embodiment.

The decoded shape signal Dpk and the decoded texture signal Dpt are synthesized by the synthesizer 190g, and the first decoded arbitrary shape signal Dp, as the synthesized signal Dsyn, is input to the display unit 104 and displayed as an image (Step Sg18).

Thereafter, it is decided whether the first coded arbitrary shape signal Ep is data of the last block of the last frame (Step Sg19). When it is not data of the last block of the last frame, a first coded arbitrary shape signal Ep corresponding to the next block is subjected to Steps Sg1, Sg2, Sg9~Sg11, Sg18, and Sg19. Conversely, when it is data of the last block of the last frame, decoding of the first coded arbitrary shape signal is ended.

Furthermore, when the result of the decision in Step Sg1 is that the 2-bit code following the synchronous signal is 01, it is decided in Step Sg12 whether the value of the image identifier (SID) is 010 or not. When SID=010, since the input coded image signal Eo is the coded binary signal E2 that includes only the coded shape bit streams as image information, the data analyzer 160g controls the switch 101g with the switch control signal SWg so that the coded shape bit stream corresponding to each block in the coded binary signal is always input to the shape decoding unit 170. Thereby, in the shape decoding unit 170, the coded shape bit streams in the coded binary signal are subjected to decoding (Step Sg13). The decoding process in Step Sg13 is identical to the decoding process in Step Sb2 according to the third embodiment. Thereafter, the decoded binary signal D2 is sent through the synthesizer 190g to the display unit 104 to be displayed (Step Sg18). In the synthesizer 190g, the decoded binary signal D2 may be synthesized with another arbitrary shape image signal.

Thereafter, it is decided whether the coded binary signal is data of the last block of the last frame (Step Sg19). When it is not data of the last block of the last frame, a coded binary signal corresponding to the next block is subjected to Steps Sg1, Sg12, Sg13, Sg18, and Sg19. Conversely, when it is data of the last block of the last frame, decoding of the coded binary signal is ended.

On the other hand, when the result of the decision in Step Sg12 is that SID is not 010, it is decided in Step Sg14 whether SID is 011 or not. When SID is not 011, the decoding process by the image decoding apparatus 100g returns to Step Sg1.

When the result of the decision in Step Sg14 is SID=011, since the input coded image signal Eo includes, as image information, the coded shape bit streams Egk and the coded transparency bit streams Egt, the data analyzer 160g controls the switch 101g with the switch control signal SWg so that the coded shape bit stream Egk corresponding to each block of the coded arbitrary shape signal is input to the shape decoding unit 170 while the coded transparency bit stream Egt corresponding to the block is input to the texture decoding unit 180f. Thereby, in the coded transparency signal, the coded shape bit stream Egk and the coded texture bit stream Egt are separated from each other (Step Sg15), and the separated shape bit stream Egk is decoded by the shape decoding unit 170 (Step Sg16) while the separated transparency bit stream Egt is decoded by the texture decoding unit 180f (Step Sg17).

That is, the coded shape bit stream Egk is decoded by the shape decoding unit 170, like the coded shape bit stream E2k of the binary image signal. When decoding of the coded shape bit stream Egk corresponding to one block has ended, the arithmetic decoder 171 detects the end of the coded shape bit stream Egk corresponding to this block and outputs an end detection signal Te toward the data analyzer 160g. Receiving the end detection signal Te, the data analyzer 160g controls the switch 101g with the switch control signal SWb so that the input coded image signal is input to the texture decoding unit 180f.

Thereby, the coded transparency bit stream Egt is sent from the data analyzer 160g to the texture decoding unit 180f. In the decoding unit 180f, the quantization scale and the DCT coefficients in each bit stream are input to the inverse quantizer 181f, and the OCT coefficients are subjected to inverse quantization. Thereafter, the inversely quantized signal Diq is subjected to inverse cosine transformation by the inverse cosine transformer 182f.

Meanwhile, the transparency motion vector MV is input to the texture motion compensator 184f. The compensator 184f generates an address for obtaining a prediction transparency signal according to the transparency motion vector MV, and obtains the prediction texture signal Emg from the frame memory bank 102f using the address.

The adder 183 performs addition of the output Didct from the inverse cosine transformer 182f and the prediction transparency signal Emg, and outputs the decoded transparency signal Dgt. The decoded transparency signal Dgt is input to the frame memory bank 102f and the synthesizer 190g. The synthesizer 190g synthesizes the reproduced transparency signal Dgt and the corresponding reproduced shape signal Dgk with a desired image to generate synthesized image data Dsyn. The synthesized image data Dsyn is input to the display unit 104 to be displayed as an image (Step Sg18). When decoding of the coded transparency bit stream has ended, the data analyzer 160g detects the end of the coded transparency bit stream, and controls the switch 101f by the switch control signal SWg so that the input coded image signal is input to the shape decoding unit 170.

Thereafter, it is decided whether the input coded signal is data of the last block of the last frame (Step Sg19). When it is not data of the last block of the last frame, an input coded data corresponding to the next block is subjected to Steps Sg1, Sg12, and Sg14–Sg19. Conversely, when it is data of the last block of the last frame, decoding of the input coded signal is ended.

In this eleventh embodiment, with respect to pixels wherein the reproduced shape signal is zero, pixel values in the reproduced first and second arbitrary shape signal and the reproduced transparency signal are replaced with pixel values of a prescribed image. The prescribed image is an image prepared in advance at the receiving end, or an image reproduced by another image decoding apparatus.

As described above, according to the eleventh embodiment of the invention, the image decoding apparatus 100g includes the data analyzer 160g which analyzes the input coded data. The data analyzer 160g detects an image identifier showing which coded signal is the input coded image signal among the coded binary signal E2, the first and second coded arbitrary shape signals Ep and Ex, the coded rectangle signal Et, and the coded transparency signal Eg and, according to the value of the image identifier, the analyzer 160g controls the switch 101g so that the input coded signal is appropriately input to one of the shape decoding unit 170 and the texture decoding unit 180f. Therefore, the above-mentioned five coded image signals having different data structures can be decoded by decoding processes corresponding to a single coding method.

Furthermore, in this eleventh embodiment, the coded texture bit stream and the coded transparency bit stream are decoded by the same decoding method in the texture decoding unit 180f. However, the coded transparency bit stream may be decoded by a decoding method different from that for the coded texture bit stream, as described for the ninth embodiment.

Moreover, in this eleventh embodiment, emphasis has been placed on the image decoding apparatus 100g which identifies the coded signals having the data structure described for the tenth embodiment, i.e., first and second coded arbitrary shape signals, a coded binary signal, a coded transparency signal, and a coded rectangle signal, using their image identifiers, and performs decoding processes according to the respective data structures. However, when the image input unit 110 in the image coding apparatus 100a according to the second embodiment shown in FIG. 3 is constructed so that it can identify an arbitrary shape image signal, a binary image signal, a rectangle image signal, an arbitrary shape transparency signal, and an arbitrary shape image signal with transparency information, it is possible to implement an image coding apparatus that performs coding of tehese image signals with image identifiers for identifying the coded signals corresponding to these image signals.

When a coding or decoding program for implementing any of the aforementioned image coding apparatus, image decoding apparatuses, image coding method, and image decoding methods, is recorded on a data storage medium (e.g., a floppy disk), the image processing according to any of the aforementioned embodiments can be easily executed in an independent computer system.

Figure 21:
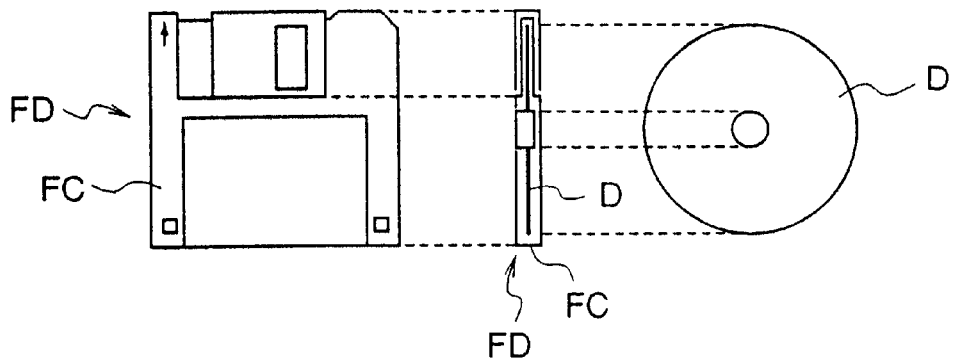
FIGS. 21(a)–21(c) are diagrams for explaining a data storage medium (FIGS. 21(a),21(b)) which contains a program for implementing an image coding apparatus or an image decoding apparatus according to any of the aforementioned embodiments, using a computer system (FIG. 21(c)).
Figure 21:
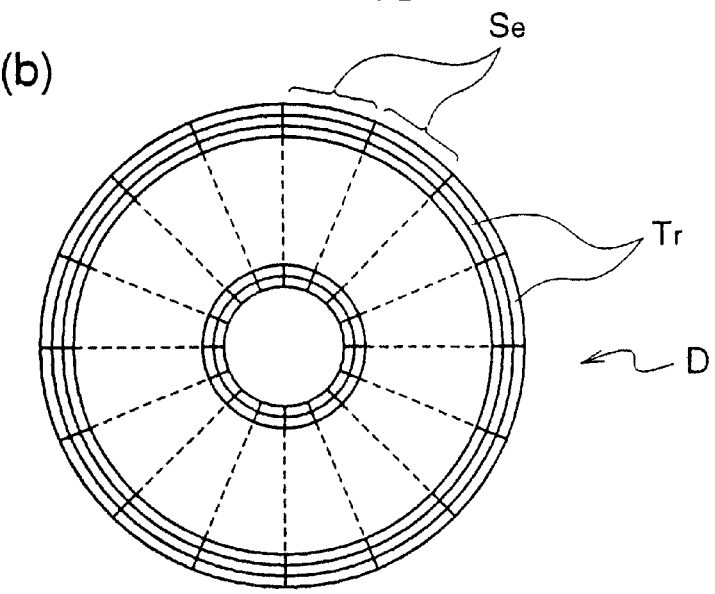
Figure 21:
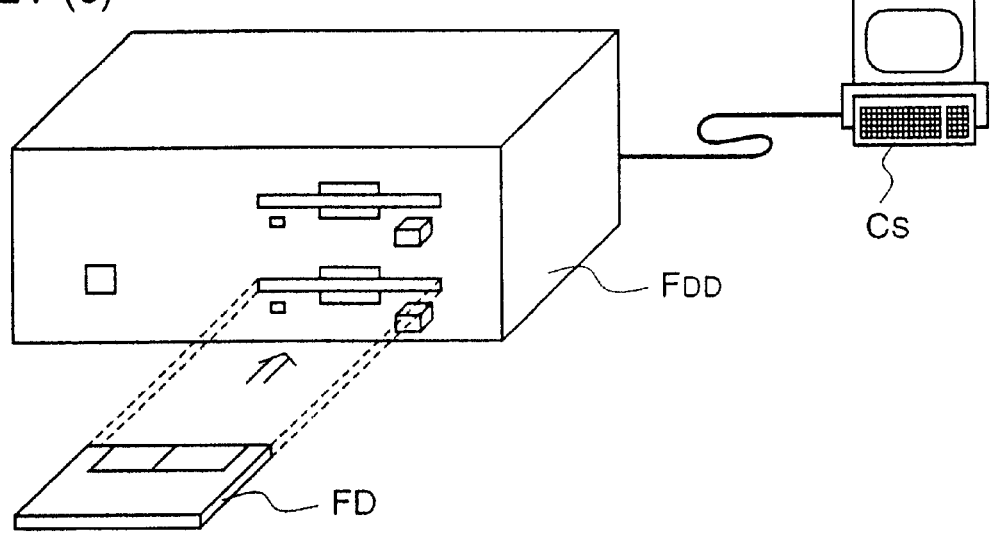
Figure 22:
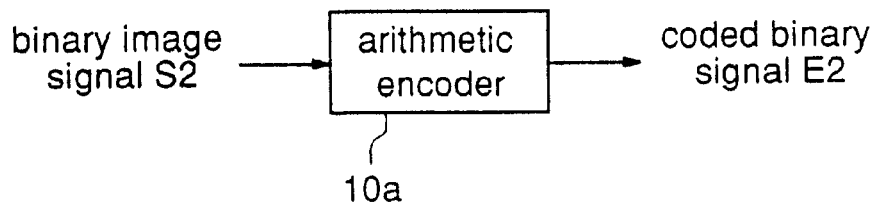
FIGS. 22(a)–22(c) are diagrams for explaining a communication system using the JBIG type data compressive coding process and, more specifically.
Figure 22:
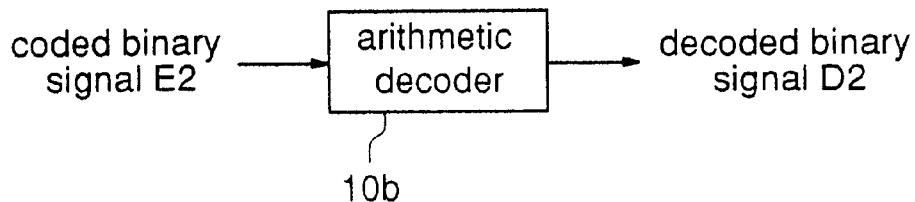
Figure 22:
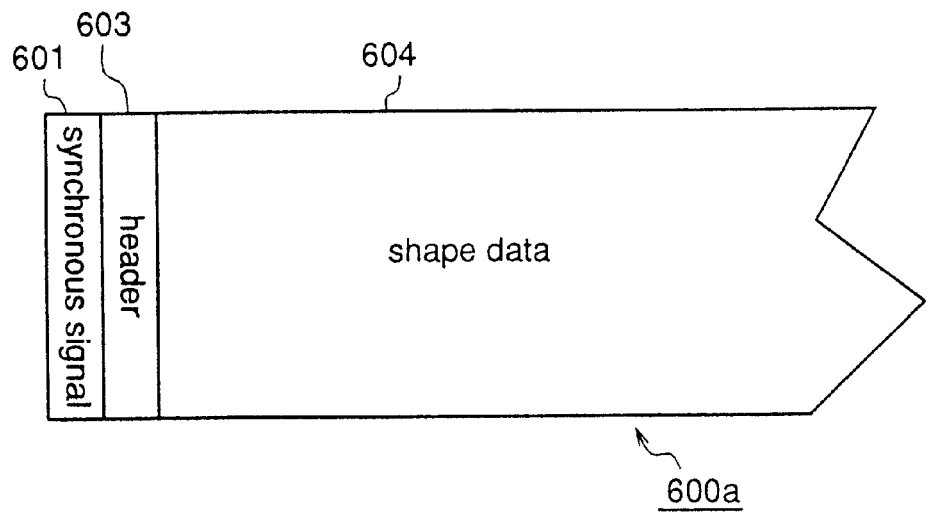

FIGS. 21(a)–21(c) are diagrams for explaining when the image coding process according to the second embodiment or the image decoding process according to any of the third, fourth, fifth, seventh, ninth, and eleventh embodiments is executed by a computer system using a floppy disk which contains the coding or decoding program.

FIG. 21(a) shows a front view of a floppy disk FD, a cross-sectional view thereof, and a floppy disk body D. FIG. 21(b) shows an example of a physical format of the floppy disk body D.

The floppy disk body D is contained in a case FC, thereby providing the floppy disk FD. On the surface of the disk body D, a plurality of tracks Tr are formed concentrically from the outer circumference of the disk toward the inner circumference. Each track is divided into 16 sectors in the angular direction. Therefore, in the floppy disk FD containing the above-mentioned program, data of the program are recorded in assigned sectors on the floppy disk body D.

FIG. 21(c) shows the structure for recording the program in the floppy disk FD and for performing image processing using the program recorded in the floppy disk FD.

To be specific, when the program is recorded in the floppy disk FD, data of the program are written in the floppy disk FD from the computer system Cs through the floppy disk drive FDD. When the above-mentioned image coding apparatus or image decoding apparatus is constructed in the computer system Cs from the program recorded in the floppy disk FD, the program is read from the floppy disk FD by the floppy disk drive FDD and then loaded to the computer system Cs.

Although in the above description a floppy disk is employed as a data storage medium, an optical disk may be employed. Also in this case, image coding or decoding can be carried out by software, in similar manner to the above-mentioned case of using the floppy disk. The storage medium is not restricted to the floppy disk and the optical disk, and any medium may be employed as long as it can contain the program, for example, an IC card or a ROM cassette.

Furthermore, there is a case where coded image signals having different data structures, such as a coded binary signal, a coded rectangle signal, first and second coded arbitrary shape signals, and a coded transparency signal, are stored in a data storage medium such as an optical disk.

Assuming that the coded image signals having different data structures and stored in a data storage medium are coded image signals having the data structures with image identifiers according to any of the first, sixth, eighth, and tenth embodiments, when these coded image signals are read from the medium and decoded, the respective coded signals can be identified with the identifiers and decoded adaptively to the data structures of the coded signals by an image decoding method or an image decoding apparatus corresponding to a single coding method. For example, coded image signals having different structures, such as a coded binary signal and a coded arbitrary shape signal, can be decoded. In this case, with respect to the coded binary signal, addition of a dummy coded texture signal when the binary signal is created is dispensed with, whereby unwanted increase in the coded bit number is almost avoided.

What is claimed is:

1. An image decoding method, comprising the steps of receiving a coded bitstream including an image identifier and a coded image signal obtained by coding an image signal, the image identifier indicating a data structure of the coded image signal;

decoding a coded shape signal data of the coded image signal, the coded shape signal data being obtained by coding a shape signal indicating whether each pixel of the image signal is located outside or inside an object; and decoding a coded pixel value signal data of the coded image signal, the coded pixel value signal data being obtained by coding a pixel value signal indicating a pixel value of a pixel, wherein in the case that the image identifier indicates that the coded image signal includes only the coded shape signal data, only the step of decoding the coded shape signal data is performed;

in the case that the image identifier indicates that the coded image signal includes only the coded pixel value signal data, only the step of decoding the coded pixel value signal data is performed; and in the case that the image identifier indicates that the coded image signal includes only the coded shape signal data and the coded pixel value signal data, the step of decoding the coded shape signal data and the step of decoding the coded pixel value signal data are performed.

2. The image decoding method of claim 1, and further comprising the step of decoding a coded multivalued transparency signal data of the coded image signal, the coded multivalued transparency signal data being obtained by coding a multivalued transparency signal; wherein in the case that the image identifier indicates that the coded image signal includes the coded shape signal data, the coded pixel value signal data and the coded multivalued transparency signal data, the step of decoding the coded shape signal data, the step of decoding the coded pixel value signal data, and the step of decoding the coded multivalued transparency signal data are performed.

3. The image decoding method of claim 1, wherein the shape signal is a binary value signal and the pixel value signal is a multi-value signal.

4. An image decoding apparatus, comprising receiving means for receiving a coded bitstream including an image identifier and a coded image signal obtained by coding an image signal, the image identifier indicating a data structure of the coded image signal;

decoding means for decoding a coded shape signal data of the coded image signal, the coded shape signal data being obtained by coding a shape signal indicated whether each pixel of the image signal is located outside or inside an object; and decoding means for decoding a coded pixel value signal data of the coded image signal, the coded pixel value signal data being obtained by coding a pixel value signal indicating a pixel value of a pixel, wherein in the case that the image identifier indicates that the coded image signal includes only the coded shape signal data, only the step of decoding the coded shape signal data is performed;

in the case that the image identifier indicates that the coded image signal includes only the coded pixel value signal data, only the step of decoding the coded pixel value signal data is performed; and in the case that the image identifier indicates that the coded image signal includes only the coded shape signal data and the coded pixel value signal data, the step of decoding the coded shape signal data and the step of decoding the coded pixel value signal data are performed.

5. The image decoding apparatus of claim 4, and further comprising decoding means for decoding a coded multivalued transparency signal data of the coded image signal, the coded multivalued transparency signal data being obtained by coding a multivalued transparency signal; wherein in the case that the image identifier indicates that the coded image signal includes the coded shape signal data, the coded pixel value signal data and the coded multivalued transparency signal data, the step of decoding the coded shape signal data, the step of decoding the coded pixel value signal data, and the step of decoding the coded multivalued transparency signal data are performed.

6. The image decoding apparatus of claim 4, wherein the shape signal is a binary value signal and the pixel value signal is a multi-value signal.

* * * * *

UNITED STATES PATENT AND TRADEMARK OFFICE
CERTIFICATE OF CORRECTION

PATENT NO. : 6,665,445 B1
DATED : December 16, 2003
INVENTOR(S) : Choong Seng Boon It is certified that error appears in the above-identified patent and that said Letters Patent is hereby corrected as shown below:

Title page,
Item [56], References Cited, OTHER PUBLICATIONS, "Rob Koenen et al.;" reference, change "Objective" to -- Objectives --.
"Bossen, F. et al." reference, change "Neutal" to -- Neural --.

Column 56,
Lines 6 and 11, before "decoding" insert -- first --;
Line 8, change "indicated" to -- indicating --;
Line 11, before "decoding" change "first" to -- second --;
Lines 17 and 26, change "step of decoding" to -- first decoding means decodes --;
Line 20, delete "is performed"; and
Lines 21 and 27, change "step of decoding" to -- second decoding means decodes --;
Line 22, delete "is performed";
Lines 27, 28 and 41, delete "are performed".
Line 30, after "comprising" insert -- third --;
Lines 37-38, change "step of decoding" to -- second decoding means decodes --;
Line 38, change "step of decoding" to -- second decoding means decodes --; and
Lines 39 and 40, change "step of decoding" to -- third decoding means decodes --.

Signed and Sealed this

Twenty-first Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,665,445 B1
DATED : December 16, 2003
INVENTOR(S) : Choong Seng Boon It is certified that error appears in the above-identified patent and that said Letters Patent is hereby corrected as shown below:

<u>Column 56,</u>
Line 18, delete "is performed"; and
Lines 37-38, change "second" to -- first --.

Signed and Sealed this

Seventh Day of June, 2005

JON W. DUDAS
*Director of the United States Patent and Trademark Office*